(12) United States Patent
Cui et al.

(10) Patent No.: US 12,167,178 B2
(45) Date of Patent: Dec. 10, 2024

(54) PROJECTION APPARATUS AND PROJECTION DISPLAY METHOD

(71) Applicant: Hisense Laser Display Co., Ltd, Qingdao (CN)

(72) Inventors: Rongrong Cui, Qingdao (CN); Chongyang Zhang, Qingdao (CN); Xiuyan Cao, Qingdao (CN); Liming Cao, Qingdao (CN)

(73) Assignee: HISENSE LASER DISPLAY CO., LTD, Qingdao (CN)

( * ) Notice: Subject to any disclaimer, the term of this patent is extended or adjusted under 35 U.S.C. 154(b) by 406 days.

(21) Appl. No.: 17/731,596

(22) Filed: Apr. 28, 2022

(65) Prior Publication Data

US 2022/0256129 A1 Aug. 11, 2022

Related U.S. Application Data

(63) Continuation-in-part of application No. PCT/CN2021/082122, filed on Mar. 22, 2021, which
(Continued)

(30) Foreign Application Priority Data

| Apr. 20, 2020 | (CN) | .......................... 202010313260.X |
| Apr. 20, 2020 | (CN) | .......................... 202010313356.6 |
| Apr. 20, 2020 | (CN) | .......................... 202020597629.X |

(51) Int. Cl.
*H04N 9/31* (2006.01)
*G02B 26/08* (2006.01)

(52) U.S. Cl.
CPC ....... *H04N 9/3152* (2013.01); *G02B 26/0875* (2013.01); *H04N 9/3161* (2013.01); *H04N 9/3164* (2013.01)

(58) Field of Classification Search
CPC .. G03B 21/005; G03B 21/006; G03B 21/008; G03B 21/16; G03B 21/28; G03B 21/145;
(Continued)

(56) References Cited

U.S. PATENT DOCUMENTS

| 2005/0157272 A1 | 7/2005 | Childers |
| 2006/0140511 A1 | 6/2006 | Chang et al. |

(Continued)

FOREIGN PATENT DOCUMENTS

| CN | 1658024 A | 8/2005 |
| CN | 101719340 A | 6/2010 |

(Continued)

OTHER PUBLICATIONS

Chinese Office Action dated Sep. 28, 2023, issued in corresponding Chinese Patent Application No. 202180029616.X with English translation.

(Continued)

*Primary Examiner* — Sultan Chowdhury
(74) *Attorney, Agent, or Firm* — Morgan, Lewis & Bockius LLP

(57) ABSTRACT

A projection apparatus includes a light source assembly, a display control circuit, a light valve, a vibrating lens drive assembly, and a vibrating lens. The display control circuit is configured to obtain a plurality of sub-images; in a process of emitting beams of three primary colors by the light source assembly to the light valve sequentially, control, according to primary color parameters of the pixels in each sub-image, the light valve to sequentially reflect beams corresponding to the plurality of sub-images to the vibrating lens; and in a process of projecting each sub-image, transmit a vibrating lens current control signal corresponding to the sub-image to the vibrating lens drive assembly. The vibrating lens drive assembly is configured to provide at least one vibrating lens (Continued)

driving current to the vibrating lens according to the vibrating lens current control signal corresponding to the sub-image.

20 Claims, 24 Drawing Sheets

Related U.S. Application Data is a continuation of application No. PCT/CN2021/081912, filed on Mar. 19, 2021, which is a continuation of application No. PCT/CN2021/081911, filed on Mar. 19, 2021.

(58) Field of Classification Search
CPC .... G03B 21/206; G03B 21/208; H04N 9/312; H04N 9/3102; H04N 9/3105; H04N 9/3108; H04N 9/3111; H04N 9/3135; H04N 9/3138; H04N 9/3152; H04N 9/3161; H04N 9/3164; H04N 9/3188; G02B 26/00; G02B 26/008; G02B 26/02; G02B 26/023; G02B 26/0816; G02B 26/0825; G02B 26/0833; G02B 26/0875; G02B 27/48; G02B 27/62; G02B 27/64; G02B 27/0922; G02B 27/0955
See application file for complete search history.

(56) References Cited

U.S. PATENT DOCUMENTS

| | | | |
|---|---|---|---|
| 2009/0009617 A1* | 1/2009 | Ito | H04N 25/63 348/222.1 |
| 2011/0188003 A1* | 8/2011 | Furutachi | G03B 33/12 353/34 |
| 2015/0077822 A1 | 3/2015 | Mizoguchi | |
| 2016/0041363 A1 | 2/2016 | Hagiwara | |
| 2017/0111622 A1 | 4/2017 | Guo et al. | |
| 2017/0214885 A1 | 7/2017 | Xu et al. | |
| 2018/0267294 A1 | 9/2018 | Aschwanden et al. | |
| 2019/0101771 A1 | 4/2019 | Takimoto | |
| 2019/0235364 A1 | 8/2019 | Chen et al. | |
| 2019/0258150 A1* | 8/2019 | Inui | G03B 21/145 |

FOREIGN PATENT DOCUMENTS

| | | |
|---|---|---|
| CN | 101770071 A | 7/2010 |
| CN | 102162919 A | 8/2011 |
| CN | 102193189 A | 9/2011 |
| CN | 103399402 A | 11/2013 |
| CN | 105068358 A | 11/2015 |
| CN | 105120187 A | 12/2015 |
| CN | 205721053 U | 11/2016 |
| CN | 106990526 A | 7/2017 |
| CN | 107003498 A | 8/2017 |
| CN | 107463058 A | 12/2017 |
| CN | 107643594 A | 1/2018 |
| CN | 108134557 A | 6/2018 |
| CN | 108646504 A | 10/2018 |
| CN | 108873368 A | 11/2018 |
| CN | 109426055 A | 3/2019 |
| CN | 109581683 A | 4/2019 |
| CN | 110109317 A | 8/2019 |
| CN | 110312112 A | 10/2019 |
| CN | 110412821 A | 11/2019 |
| CN | 110602470 A | 12/2019 |
| CN | 110764253 A | 2/2020 |
| CN | 110926401 A | 3/2020 |
| CN | 210294585 U | 4/2020 |
| CN | 211826864 U | 10/2020 |
| CN | 211878401 U | 11/2020 |
| CN | 212364781 U | 1/2021 |
| CN | 113534577 A | 10/2021 |
| EP | 2 784 567 A1 | 10/2014 |

OTHER PUBLICATIONS

Chinese Office Action dated Oct. 31, 2023, issued in corresponding Chinese Patent Application No. 202180030082.2 with English translation.
Chinese Office Action dated Apr. 25, 2023, issued in corresponding Chinese Patent Application No. 202180030082.2.
Office Action issued in corresponding Chinese Patent Office Application No. 202010313260.X dated Feb. 18, 2022, with English translation.
Office Action issued in corresponding Chinese Patent Office Application No. 202010313356.6 dated Feb. 28, 2022, with English translation.
International Search Report and Written Opinion issued in International Patent Application No. PCT/CN2021/081912 dated Jun. 4, 2021, with English translation.
International Search Report and Written Opinion issued in International Patent Application No. PCT/CN2021/081911 dated Jun. 16, 2021, with English translation.
International Search Report and Written Opinion issued in International Patent Application No. PCT/CN2021/082122 dated Jun. 24, 2021, with English translation.

* cited by examiner

PROJECTION APPARATUS AND PROJECTION DISPLAY METHOD

CROSS-REFERENCE TO RELATED APPLICATIONS

This application is a continuation-in-part of International Application No. PCT/CN2021/081911, filed on Mar. 19, 2021, which claims priority to Chinese Patent Application No. 202010313260.X, filed on Apr. 20, 2020; this application is a continuation-in-part of International Application No. PCT/CN2021/081912, filed on Mar. 19, 2021, which claims priority to Chinese Patent Application No. 202010313356.6, filed on Apr. 20, 2020; this application is a continuation-in-part of International Application No. PCT/CN2021/082122, filed on Mar. 22, 2021, which claims priority to Chinese Patent Application No. 202020597629.X, filed on Apr. 20, 2020. The entire contents of the forgoing applications are incorporated herein by reference.

TECHNICAL FIELD

The present disclosure relates to the field of projection display, and in particular, to a projection apparatus and a projection display method.

BACKGROUND

Projection apparatuses have been widely used in the display field due to their advantages of high color purity, wide color gamut, high brightness, and the like. Generally, in a case where a projection apparatus projects an image onto a screen, if a resolution of the projection apparatus is less than a resolution of the image, the projection apparatus removes some of pixels in the image to obtain a processed image with a resolution less than or equal to that of the projection apparatus, and projects the processed image onto the screen.

SUMMARY

In an aspect, a projection apparatus is provided. The projection apparatus includes a light source assembly, a display control circuit, a light valve, a vibrating lens drive assembly, and a vibrating lens. The display control circuit is electrically connected to the light valve and the vibrating lens drive assembly, the vibrating lens drive assembly is further electrically connected to the vibrating lens. The display control circuit is configured to: obtain a plurality of sub-images by decomposing an image to be projected, a resolution of the image to be projected being greater than a resolution of the light valve, and a resolution of each sub-image being less than or equal to the resolution of the light valve; in a process of emitting beams of three primary colors by the light source assembly to the light valve sequentially, control, according to primary color parameters of pixels in each sub-image, the light valve to sequentially reflect beams corresponding to the plurality of sub-images to the vibrating lens; in a process of projecting each sub-image, transmit a vibrating lens current control signal corresponding to the sub-image to the vibrating lens drive assembly. The vibrating lens drive assembly is configured to provide, according to the vibrating lens current control signals corresponding to the plurality of sub-images, vibrating lens driving currents to the vibrating lens, so that the vibrating lens deflects beams corresponding to at least one sub-image, thereby forming a projected image.

In another aspect, a projection display method is provided. The method includes: obtaining a plurality of sub-images by decomposing an image to be projected, a resolution of the image to be projected being greater than a resolution of the light valve, and a resolution of each sub-image being less than or equal to the resolution of the light valve; in a process of emitting beams of three primary colors by the light source assembly to the light valve sequentially, controlling, according to primary color parameters of the pixels in each sub-image, the light valve to sequentially reflect beams corresponding to the plurality of sub-images to the vibrating lens; in a process of projecting each sub-image, transmitting a vibrating lens current control signal corresponding to the sub-image to the vibrating lens drive assembly, so that the vibrating lens drive assembly provides at least one vibrating lens driving current to the vibrating lens, and the vibrating lens deflects beams corresponding to at least one sub-image, thereby forming a projected image.

In yet another aspect, a non-transitory computer-readable storage medium is provided. The non-transitory computer-readable storage medium stores computer program instructions that, when executed by a processor, cause the processor to implement the above method.

BRIEF DESCRIPTION OF THE DRAWINGS

In order to describe technical solutions in the present disclosure more clearly, the accompanying drawings to be used in some embodiments of the present disclosure will be introduced briefly. However, the accompanying drawings to be described below are merely some embodiments of the present disclosure, and a person of ordinary skill in the art may obtain other drawings according to these drawings. In addition, the accompanying drawings to be described below may be regarded as schematic diagrams, and are not limitations on an actual size of a product, an actual process of a method and an actual timing of a signal to which the embodiments of the present disclosure relate.

DETAILED DESCRIPTION

Figure 1:
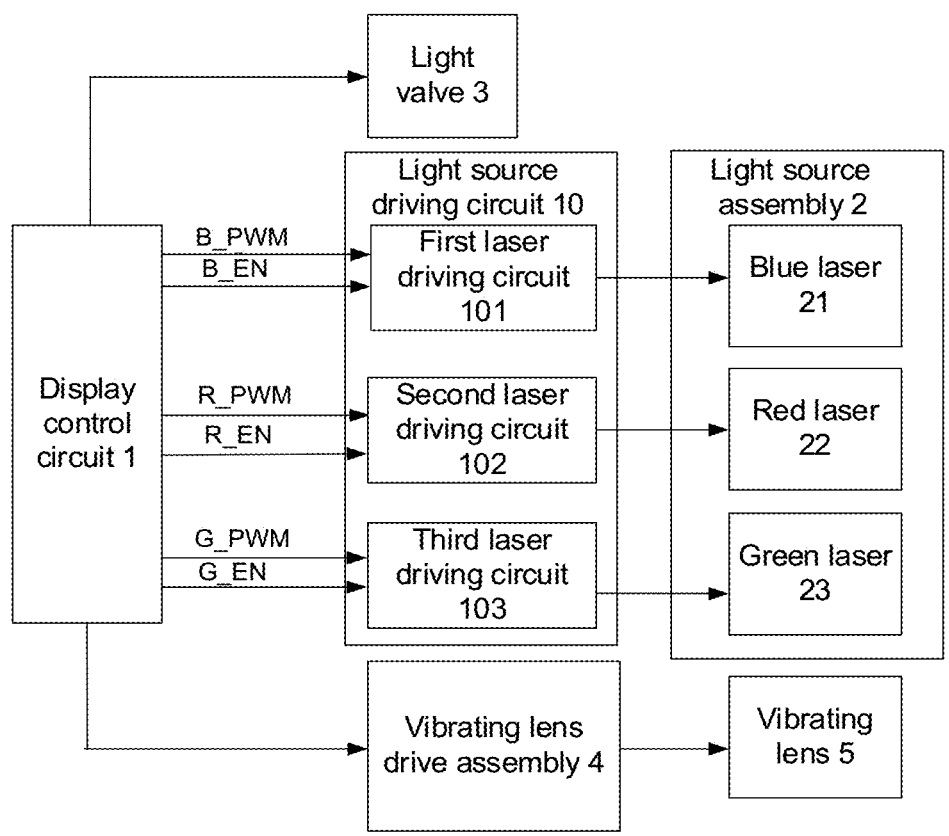
FIG. 1 is a block diagram of a projection apparatus, in accordance with some embodiments.

The technical solutions in some embodiments of the present disclosure will be described clearly and completely with reference to the accompanying drawings. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to".

In the description of the specification, the terms such as "one embodiment", "some embodiments", "exemplary embodiments", "example", "specific example" or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, features defined with "first" and "second" may explicitly or implicitly include one or more of the features. In the description of the embodiments of the present disclosure, the terms "a plurality of" and "the plurality of" each mean two or more unless otherwise specified.

In the description of some embodiments, the term "connected" and its extensions may be used. For example, the term "connected" may be used when describing some embodiments to indicate that two or more components are in direct physical contact or electrical contact with each other. However, the term "connected" may also mean that two or more components are not in direct contact with each other, but still cooperate or interact with each other. The embodiments disclosed herein are not necessarily limited to the contents herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if", depending on the context, is optionally construed as "when" or "in a case where" or "in response to determining" or "in response to detecting". Similarly, the phrase "if it is determined" or "if [a stated condition or event] is detected", depending on the context, is optionally construed as "in a case where it is determined" or "in response to determining" or "in a case where [the stated condition or event] is detected" or "in response to detecting [the stated condition or event]".

The use of the phrase "applicable to" or "configured to" herein means an open and inclusive language, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

As used herein, the term "about", "substantially" or "approximately" includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

The term such as "parallel", "perpendicular" or "equal" as used herein includes a stated condition and a condition similar to the stated condition. A range of the similar condition is within an acceptable range of deviation. The acceptable range of deviation is determined by a person of ordinary skill in the art, considering measurement in question and errors associated with measurement of a particular quantity (i.e., limitations of a measurement system). For example, the term "parallel" includes absolute parallelism and approximate parallelism, and an acceptable range of deviation of the approximate parallelism may be, for example, a deviation within 5°; the term "perpendicular" includes absolute perpendicularity and approximate perpendicularity, and an acceptable range of deviation of the approximate perpendicularity may also be, for example, a deviation within 5°; the term "equal" includes absolute equality and approximate equality, and an acceptable range of deviation of the approximate equality may be, for example, a difference between two equals of less than or equal to 5% of either of the two equals.

Exemplary embodiments are described herein with reference to sectional views and/or plan views that are schematic illustrations of idealized embodiments. In the drawings, thicknesses of layers and regions may be enlarged for clarity. Therefore, variations in a shape with respect to the drawings due to, for example, manufacturing technology and/or tolerances may be envisaged. Therefore, exemplary embodiments should not be construed as being limited to the shapes of the regions as illustrated herein, but include deviations in shapes due to, for example, manufacturing. For example, an etched region shown as a rectangle will generally have curved features. Therefore, the regions shown in the drawings are schematic in nature, and their shapes are not intended to show the actual shapes of the regions of the device, and are not intended to limit the scope of the exemplary embodiments.

Some embodiments of the present disclosure provide a projection apparatus. The projection apparatus is an apparatus for projecting an image, such as a laser projection television or a laser projector.

Figure 2:
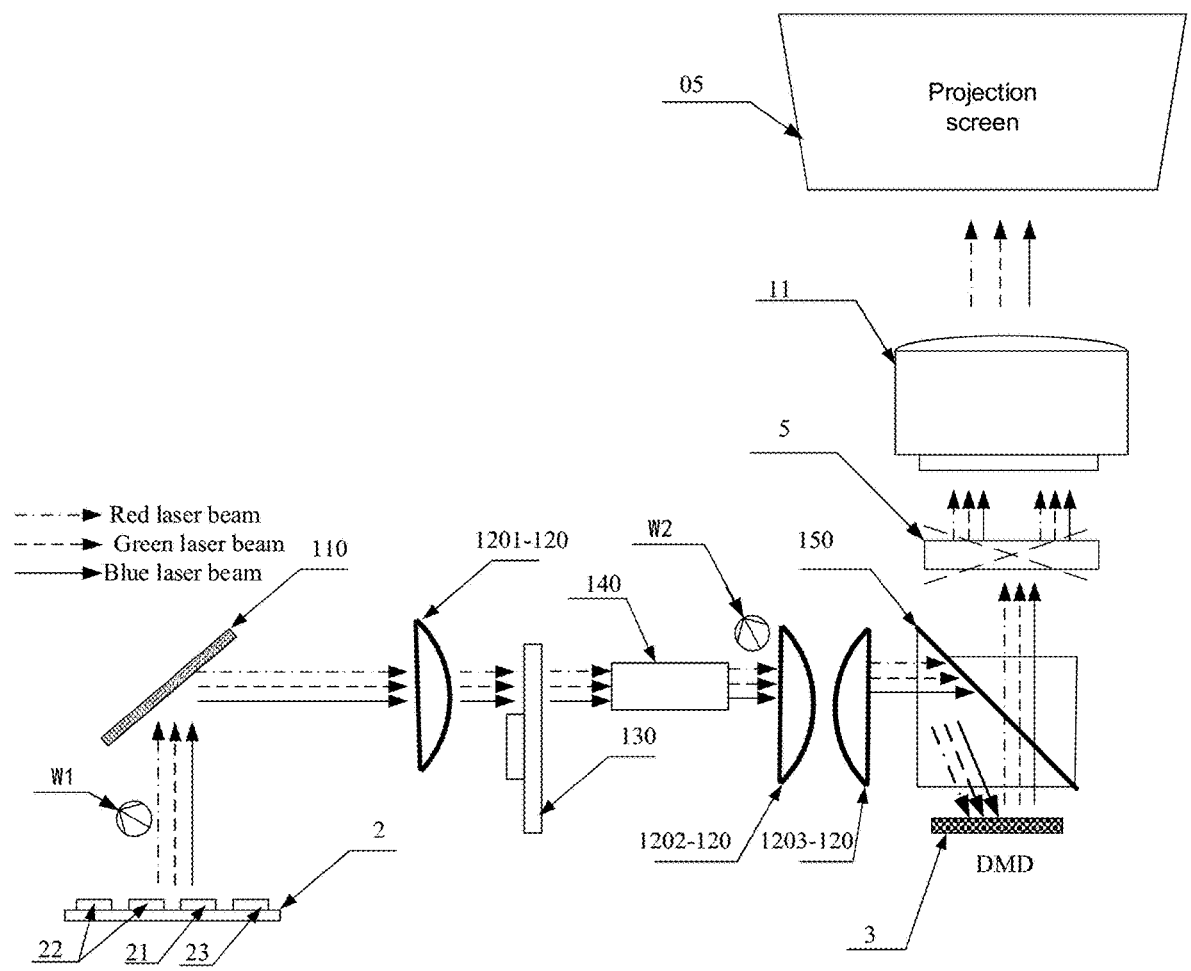
FIG. 2 is a schematic diagram of an optical path in a projection apparatus, in accordance with some embodiments.
Figure 3:
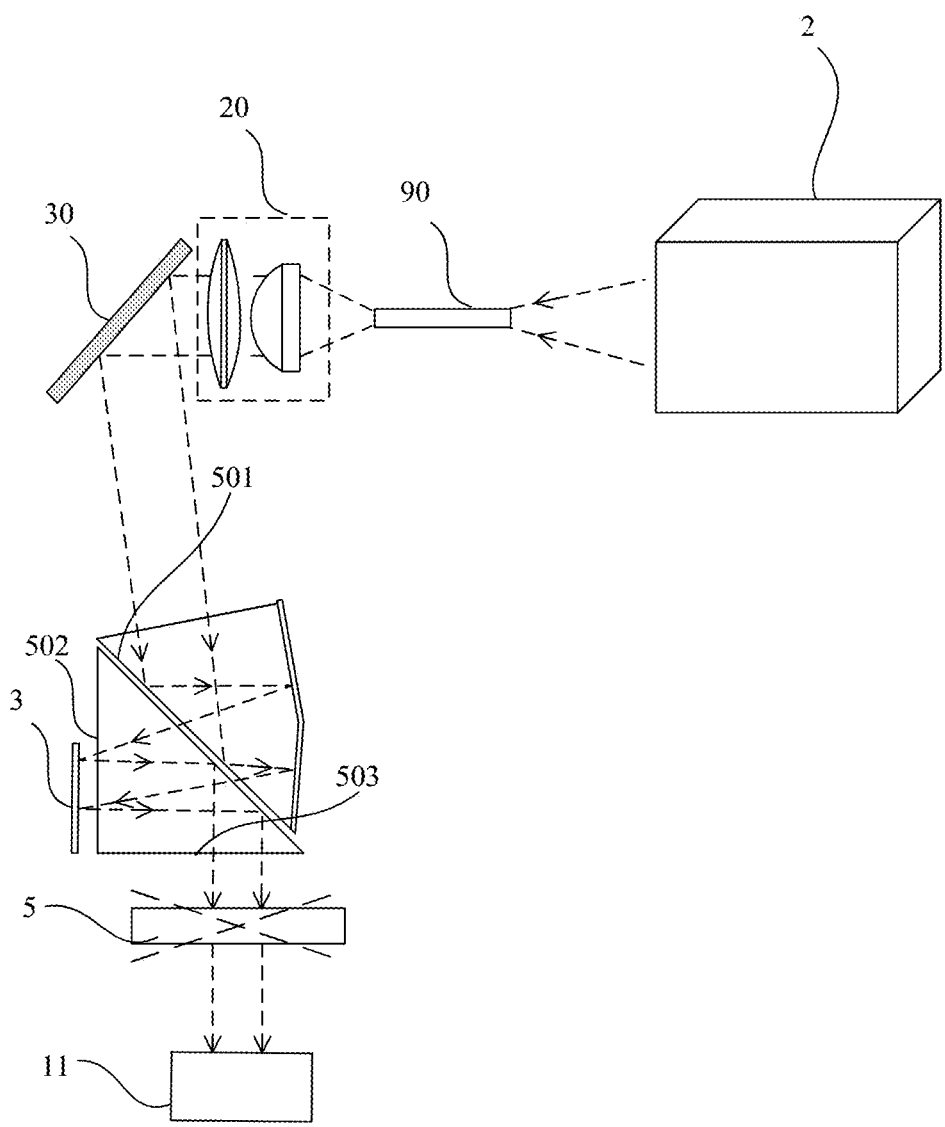
FIG. 3 is a schematic diagram of an optical path in another projection apparatus, in accordance with some embodiments.

As shown in FIGS. 1 to 3, the projection apparatus includes a display control circuit 1, a light source assembly 2, a light valve 3, a vibrating lens drive assembly 4 and a vibrating lens 5. The display control circuit 1 is electrically connected to the light valve 3 and the vibrating lens drive assembly 4. The vibrating lens drive assembly 4 is further electrically connected to the vibrating lens 5.

The display control circuit 1 is configured to obtain a plurality of sub-images. The sub-images are obtained by decomposing an image to be projected. A resolution of the image to be projected is greater than a resolution of the light valve 3, and a resolution of each sub-image is less than or equal to the resolution of the light valve 3. The display control circuit 1 is further configured to, in a process that beams of three primary colors emitted from the light source assembly 2 travel to the light valve 3 sequentially, control, according to primary color parameters (e.g., color gradation values of the three primary colors) of pixels in each sub-image, the light valve 3 to sequentially reflect beams corresponding to the plurality of sub-images to the vibrating lens 5. The display control circuit 1 is further configured to, in a process of projecting each sub-image, transmit a vibrating lens current control signal corresponding to the sub-image to the vibrating lens drive assembly 4. The vibrating lens drive assembly 4 is configured to provide, according to vibrating lens current control signals corresponding to the plurality of sub-images, at least one vibrating lens driving current to the vibrating lens 5, so that the vibrating lens 5 deflects beams corresponding to at least one of the plurality of sub-images, thereby forming a projected image.

The above components in the display apparatus will be illustrated below by examples with reference to FIGS. 1 to 3.

Display Control Circuit 1

In a case where a resolution of an image to be projected is greater than the resolution of the light valve 3, in order to improve the display effect of the image to be projected, the image to be projected may be decomposed into a plurality of sub-images, and the plurality of sub-images are projected to different positions sequentially to display the plurality of sub-images in a superimposition manner. As a result, an image with a high resolution may be displayed on the projection apparatus with a low resolution.

In this case, the display control circuit 1 is configured to obtain the plurality of sub-images. A resolution of each sub-image is less than or equal to the resolution of the light valve 3.

The display control circuit 1 may be a digital light processing chip (DLPC). For example, the display control circuit 1 is a DLPC 6540.

The manner of obtaining the plurality of sub-images by the display control circuit 1 will be illustrated below by examples, but the manner is not limited thereto. Another manner may also be used, as long as the display control circuit 1 can obtain the plurality of sub-images.

Figure 4:
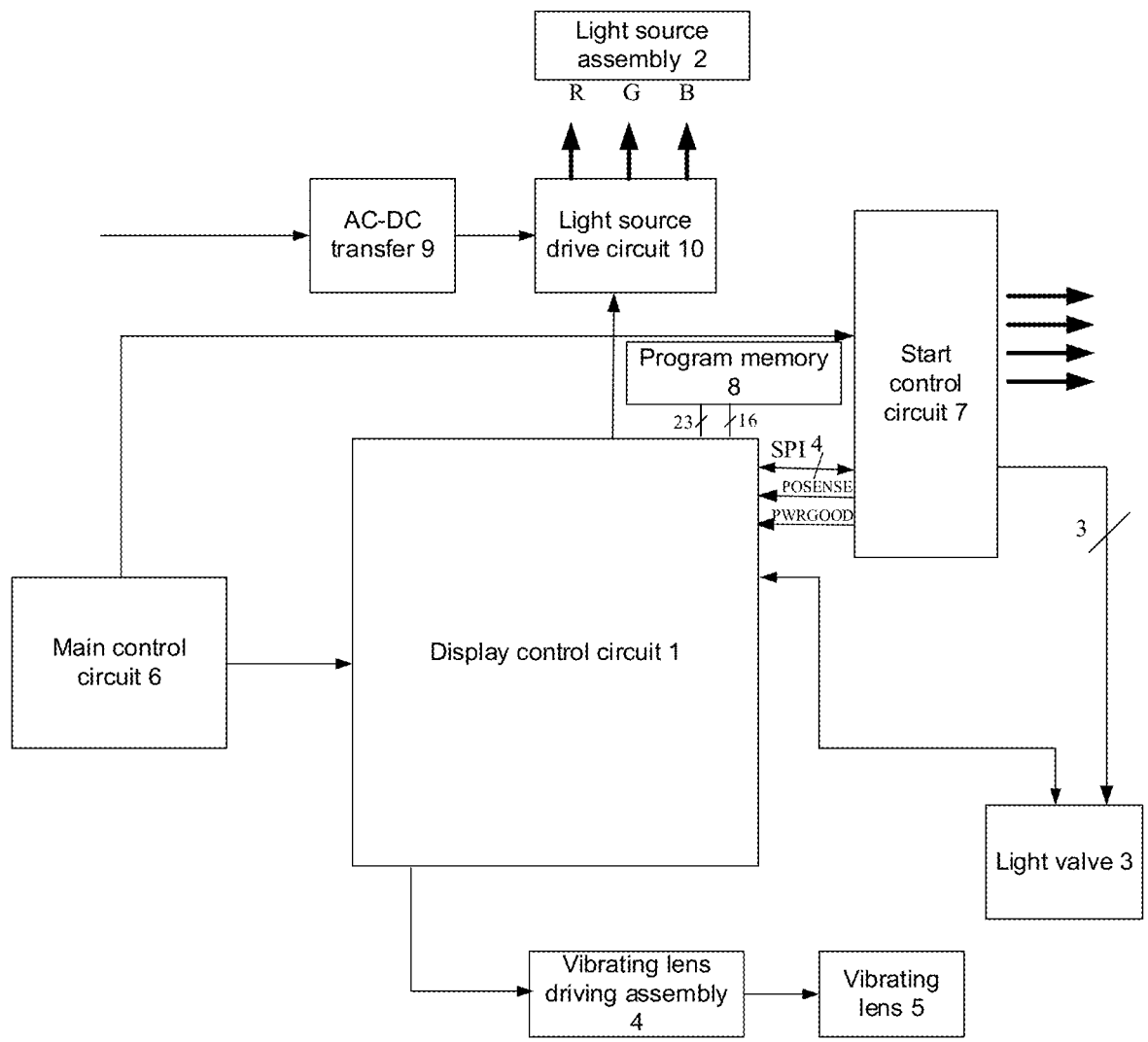
FIG. 4 is a block diagram of another projection apparatus, in accordance with some embodiments.

In some examples, as shown in FIG. 4, the projection apparatus is a laser projection television, and the projection apparatus further includes a main control circuit (e.g., a chip) 6. The display control circuit 1 may be connected to the main control circuit 6. The main control circuit 6 may be configured to decode an image signal of the image to be projected when the projection apparatus is to display the image, and send the decoded image signal to the display control circuit 1 at a frequency of, for example, 60 Hz. The display control circuit 1 is configured to divide the decoded image signal into a plurality of sub-image signals after receiving the decoded image signal, thereby realizing the division of the image to be displayed into the plurality of sub-images.

For example, the decoded image signal may be a video signal or a 4K (i.e., 3840×2160) digital signal, and each sub-image signal may be another video signal or a 2K (i.e., 1920×1080) digital signal.

In some examples, as shown in FIG. 4, the projection apparatus further includes a start control circuit 7 and a program memory 8. The main control circuit 6 is further connected to the start control circuit 7. The start control circuit 7 is further connected to the display control circuit 1 and the light valve 3. The program memory 8 is connected to the display control circuit 1.

The main control circuit 6 is configured to send a start command to the start control circuit 7. The start control circuit 7 is configured to start operation in response to receiving the start command, and output voltages of 1.1 V, 1.8 V, 3.3 V, 2.5 V and 5 V to the display control circuit 1 in turn according to the power-up sequence of the start control circuit 7, so as to supply power to the display control circuit 1. When the power supply voltages and the sequence are correct, the start control circuit 7 is configured to send a power sense (POSENSE) signal and a power good (PWR-GOOD) signal to the display control circuit 1. The display control circuit 1 is configured to read and initialize a program from the external program memory 8 after receiving the two signals, so that the projection apparatus starts to operate.

Next, the display control circuit 1 is configured to set configuration parameters of the start control circuit 7 through a serial peripheral interface (SPI), and instruct the start control circuit 7 to start supplying power to the light valve 3. The start control circuit 7 is configured to output three voltages to the light valve 3, which are a voltage bias (VBIAS) 18 V, a voltage reset (VRST) −14 V, and a voltage offset (VRST) 10 V. When the voltage of light valve 3 is normal, the light valve 3 starts to operate. The display control circuit 1 is configured to send primary color parameters of the sub-image to the light valve 3 at, for example, 594 MHz through a high-speed serial interface (HSSI) to achieve the display of the sub-image.

In some examples, as shown in FIG. 4, the projection apparatus further includes an alternating current-direct current (AC-DC) converter 9 connected to components (e.g., a light source drive circuit) in the projection apparatus. The AC-DC transfer 9 is configured to convert 100 V to 240 V AC into DC to supply power to the components in the projection apparatus.

Light Source Assembly 2

As shown in FIGS. 1 to 3, the light source assembly 2 may be configured to provide beams of three primary colors as driven by the display control circuit 1.

In some examples, the light source assembly 2 includes a monochromatic light source and a phosphor wheel that can produce fluorescence when excited and/or a color wheel, so that the light source assembly 2 may provide beams of three primary colors, e.g., red, green and blue. For example, the monochromatic light source includes a blue laser for emitting a blue laser beam.

In some other examples, the light source assembly 2 is a polychromatic light source. For example, the polychromatic light source includes a laser chip that can emit laser beams of three primary colors. Alternatively, the polychromatic light source includes three sets of monochromatic lasers integrated in one package. For example, the three sets of monochromatic lasers include a set of green lasers for emitting green laser beams, a set of red lasers for emitting red laser beams, and a set of blue lasers for emitting blue laser beams. Each set of lasers may include one or more lasers. In this case, the projection apparatus may be referred to as a full color laser projection apparatus. In this way, the light source assembly 2 may provide laser beams of three primary colors, e.g., red, green and blue without the phosphor wheel and the color wheel.

For example, as shown in FIG. 2, the light source assembly 2 includes one set of blue lasers 21, two sets of red lasers 22, and one set of green lasers 23 that are integrally arranged, and each set of lasers includes one laser. The blue laser 21 is disposed between the red lasers 22 and the green laser 23. With such an arrangement, since the blue laser 21 can withstand a higher temperature, it may be more conducive to rapid heat dissipation of the red lasers 22 and the green laser 23, so that the reliability of the light source assembly 2 may be high.

In the following, for ease of understanding, the embodiments will be described by considering an example in which the light source assembly 2 includes one set of green lasers, one set of red lasers, and one set of blue lasers, and each set of lasers includes one laser. However, the light source assembly 2 may also be other types of light sources.

In order to achieve driven of the light source assembly 2 by the display control circuit 1, in some embodiments, as shown in FIG. 1, the projection apparatus further includes a light source drive circuit 10 connected to the light source assembly 2. The display control circuit 1 is connected to the light source drive circuit 10, and is configured to generate an enable signal and a brightness adjustment signal according to a component of three primary colors (e.g., red component) of the sub-image, and output the enable signal and the brightness adjustment signal to the light source drive circuit 10. The brightness adjustment signal may be a pulse width modulation (PWM) signal.

The light source drive circuit 10 is configured to perform processing (e.g., anti-attenuation and digital-to-analog conversion) on the received enable signal and brightness adjustment signal from the display control circuit 1, and output the processed enable signal and the processed brightness adjustment signal to the light source assembly 2, so that the light source assembly 2 emits a beam of a corresponding color and brightness.

For example, when a red component of a sub-image is to be displayed, the display control circuit 1 outputs a red light enable signal R_EN and a red brightness adjustment signal R_PWM to the light source drive circuit 10. The light source drive circuit 10 processes the signals and outputs the processed signals to the light source assembly 2. The light source assembly 2 emits red light with a corresponding brightness according to the signals.

There are many ways to achieve the light source drive circuit 10, as long as it meets specification requirements, such as the driving requirements of laser beams of three primary colors. For example, the driving requirements of the laser beams of three primary colors are as follows: response speeds of the rising edge and the falling edge shall be less than 17 μs, the ripple of current waveform is within a range of minus 10% to 10% (±10%), and the ripple frequency is greater than 250 kHz. The circuit configuration of the light source drive circuit 10 is not limited in the embodiments of the present disclosure. For example, the light source drive circuit 10 may be a printed circuit board assembly (PCBA).

For example, as shown in FIG. 4, the light source assembly 2 includes a blue laser 21, a red laser 22, and a green laser 23, and the light source drive circuit 10 includes a first laser drive circuit 101 corresponding to the blue laser 21, a second laser drive circuit 102 corresponding to the red laser 22 and a third laser drive circuit 103 corresponding to the green laser 23.

When a blue component of a sub-image is to be displayed, the first laser drive circuit 101 is configured to receive a blue light enable signal B_EN and a blue brightness adjustment signal B_PWM from the display control circuit 1, process the signals and output the processed signals to the blue laser 21, so that the blue laser 21 emits blue light with a corresponding brightness according to the signals.

When a red component of the sub-image is to be displayed, the second laser drive circuit 102 is configured to receive a red light enable signal R_EN and a red brightness adjustment signal R_PWM from the display control circuit 1, process the signals and output the processed signals to the red laser 22, so that the red laser 22 emits red light with a corresponding brightness according to the signals.

When a green component of the sub-image is to be displayed, the third laser drive circuit 103 is configured to receive a green light enable signal G_EN and a green brightness adjustment signal G_PWM from the display control circuit 1, process the signals and output the processed signals to the green laser 23, so that the green laser 23 emits green light of a corresponding brightness according to the signals.

The sequence of emitting the blue light, the red light and the green light by the light source assembly 2 when the sub-image is displayed is not limited. For example, the light source assembly 2 emits the blue light, the red light and the green light sequentially.

Light Valve 3

As described above, as shown in FIG. 1, the display control circuit 1 is further connected to the light valve 3, and may be configured to output primary color gradation values of pixels in each sub-image to the light valve 3. The light valve 3 is configured to convert received primary color gradation values of the pixels in the sub-image into driving signals, and modulate the beams of the three primary colors according to driving signals to obtain projection beams.

Figure 5:
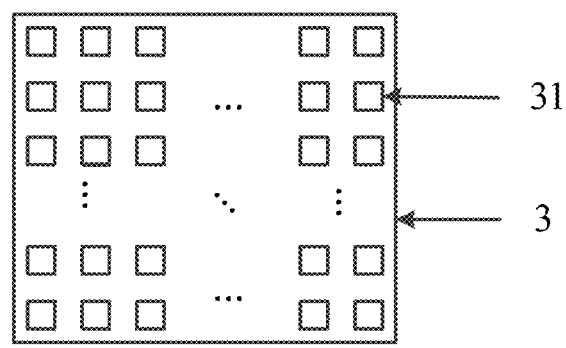
FIG. 5 is a schematic diagram showing an arrangement of micromirrors in a light valve, in accordance with some embodiments.

The light valve 3 is, for example, a digital micromirror device (DMD). As shown in FIG. 5, the light valve 3 includes a large number of micromirrors 31 that may be arranged in an array. Each micromirror 31 corresponds to a respective pixel in a sub-pixel image.

For example, the display control circuit 1 may be configured to generate image display signals according to the plurality of sub-images, which may be converted into digital signals such as 0 or 1 to drive the micromirrors 31 to rotate.

Figure 6:
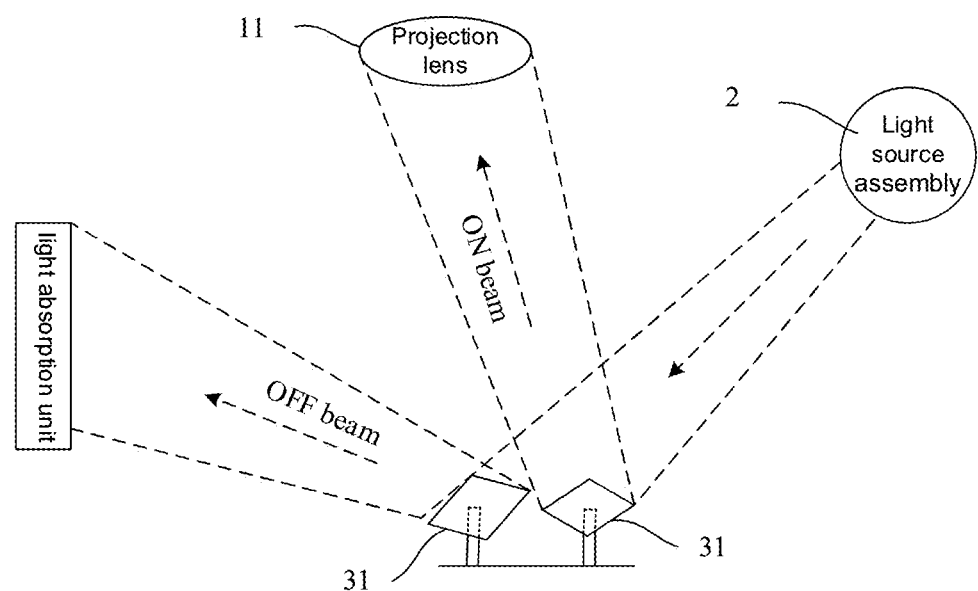
FIG. 6 is a schematic diagram of micromirrors in respective tilted positions in the light valve shown in FIG. 5.

As shown in FIG. 6, in a digital light processing (DLP) projection architecture, each micromirror 31 is equivalent to a digital switch. The micromirror 31 may rotate to plus or minus 10 degrees (i.e., ±10°), plus or minus 12 degrees (i.e., ±12°) or plus or minus 17 degrees (i.e., ±17°) due to, for example, an electro-static attraction.

Figure 7:
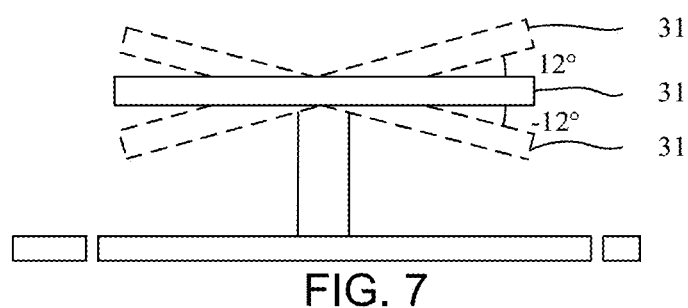
FIG. 7 is a schematic diagram of tilted angles of a micromirror, in accordance with some embodiments.

As shown in FIGS. 6 and 7, a beam reflected by the micromirror 31 at a negative rotation angle is referred to as an OFF beam. The OFF beam is an ineffective beam that is irradiated on a housing of the projection apparatus, a casing for receiving the light valve 3, or a laser absorber. A beam reflected by the micromirror 31 at a positive rotation angle is referred to as an ON beam. The ON beam is an effective beam that is reflected to a projection lens 11 (which will be described in detail below) of the projection apparatus and used to form an image.

The micromirror 31 is in an ON state when a beam emitted by the light source assembly 2 is an ON beam. That is, the beam enters the projection lens 11 after being reflected by the micromirror 31. The micromirror 31 is in an OFF state when a beam emitted by the light source assembly 2 is an OFF beam. That is, the beam fails to enter the projection lens 11 after being reflected by the micromirror 31. For example, for a micromirror 31 that can rotate to +12° or −12°, a state of the micromirror 31 at +12° is the ON state, and a state thereof at −12° is the OFF state. For a micromirror 31 that is at a rotation angle between −12° and +12°, it is not used in practice, and actual operation states of the micromirror 31 are only the ON state and the OFF state. For a micromirror 31 that can rotate to +17° or −17°, a state of the micromirror 31 at +17° is the ON state, and a state thereof at −17° is the OFF state.

In a display period of the image formed through superimposition of the plurality of sub-images, a pixel of a sub-image corresponds to a micromirror 31, and gray scales of pixels in the sub-image may be achieved according to durations of the micromirrors 31 in the ON state and the OFF state. For example, pixels of the sub-image each have 256 gray scales from 0 to 255, a pixel corresponding to a micromirror 31 that is in the OFF state throughout the display period of the sub-image displays gray scale 0; a pixel corresponding to a micromirror 31 that is in the ON state throughout the display period of the sub-image displays gray scale 255; and a pixel corresponding to a micromirror 31 that is in the ON state for a half of time and in the OFF state for the other half of time in the display period of the sub-image displays gray scale 127. Therefore, by controlling a state in which a micromirror 31 in the light valve 3 is and a duration when the micromirror 31 is in each state in the display period of the sub-image according to driving signals, brightness (the gray scale) of a pixel corresponding to the micromirror 31 may be controlled, and a purpose of modulating the beam reaching the light valve 3 may be achieved.

Vibrating Lens 5

The vibrating lens 5 may be configured to rotate its lens in response to at least one vibrating lens driving current from the vibrating lens drive assembly 4 to deflect the projection beams reflected by the light valve 3. The vibrating lens 5 will be described below with examples in conjunction with the drawings. However, the structure of the vibrating lens 5 is not limited thereto, as long as it can achieve its function.

Figure 8:
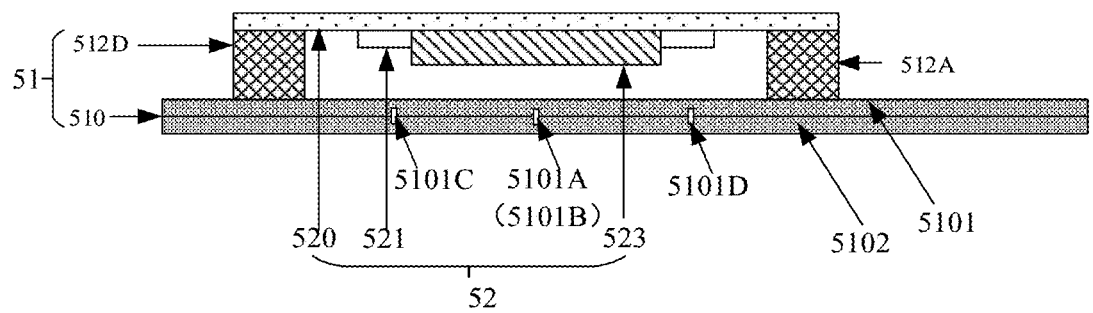
FIG. 8 is a partial schematic diagram of a vibrating lens, in accordance with some embodiments.
Figure 13:
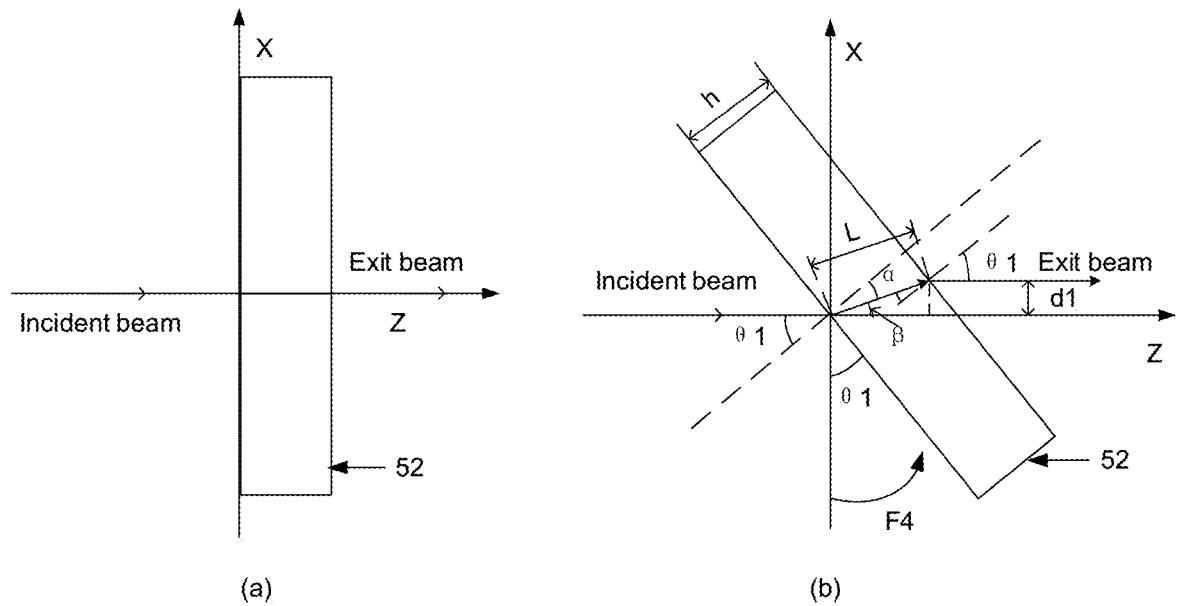
FIG. 13 is a schematic diagram of a light-transmissive assembly in a vibrating lens rotating counterclockwise with a second axis as a rotation axis, in accordance with some embodiments.

In some embodiments, as shown in FIGS. 8 and 13, the vibrating lens 5 includes a control assembly 51 and a light-transmissive assembly 52 connected to a side of the control assembly 51 with a gap therebetween. The control assembly 51 is electrically connected to the vibrating lens drive assembly 4, and is configured to control the light-transmissive assembly 52 to rotate according to the at least one vibrating lens driving current. The light-transmissive assembly 52 is configured to rotate about at least one axis as a rotation axis as driven by the control assembly 51.

For example, the control assembly 51 is configured to control the light-transmissive assembly 52 to switch between at least one rotation state (corresponding to at least one rotation axis about which the light-transmissive assembly 52 is rotated) and a non-rotating state (i.e., an initial state) at a preset frequency. The light-transmissive assembly 52 is configured to deflect a projection beam reflected by the light valve 3 when the light-transmissive assembly 52 is at a rotation state. The preset frequency is a reciprocal of a duration from a state, corresponding to a first sub-image of the image, of the light-transmissive assembly 52 to a state, corresponding to a last sub-image of the image, of the light-transmissive assembly 52. The duration may be set according to the response duration of human eyes.

The control assembly 51 and the light-transmissive assembly 52 will be illustrated below by examples with reference to FIGS. 8 to 13.

Figure 9:
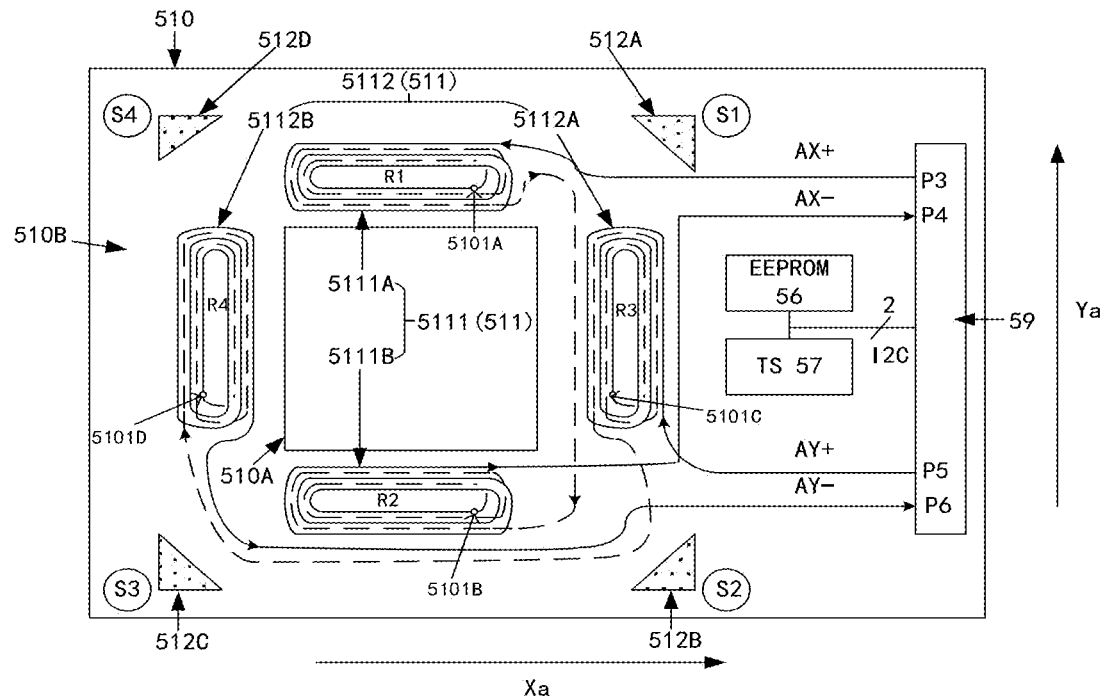
FIG. 9 is a schematic diagram of the control assembly in the vibrating lens shown in FIG. 8.

In some embodiments, as shown in FIGS. 8 and 9, the control assembly 51 includes a substrate 510 and a control coil 511. The substrate 510 has a first opening 510A and a first edge region 510B surrounding the first opening 510A. The first opening 510A is configured to allow the projection beams reflected by the light valve 3 to pass through. The control coil 511 is located on the first edge region 510B. The substrate 510 is, for example, a printed circuit board (PCB).

Figure 10:
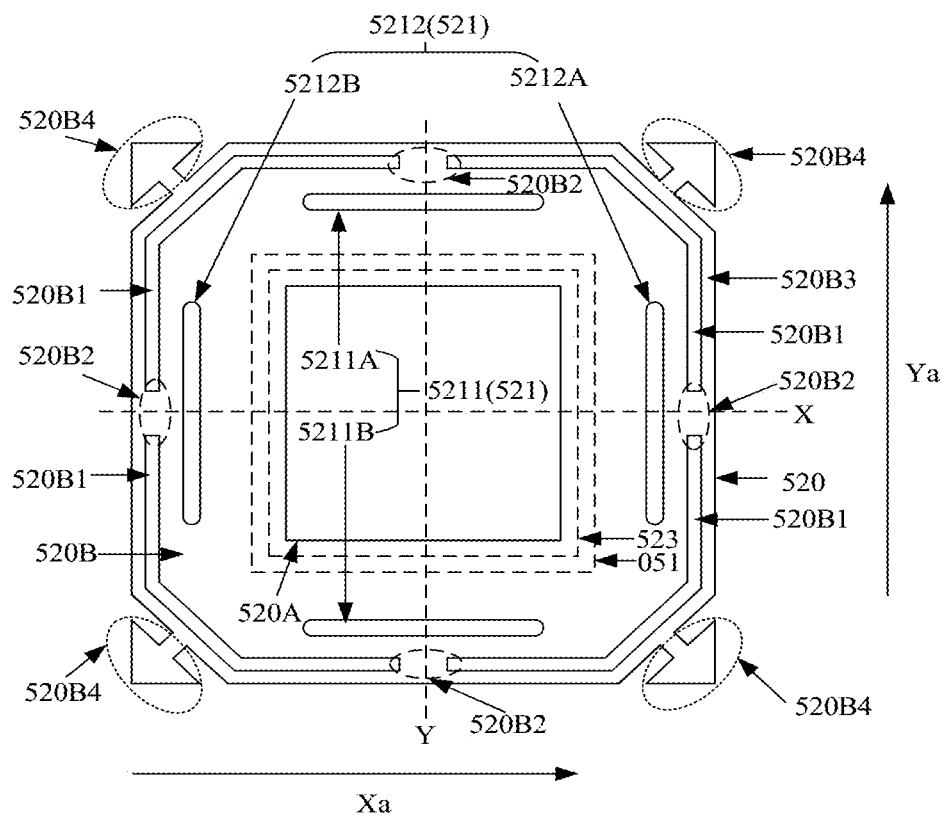
FIG. 10 is a schematic diagram of the light-transmissive assembly in the vibrating lens shown in FIG. 8.

As shown in FIGS. 8 and 10, the light-transmissive assembly 52 may include a bearing plate 520 and a magnetic assembly 521. The bearing plate 520 has a second opening 520A and a second edge region 520B surrounding the second opening 520A. The second opening 520A is also configured to allow the projection beams reflected by the light valve 3 to pass through. The magnetic assembly 521 is located on the second edge region 520B. The control coil 511 is configured to interact with the magnetic assembly 521 as driven by the at least one vibrating lens driving current, so as to control the light-transmissive assembly 52 to rotate about the at least one axis as the rotation axis. The first opening 510A and the second opening 520A may also be referred to as light through holes.

As shown in FIGS. 8 and 10, the light-transmissive assembly 52 may further includes a lens 523 covers the second opening 520A. The lens 523 is configured to transmit the projection beam reflected by the light valve 3.

In some examples, the control coil 511 includes at least one coil group, and the magnetic assembly 521 includes at least one magnet group. Each coil group is configured to interact with a respective magnet group as driven by the respective vibrating lens driving current, so as to drive the light-transmissive assembly 52 to rotate about a respective axis as the rotating axis.

For example, the at least one coil group includes a plurality of coil groups (e.g., two coil groups shown in FIG. 9, which are a first coil group 5111 and a second coil group 5112). The at least one magnet group includes a plurality of magnet groups (e.g., two magnet groups shown in FIG. 10, which are a first magnet group 5211 and a second magnet group 5212) fixed at a side of the bearing plate 520 closer to the control assembly 51.

For another example, the at least one coil group includes one coil group (e.g., the first coil group 5111 or the second coil group 5112), and the at least one magnet group includes one magnet group (e.g., the first magnet group 5211 or the second magnet group 5212). However, the structures of the at least one coil group and the at least one magnet group are not limited thereto, and other structures may be used. For example, the at least one coil group includes a plurality of coil groups and the at least one magnet group includes one magnet group.

The bearing plate 520 is made of, for example, a metallic material, such as iron, cobalt, or nickel. Ends of the at least one magnet group proximate to the bearing plate 520 have a same polarity, and ends of the at least one magnet group away from the bearing plate 520 have another same polarity. For example, the ends of the at least one magnet group proximate to the bearing plate 520 are all N poles, and the ends of at least one magnet group away from the bearing plate 520 are all S poles. Alternatively, the ends of the at least one magnet group proximate to the bearing plate 520 are all S poles, and the ends of the at least one magnet group away from the bearing plate 520 are all N poles.

In some examples, in order to enable the lens 523 to transmit the projection beams reflected by the light valve 3, an orthogonal projection of the lens 523 on a plane parallel to a surface of the substrate 510 away from the lens 523 and an orthogonal projection of the second opening 520A on the plane both coincide with an orthogonal projection of the first opening 510A on the plane. For example, a center point of the orthogonal projection of the lens 523 on the plane and a center point of the orthogonal projection of the second opening 520A on the plane both coincide with a center point of the orthogonal projection of the first opening 510A on the plane.

The shapes of the first opening 510A and the second opening 520A may each be an axisymmetric shape such as a square, a rectangle or a circle. The lens 523, the first opening 510A, and the second opening 520A may be of the same shape, such as a square, a rectangle or a circle. As shown in FIG. 10, the shape of the lens 523 is, for example, a square.

For example, a transmittance of the lens 523 is greater than or equal to 98%, such as 98%, 98.5% or 99%, and a thickness of the lens 523 may be in a range of 1.95 mm to 2.05 mm, such as 1.95 mm, 2.00 mm or 2.05 mm. For light with a wavelength of 590 nanometers (nm), a refractive index of the lens 523 may be 1.523.

A size of the first opening 510A depends on a size of the light spot in the optical path of the projection apparatus, that is, a size of the projection beam after being totally reflected by the light valve 3. For example, the size of the first opening 510A is greater than the size of the light spot, and the size of the first opening 510A is greater than the size of the lens 523, so as to ensure that the projection beams after being totally reflected by the light valve 3 can be completely projected onto a projection screen without loss of brightness. The dotted line region 051 shown in FIG. 10 may have the same size as the first opening 510A.

For example, the size of the lens 523 is greater than the size of the second opening 520A, so that the lens 523 may cover the second opening 520A. For example, the size of the lens 523 may be 23 mm×23 mm, the size of the first opening 510A may be 24 mm×24 mm, and the size of the second opening 520A may be 21 mm×21 mm.

It will be noted that, in the example, the orthogonal projection of the lens 523 on the plane parallel to the substrate 510 and the orthogonal projection of the second opening 520A on the plane are both located within the orthogonal projection of the first opening 510A on the plane, and the orthogonal projection of the second opening 520A on the plane is located within the orthogonal projection of the lens 523 on the plane. In this case, the center point of the orthogonal projection of the lens 523 on the plane and the center point of the orthogonal projection of the second opening 520A on the plane may coincide with the center point of the orthogonal projection of the first opening 510A on the plane.

The at least one magnet group in the light-transmissive assembly 52 are located on the second edge region 520B. The at least one magnet group corresponds to the at least one coil group on the substrate 510, and an orthogonal projection of each magnet group on the substrate 510, for example, overlaps with region(s) enclosed by a respective coil group.

Each coil group may include one or more coils, and each coil may have n0 turns, and n0 is a positive integer. In addition, the number of turns, the diameter of the wire, the wiring shape, and the number of wiring layers of each coil may be designed according to actual needs.

In some examples, in order to achieve the misalignment and superimposition of the plurality of sub-images, central points of different sub-images may be at different positions of a projection coordinate system. In this case, the light-transmissive assembly 52 may rotate along at least two rotation axes that intersect (e.g., perpendicular) to achieve the offset of different sub-images.

The structure of the light-transmissive assembly 52 will be described below by considering an example in which the light-transmissive assembly 52 may rotate along two rotation axes, i.e., a first axis X and a second axis Y. For convenience of description, the following embodiments of the present disclosure are described by taking an example in which the first axis X (extending in the Xa direction in FIG. 10) and the second axis Y (extending in the Ya direction in FIG. 10) are perpendicular to each other. However, the first axis X and the second axis Y may not be perpendicular to each other, and the angle between the first axis X and the second axis Y is not limited, as long as the first axis X and the second axis Y are not parallel.

For example, as shown in FIG. 10, the first axis X may be a central axis of the light-transmissive assembly 52 extending in a horizontal direction or may be parallel to the central axis extending in the horizontal direction, and the second axis Y may be a central axis of the light-transmissive assembly 52 extending in a vertical direction or may be parallel to the central axis extending in the vertical direction.

The following description will be made by considering an example in which the control assembly 51 includes two coil groups (i.e., the first coil group 5111 and the second coil group 5112 as shown in FIG. 9), and each coil group includes two coils.

The first coil group 5111 is configured to control the light-transmissive assembly 52 to rotate about the first axis X as the rotation axis as driven by a first vibrating lens driving current. The second coil group 5112 is configured to control the light-transmissive assembly 52 to rotate about the second axis Y as the rotation axis as driven by a second vibrating lens driving current.

For example, the light-transmissive assembly 52 includes a first magnet group 5211 and a second magnet group 5212 as shown in FIG. 10. The first magnet group 5211 corresponds to the first coil group 5111, and the second magnet group 5212 corresponds to the second coil group 5112.

For example, as shown in FIG. 9, the first coil group 5111 may include a first coil 5111A and a second coil 5111B, and the first coil 5111A and the second coil 5111B are disposed at two opposite sides of the first opening 510A in the Ya direction. Correspondingly, as shown in FIG. 10, the first magnet group 5211 may include a first magnet 5211A and a second magnet 5211B, and the first magnet 5211A and the second magnet 5211B are disposed at two opposite sides of the second opening 520A in the Ya direction. A region where an orthogonal projection of the first magnet 5211A on the substrate 510 is located may be referred to as a first magnet region R1, and a region where an orthogonal projection of the second magnet 5211B on the substrate 510 is located may be referred to as a second magnet region R2. The first coil 5111A is disposed around the first magnet region R1, and the second coil 5111B is disposed around the second magnet region R2.

For example, as shown in FIG. 9, one end of the first coil 5111A is connected to a positive electrode AX+, the other end of the first coil 5111A is connected to one end of the second coil 5111B, and the other end of the second coil 5111B is connected to a negative electrode AX−. The first coil 5111A and the second coil 5111B may be connected in series to constitute a current channel. In this case, the first vibrating lens driving current may transmit in the current channel to drive the light-transmissive assembly 52 to rotate about the first axis X as the rotation axis.

Similarly, as shown in FIG. 9, the second coil group 5112 may include a third coil 5112A and a fourth coil 5112B, and the third coil 5112A and the fourth coil 5112B are disposed at two opposite sides of the first opening 510A in the Xa direction. Correspondingly, the second magnet group 5212 may include a third magnet 5212A and a fourth magnet 5212B, and the third magnet 5212A and the fourth magnet 5212B are disposed at two opposite sides of the second opening 520A in the Xa direction. A region where an orthogonal projection of the third magnet 5212A on the substrate 510 is located may be referred to as a third magnet region R3, and a region where an orthogonal projection of the fourth magnet 5212B on the substrate 510 is located may be referred to as a fourth magnet region R4. The third coil 5112A is disposed around the third magnet region R3, and the fourth coil 5112B is disposed around the fourth magnet region R4.

For example, one end of the third coil 5112A is connected to a positive electrode AY+, the other end of the third coil 5112A is connected to one end of the fourth coil 5112B, and the other end of the fourth coil 5112B is connected to a negative electrode AY−. The third coil 5112A and the fourth coil 5112B may be connected in series to constitute another current channel. In this case, the second vibrating lens driving current may transmit in the current channel to drive the light-transmissive assembly 52 to rotate about the second axis Y as the rotation axis.

For example, as shown in FIGS. 9 and 10, magnets included in the first magnet group 5211 and the second magnet group 5212 are strip-shaped magnets. Correspondingly, the region enclosed by each of the coils included in the first coil group 5111 and the second coil group 5112 is a strip-shaped region. In this case, long sides of the magnets included in the first magnet group 5211 and long sides of a region enclosed by each of the coils included in the first coil group 5111 are parallel to the first axis X, and long sides of the magnets included in the second magnet group 5212 and long sides of a region enclosed by each of the coils included in the second coil group 5112 are parallel to the Y axis.

In some examples, the substrate 510 may include a plurality of sub-substrates (e.g., a first sub-substrate 5101 and a second sub-substrate 5102 shown in FIG. 8) arranged in a thickness direction of the substrate 510. The plurality of coil groups includes a first coil group 5111 and a second coil group 5112 disposed on each sub-substrate. Moreover, the first coil group 5111 on the sub-substrate includes a first coil 5111A and a second coil 5111B, and the second coil group 5112 on the sub-substrate includes a third coil 5112A and a fourth coil 5112B.

Coils on sub-substrates of different layers may be connected through at least one via hole (e.g., first via holes 5101A, 5101B and second via holes 5101C, 5101D shown in FIGS. 8 and 9). For example, the plurality of sub-substrates includes the first sub-substrate 5101 and the second sub-substrate 5102. The first coil 5111A on the first sub-substrate 5101, the first coil 5111A on the second sub-substrate 5102, the second coil 5111B on the first sub-substrate 5101, and the second coil 5111B on the second sub-substrate 5102 may be connected through via holes to constitute a continuous coil.

Referring to FIG. 9, the wiring of each coil on the first sub-substrate 5101 (i.e., the top wiring) is indicated by a solid line, and the wiring of each coil on the second sub-substrate (i.e., the bottom wiring) is indicated by a dotted line. One end of the first coil 5111A on the first sub-substrate 5101 is electrically connected to a pin P3 (i.e., the positive electrode AX+) of a socket 59, and the other end of the first coil 5111A on the first sub-substrate 5101 is electrically connected to one end of the first coil 5111A on the second sub-substrate 5102 through a first via hole 5101A. The other end of the first coil 5111A on the second sub-substrate 5101 is electrically connected to one end of the second coil 5111B on the second sub-substrate 5102, and the other end of the second coil 5111B on the second sub-substrate 5102 is electrically connected to one end of the second coil 5111B on the first sub-substrate 5101 through another first via hole 5101B. The other end of the second coil 5111B on the first sub-substrate is electrically connected to a pin P4 (i.e., the negative electrode AX−) of the socket 59. The socket 59 is configured to provide the first vibrating lens driving current to the first coils 5111A and the second coils 5111B, so that the first coils 5111A and the second coils 5111B control the light-transmissive assembly 52 to rotate about the first axis X as the rotation axis.

Further, for example, referring to FIG. 9, a coil leads from the pin P3 of the socket 59, and winds n0 turns in the counterclockwise direction on the first sub-substrate 5101 to form the first coil 5111A on the first sub-substrate. Then, the coil on the first sub-substrate 5101 is connected to a coil on the second sub-substrate 5102 through the first via hole 5101A. Moreover, the coil on the second sub-substrate 5102 winds n0 turns in the counterclockwise direction to form the first coil 5111A on the second sub-substrate 5102. Then, the coil on the second sub-substrate 5102 winds n0 turns in the clockwise direction to form the second coil 5111B on the second sub-substrate 5102. Afterwards, the coil on the second sub-substrate 5102 is connected to the coil on the first sub-substrate 5102 through another first via hole 5101B, and the coil on the first substrate 5101 winds n0 turns in the clockwise direction to form the second coil 5111B on the first sub-substrate 5101. Finally, the coil on the first sub-substrate 5101 is connected to the pin P4 of the socket 59.

Similarly, one end of the third coil 5112A on the first sub-substrate 5101 is electrically connected to a pin P5 (i.e., the positive electrode AY+) of the socket 59; the other end of the third coil 5112A on the first sub-substrate 5101 is electrically connected to one end of the third coil 5112A on the second sub-substrate 5102 through a second via hole 5101C; the other end of the third coil 5112A on the second sub-substrate 5102 is electrically connected to one end of the fourth coil 5112B on the second sub-substrate 5102; the other end of the fourth coil 5112B on the second sub-substrate 5102 is electrically connected to one end of the fourth coil 5112B on the first sub-substrate 5101 through another second via hole 5101D; the other end of the fourth coil 5112B on the first sub-substrate 5101 is electrically connected to a pin P6 (i.e., the negative electrode AY−) of the socket 59. The socket 59 is further configured to provide the second vibrating lens driving current to the third coils 5112A and the fourth coils 5112B, so that the third coils 5112A and the fourth coils 5112B control the light-transmissive assembly 52 to rotate about the second axis Y as the rotation axis.

The substrate 510 may include an even-number of sub-substrates arranged in the thickness direction of the substrate 510. For example, the substrate 510 may include two sub-substrates, four sub-substrates, or eight sub-substrates. The number of the sub-substrates is not limited in the embodiments of the present disclosure. By increasing the number of the sub-substrates, it may be possible to increase the number of turns of the coils, increase the magnetic field around a corresponding magnet group, and thus increase a magnetic force that drives the light-transmissive assembly 52 to rotate. Alternatively, in a case where the thickness of the substrate 510 is fixed, the number of the sub-substrates may be increased by reducing the dimension (i.e., a thickness) of each sub-substrate to ensure that the number of turns of the coils is not changed, thereby ensuring that a magnetic force generated by a magnetic field between magnets corresponding to the coils is not changed.

In the embodiments of the present disclosure, the substrate 510 is taken as an example, and each coil may be printed on the substrate 510 in a way that any two adjacent turns of the coil have a three-dimensional gap therebetween. That is, the winding of each coil group (e.g., the first coil group 5111 and the second coil group 5112) is achieved by routing wires on the substrate 510, so as to simplify the process and greatly reduce the cost. In addition, since there is a three-dimensional gap between any two adjacent turns of the coil, after the coil group is energized, the winding manner helps the coils in the coil group to dissipate heat, thereby avoiding a problem that the rotation of the light-transmissive assembly 52 in the vibrating lens 5 is affected due to an excessive temperature of the coils, and improving the accuracy and the reliability of the rotation of the light-transmissive assembly 52. The wiring material on the substrate 510 is copper, and a non-wiring region of each sub-substrate is grounded with copper to achieve effective heat dissipation. Therefore, after the coil group is energized, the substrate 510 can rapidly dissipate heat in a large region, thereby further improving the accuracy and the reliability of the rotation of the light-transmissive assembly 52.

Figure 11:
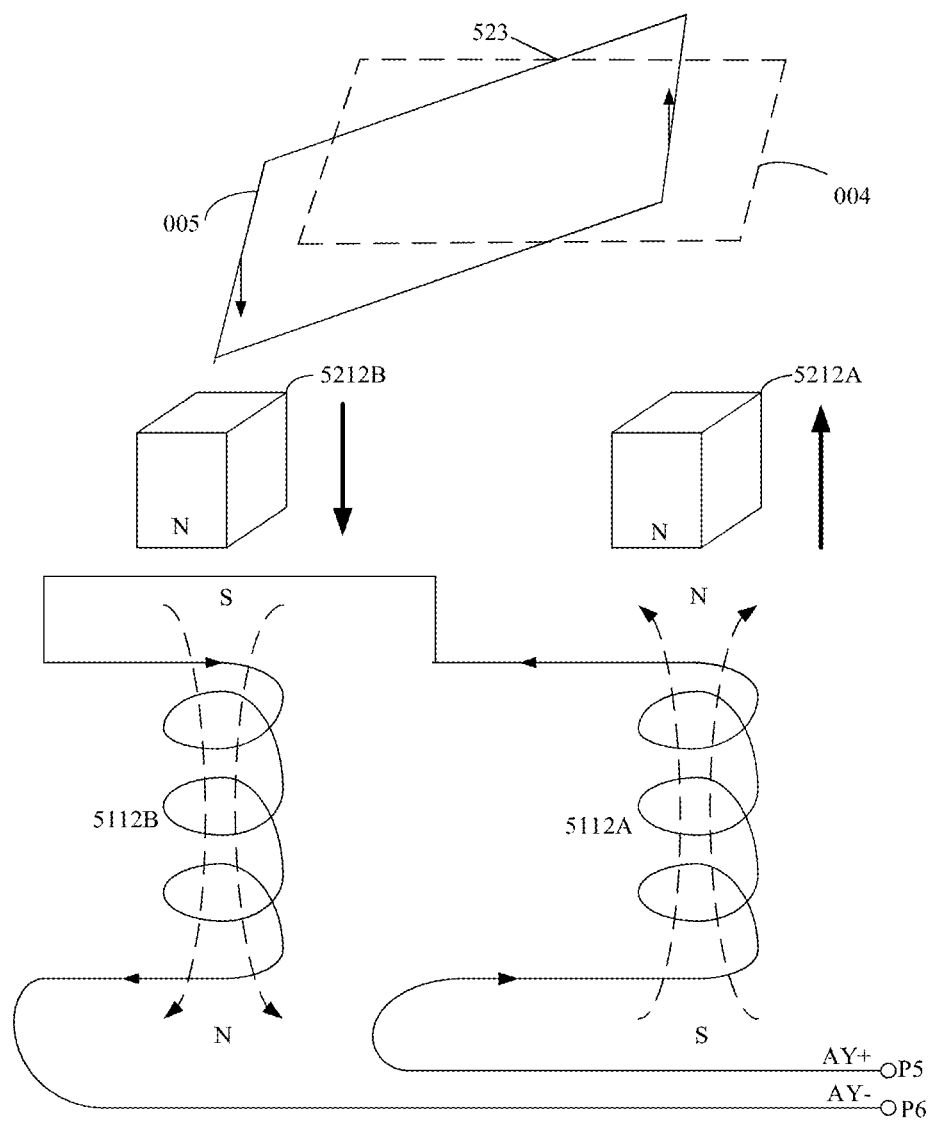
FIG. 11 is a schematic diagram showing a rotational principle of the light-transmissive assembly in the vibrating lens shown in FIG. 8.

In the following, the driving process of the vibrating lens 5 will be described by considering an example where the light-transmissive assembly 52 of the vibrating lens 5 rotates about the second axis Y as the rotation axis. For convenience of description, the second magnet group 5212 and the lens 523 that is attached to the bearing plate 520 shown in FIG. 10 are shown separately in FIG. 11. Referring to FIG. 11, ends of the second magnet group 5212 of the light-transmissive assembly 52 proximate to the second coil group 5112 are N poles. That is, an end of the third magnet 5212A proximate to the third coil 5112A, and an end of the fourth magnet 5212B proximate to the fourth coil 5112B are N poles.

As shown in FIG. 11, when there is no current flowing through the current channel formed by the third coil 5112A and the fourth coil 5112B connected in series, the lens 523 is at a position 004 (i.e., an initial position).

When there is a forward current flowing through the current channel formed by the third coil 5112A and the fourth coil 5112B connected in series, that is, when the current flows from the pin P5 (i.e., a positive electrode AY+) of the socket 59 to the current channel and then flows to the pin P6 (i.e., a negative electrode AY−) of the socket 59, both the third coil 5112A and the fourth coil 5112B generate magnetic fields.

According to the Ampere's Law and a current direction of the third coil 5112A, when the third coil 5112A is held by the right hand, a bending direction of the four fingers of the right hand coincides with the current direction of the third coil 5112A, and an end pointed by the thumb of the right hand is the N pole. That is, a side of the third coil 5112A proximate to the lens 523 is the N pole, and a side of the third coil 5112A away from the lens 523 is the S pole. According to the Ampere's Law and a current direction of the fourth coil 5112B, it may be determined that a side of the fourth coil 5112B away from the lens 523 is the N pole, and a side of the fourth coil 5112B proximate to the lens 523 is the S pole.

Referring to FIG. 11, since the side of the third coil 5112A proximate to the lens 523 is the N pole, and an end of the third magnet 5212A proximate to the third coil 5112A is the N pole, a repulsive force is generated between the third coil 5112A and the third magnet 5212A. Since the third coil 5112A is fixed on the substrate 510, and the substrate 510 is fixed on a structural member (e.g., a housing), the third coil 5112A will not move. According to the principle of the force and the reaction force, the third magnet 5212A receives a repulsive force, so that the third magnet 5212A drives the lens 523 to move in a direction away from the third coil 5112A. Similarly, since a side of the fourth coil 5112B proximate to the lens 523 is the S pole, and an end of the fourth magnet 5212B proximate to the fourth coil 5112B is the N pole, an attractive force is generated between the fourth coil 5112B and the fourth magnet 5212B, and the fourth magnet 5212B receives the attractive force to drive the lens 523 to move in a direction toward the fourth coil 5112B.

In this process, two sides of the lens 523 in the Xa direction are simultaneously subjected to forces that drive the lens 523 to rotate counterclockwise. Driven by the force, the lens 523 rotates in the counterclockwise direction with the second axis Y as the rotation axis, until an interaction force between the substrate 510 and the bearing plate 520 is balanced, and the lens 523 stops rotating and remains stationary. Therefore, the lens 523 rotates from the position 004 to a position 005 shown in FIG. 11, which may realize the shift of the projection beam, that is, realize the movement of the light spot, and thereby further realize the movement of the position of the sub-image on the projection screen.

Figure 12:
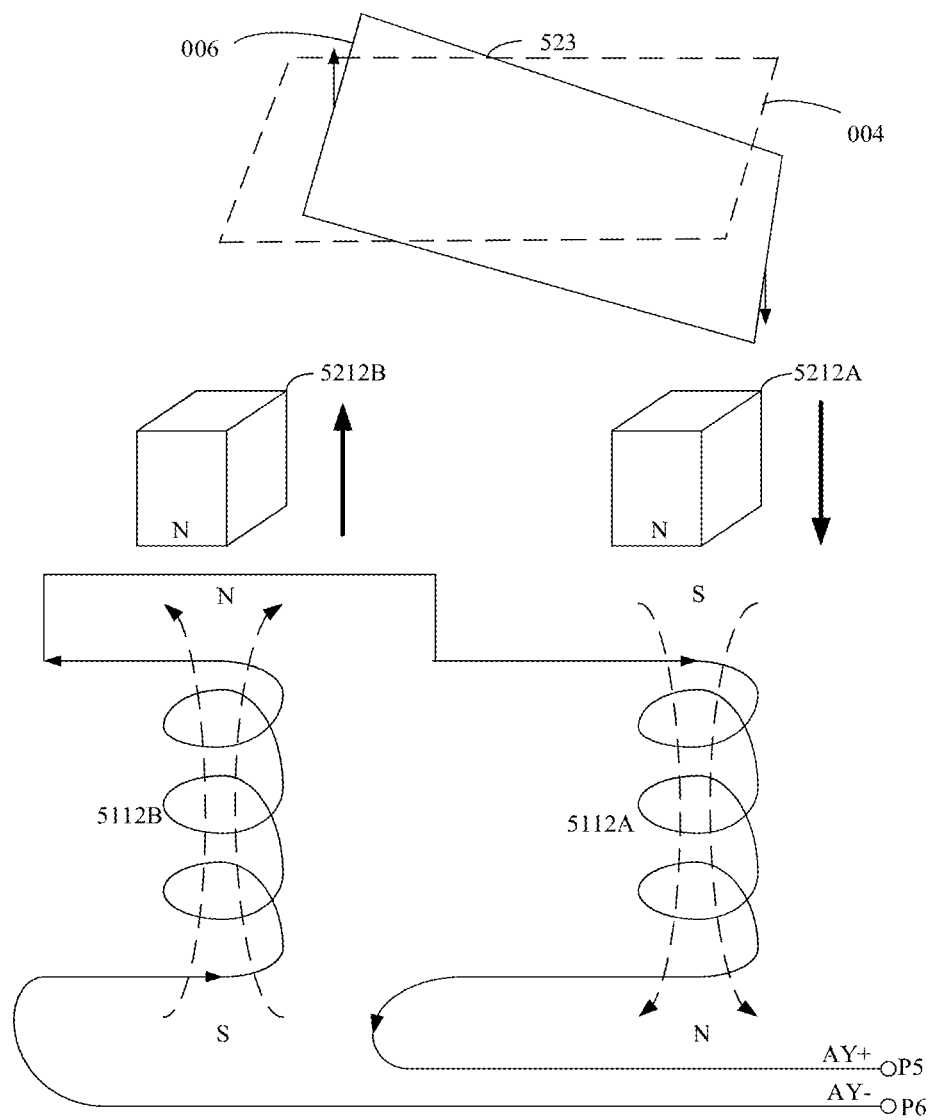
FIG. 12 is another schematic diagram showing the rotational principle of the light-transmissive assembly in the vibrating lens shown in FIG. 8.

As shown in FIG. 12, when there is a reserve current flowing through the current channel formed by the third coil 5112A and the fourth coil 5112B connected in series, that is, when the current flows to the current channel from the pin P6 (i.e., the negative electrode AY−) of the socket 59 and then to the pin P5 (i.e., the positive electrode AY+) of the socket 59, both the third coil 5112A and the fourth coil 5112B generate magnetic fields.

According to the Ampere's Law and the current direction of the third coil 5112A, it may be determined that the side of the third coil 5112A away from the lens 523 is the N pole and the side of the third coil 5112A proximate to the lens 523 is the S pole. According to the Ampere's Law and the current direction of the fourth coil 5112B, it may be determined that the side of the fourth coil 5112B proximate to the lens 523 is the N pole, and the side of the fourth coil 5112B away from the lens 523 is the S pole.

Referring to FIG. 12, since the side of the third coil 5112A proximate to the lens 523 is the S pole, and the end of the third magnet 5212A proximate to the third coil 5112A is the N pole, an attraction force is generated between the third coil 5112A and the third magnet 5212A. Since the third coil 5112A is fixed on the substrate 510, and the substrate 510 is fixed on a structural member (e.g., the housing), the third coil 5112A will not move. According to the principle of the force and the reaction force, the third magnet 5212A receives the attraction force to rotate the lens 523 in a direction toward the third coil 5112A. Similarly, since the side of the fourth coil 5112B proximate to the lens 523 is the N pole, and the end of the fourth magnet 5212B proximate to the fourth coil 5112B is the N pole, a repulsive force is generated between the fourth coil 5112B and the fourth magnet 5212B. The fourth magnet 5212B receives the repulsive force to rotate the lens 523 in a direction away from the fourth coil 5112B.

In this process, both sides of the lens 523 in the Xa direction are simultaneously subjected to forces that drive the lens 523 to rotate clockwise. Driven by the force, the lens 523 rotates in a clockwise direction with the second axis Y as the rotation axis, until the interaction force between the substrate 510 and the bearing plate 520 is balanced, and the lens 523 stops rotating and remains stationary. Therefore, the lens 523 rotates from the position 004 to a position 006 shown in FIG. 12, which may realize the shift of the projection beam, that is, the movement of the laser spot, and thereby further realize the movement of the position of the sub-image on the projection screen.

Similarly, the process of the light-transmissive assembly 52 in the vibrating lens 5 rotating about the first axis X as the rotation axis may be referred to the process of the light-transmissive assembly 52 rotating about the second axis Y as the rotation axis, which will not be repeated here.

In the embodiments of the present disclosure, as shown in FIG. 13, a direction in which the beam exits from the vibrating lens 5 is a Za direction (i.e., a direction where the third axis Z is located). It is assumed that the thickness of the lens 523 is h, the refractive index of the lens 523 is n, a length of the refracted light inside the lens 523 is L, and a refractive angle is α. As shown in part (a) in FIG. 13, the light-transmissive assembly 52 in the vibrating lens 5 does not rotate, the beam is vertically incident along the direction in which the third axis Z is located (i.e., the Za direction), and both the first axis X (i.e., the Xa direction) and the second axis Y (i.e., the Ya direction) of the vibrating lens 5 are perpendicular to the incident beam. The incident beam directly exits in a direction perpendicular to the first axis X and the second axis Y to form an exit beam. As shown in part (b) in FIG. 13, the light-transmissive assembly 52 in the vibrating lens 5 is rotated by a first angle θ1 in a counterclockwise direction (i.e., the F4 direction) with the second axis Y as the rotation axis, since the incident beam is incident along the Za direction, an incident angle of the incident beam is equal to the first angle θ1 according to a right angle relationship. Since the normals of the two surfaces of the lens 523 are parallel, the incident angle of refracted light inside the lens 523 is α. According to the law of refraction, an exit angle of the beam emitted from the lens 523 is equal to the incident angle θ1. Therefore, the incident beam exits from the lens 523 along the Za direction. In this case, compared with the state shown in part (a) in FIG. 16, an offset distance of the beam exit in the positive direction of the Xa direction is d1, and d1 is also the offset distance of the pixels in the sub-image on the projection screen.

It is assumed that an included angle between the internal refracted light of the lens 523 and the Za direction is β, and the refraction angle is α, the light-transmissive assembly 52 in the vibrating lens 5 rotates counterclockwise by a first angle θ1 with the second axis Y as the rotation axis. Then, β=θ1−α, and the refractive index $$n = \frac{\sin\theta 1}{\sin\alpha}.$$

A length of the internal refracted light of the light-transmissive assembly 52 is $$L = \frac{h}{\cos\alpha}.$$

In this case, $$d1 = L \times \sin\beta = \frac{h}{\cos\alpha} \times \sin(\theta 1 - \alpha) = \frac{h}{\cos\alpha} \times (\sin\theta 1 \cos\alpha - \cos\theta 1 \sin\alpha) =$$

$$\frac{h}{\cos\alpha} \times \left(\sin\theta 1 \cos\alpha - \cos\theta 1 \frac{\sin\theta 1}{n}\right) = h \times \sin\theta 1 \times \left(1 - \frac{\cos\theta 1}{n \times \cos\alpha}\right) =$$

$$h \times \sin\theta 1 \times \left(1 - \frac{\cos\theta 1}{n \times \sqrt{1 - \frac{\sin^2\theta 1}{n^2}}}\right) =$$

$$h \times \sin\theta 1 \times \left(1 - \frac{\sqrt{1 - \sin^2\theta 1}}{n \times \frac{\sqrt{n^2 - \sin^2\theta 1}}{n}}\right) =$$

$$h \times \sin\theta 1 \times \left(1 - \frac{\sqrt{1 - \sin^2\theta 1}}{\sqrt{n^2 - \sin^2\theta 1}}\right).$$

It can be seen from the formula that the offset distance d1 of the sub-image is only related to the rotation angle θ1 of the light-transmissive assembly 52 (or the lens 523), the refractive index n of the lens 523, and a thickness h of the lens 523. After the vibrating lens 5 is assembled, the refractive index n and the thickness h of the lens 523 are both determined. Therefore, the offset distance d1 of the sub-image in the positive direction of the Xa direction mainly changes with the change of the rotation angle of the light-transmissive assembly 52 (or the lens 523).

According to the above description, when the light-transmissive assembly 52 in the vibrating lens 5 rotates about the second axis Y as the rotation axis, the projection beam passing through the vibrating lens 5 is offset in the Xa direction, and the offset distance of the projection beam changes with the change of the rotation angle of the light-transmissive assembly 52. When the light-transmissive assembly 52 in the vibrating lens 5 rotates about the first axis X as the rotation axis, the projection beam passing through the vibrating lens 5 is offset in the Ya direction, and the offset distance of the projection beam changes with the change of the rotation angle of the light-transmissive assembly 52.

Figure 14:
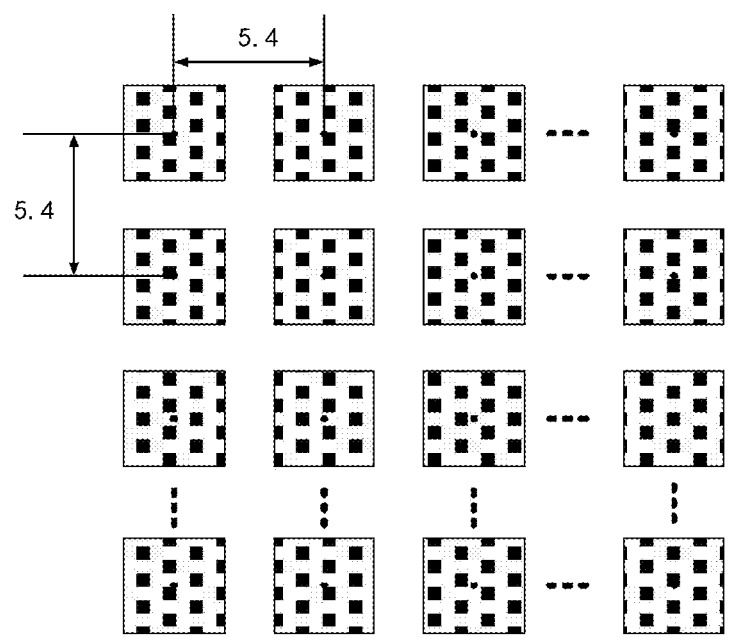
FIG. 14 is a schematic diagram of a 3K projection screen, in accordance with some embodiments.
Figure 15:
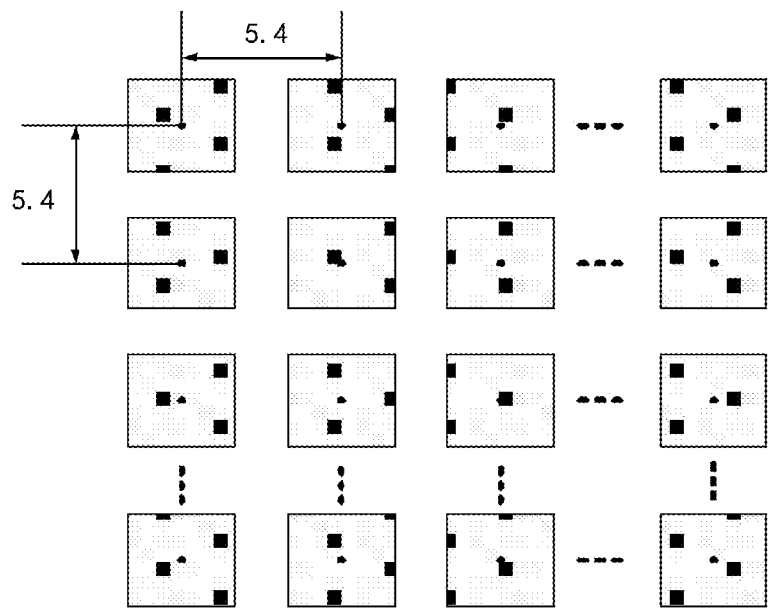
FIG. 15 is a schematic diagram of a 3K projection screen, in accordance with some embodiments.
Figure 16:
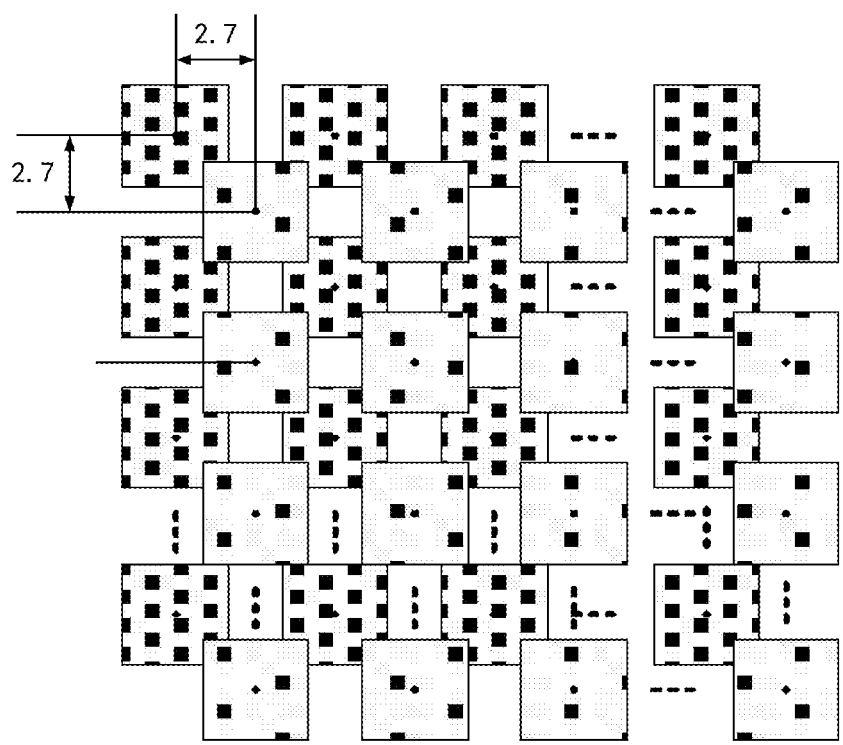
FIG. 16 is a schematic diagram of a 4K projection screen, in accordance with some embodiments.

For example, it is assumed that a side length of a pixel in the sub-image projected through a light valve 3 with a resolution of 3K is 5.4 microns (μm). When the light-transmissive assembly 52 in the vibrating lens 5 does not rotate, the projection beam reflected by the light valve 3 may directly pass through the vibrating lens 5, and arrangement of pixel points of the sub-image formed by the projection beam may be as shown in FIG. 14. In this case, the sub-image has a resolution of 3K. When the light-transmissive assembly 52 in the vibrating lens 5 rotates, if the light-transmissive assembly 52 rotates by rotation angles θ1 with the first axis X and the second axis Y as the rotation axes, the arrangement of pixel points of the sub-image formed by the projection beam may be as shown in FIG. 15. In this case, the sub-image also has a resolution of 3K. Since a rotation frequency of the light-transmissive assembly 52 is relatively high, the change between the projected sub-image after the light-transmissive assembly 52 rotates and the projected sub-image when the light-transmissive assembly 52 does not rotate is not easy to be distinguished by the human eyes. Therefore, the sub-image after the light-transmissive assembly 52 does not rotate and the sub-image after the light-transmissive assembly 52 rotates may present a superimposed effect. That is, the arrangement of the pixel points of sub-images may be as shown in FIG. 16, thereby achieving 4K resolution. In order to achieve an image with a resolution of 4K, in a case where the light-transmissive assembly 52 rotates by an angle θ1, the offset distance d1 of each pixel is equal to one half of the side length of the pixel, i.e., d1=2.7 μm.

Of course, the light-transmissive assembly 52 may also rotate about an axis where a diagonal of the light-transmissive assembly 52 is located. Included angles between the diagonal of the light-transmissive assembly 52 and the first axis X and between the diagonal of the light-transmissive assembly 52 and the second axis Y are both 45 degrees. When the light-transmissive assembly 52 does not rotate, the projection beams reflected by the light valve 3 may directly pass through the vibrating lens 5, and the arrangement of the pixel points of the sub-image formed by the projection beams may be as shown in FIG. 14. In this case, the sub-image has a resolution of 3K. When the light-transmissive assembly 52 rotates by the angle θ1 about the diagonal, the pixel points of the sub-image formed by the projection beams can be offset from the diagonal of the original picture by a distance of √2/2 pixel to form the sub-image as shown in FIG. 15, and the sub-image also has a resolution of 3K. The sub-image shown in FIG. 14 and the sub-image shown in FIG. 15 may be superimposed to form an image with a resolution of 4K as shown in FIG. 16. In this case, the vibrating lens 5 may be referred to as a two-dimensional vibrating lens.

Figure 17:
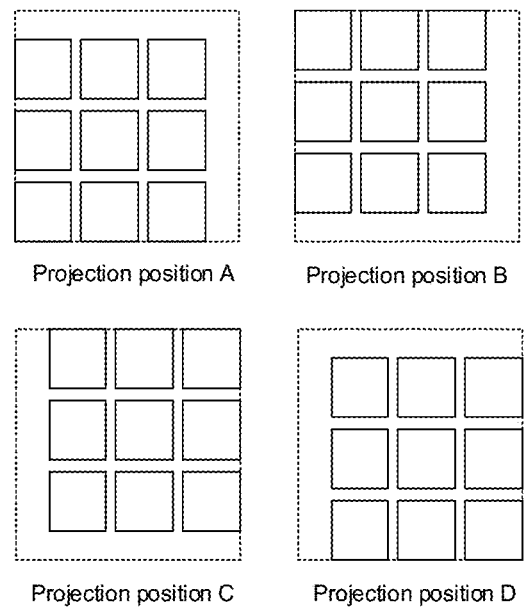
FIG. 17 is a schematic diagram showing four projection positions of a 4K projection screen, in accordance with some embodiments.

In some examples, the vibrating lens 5 is a four-dimensional vibrating lens (also may be referred to as a biaxial vibrating lens). The four-dimensional vibrating lens has four rotation positions. Each rotation position corresponds to a respective sub-image with a resolution of 2K. For example, the four rotation positions may correspond to four sub-images at different projection positions, thereby forming an image with the resolution of 4K. The projection positions of the four sub-images may be as shown in FIG. 17.

Other structures of the vibrating lens 5 will be described below with reference to FIGS. 8 to 10, but the structures are not limited thereto.

In some embodiments, as shown in FIG. 10, the second edge region 520B includes a plurality of third openings 520B1, and the plurality of third openings 520B1 are disposed around the second opening 520A. The second edge region 520B further includes at least two connecting portion 520B2, and any two adjacent third openings 520B1 are provided with a connecting portion 520B2 therebetween. That is, the any two adjacent third openings 520B1 are disconnected with each other. For example, the connection portions 520B2 are made of an elastic material. In this way, the light-transmissive assembly 52 may rotate about at least one of the first axis X or the second axis Y. For example, the plurality of third openings 520B1 may include four third openings 520B1, and the at least one connecting portion 520B2 includes four connecting portions 520B2. Therefore, an edge sub-region 520B3 is formed in the second edge region 520B. By providing the plurality of third openings 520B1 in the second edge region 520B, the weight of the light-transmissive assembly 52 may be reduced. Of course, the bearing plate 520 may be made of an elastic material. That is, the metallic material for forming the bearing plate 520 is also an elastic material.

In some embodiments, as shown in FIG. 10, the second edge region 520B further includes four apex corner regions 520B4. As shown in FIG. 9, the control assembly 51 further includes four elastic gaskets on the substrate 510, which are an elastic gasket 512A, an elastic gasket 5126, an elastic gasket 512C, and an elastic gasket 512D. An orthogonal projection of each elastic gasket on the substrate 510 overlaps with an orthogonal projection of a respective apex corner region 520B4 of the second edge region 520B on the substrate 510. Each elastic gasket is fixedly connected to a respective apex corner region 520B4 of the second edge region 520B. For example, each elastic gasket may be bonded to a respective apex corner region 520B4 of the second edge region 520B.

In some examples, each elastic gasket is in a shape of a triangle, each apex corner region 520B4 is a triangular region, and each elastic gasket has a same size as a respective apex corner region 520B4. For example, each elastic gasket is in a shape of an equilateral triangle, and each apex corner region 520B4 may be an equilateral triangular region. The accuracy of the flatness of each elastic gasket may be greater than or equal to 0.1 mm, and each elastic gasket has a certain thickness to support the light-transmissive assembly 52. In addition, in order to avoid scratching hands during assembly, three corners of the equilateral triangle may be subjected to radian processing.

In some examples, referring to FIGS. 8 to 10, in the process of forming the vibrating lens 5, the lens 523 is first adhered to the second edge region 520B of the bearing plate 520, so that the lens 523 covers the second opening 520A. Then, the first magnet group 5211 and the second magnet group 5212 are adhered to the second edge region 520B and located at different sides of the second opening 520A to obtain the light-transmissive assembly 52. Then, the elastic gasket 512A, the elastic gasket 512B, the elastic gasket 512C, and the elastic gasket 512D on the substrate 510 are adhered to respective apex corner regions 520B4 of the light-transmissive assembly 52 to obtain the vibrating lens 5.

For example, the light-transmissive assembly 52 in the vibrating lens 5 is closer to the light valve 3 than the substrate 510, and the bearing plate 520 in the light-transmissive assembly 52 is closer to the light valve 3 than the magnetic assembly 521. A surface of the bearing plate 520 proximate to the light valve 3 is a smooth mirror surface. In a case where the light-transmissive assembly 52 does not rotate, that is, as shown in FIG. 8, in a case where the mirror surface of the light-transmissive assembly 52 is parallel to a horizontal plane in FIG. 8, the bearing plate 520 can reflect light reaching the bearing plate 510, thereby helping the light-transmissive assembly 52 to dissipate heat, reducing the temperature of the substrate 510, and avoiding damage to the vibrating lens 5 due to excessive heat absorption.

In some examples, referring to FIG. 9, the first edge region 510B includes a plurality of through holes. The plurality of through holes allow components such as screws, or screws and shock absorbers to fix the substrate 510 to a wall in the projection apparatus, thereby fixing the vibrating lens 5 on the wall. For example, the plurality of through holes include at least three through holes, such as four through holes, which are a through hole S1, a through hole S2, a through hole S3, and a through hole S4. Each through hole may be a screw hole.

In addition, in the above embodiments, both the control assembly 51 and the light-transmissive assembly 52 may be of a plate-like structure. In this way, the vibrating lens 5 including the control assembly 51 and the light-transmissive assembly 52 having a gap therebtween may also be of a plate-like structure. As a result, the volume of the vibrating lens 5 may be small, and the light-transmissive assembly 52 may be less likely to vibrate during rotation, thereby reducing the noise.

A minimum distance between two surfaces that face each other of the light-transmissive assembly 52 and the control assembly 51 may not be less than 0.5 mm, so that the light-transmissive assembly 52 may not be affected by the control assembly 51 when rotating. For example, the distance may be 0.6 mm or 0.8 mm. However, the minimum distance between the two surfaces that face each other of the control assembly 51 and the light-transmissive assembly 52 may have other values, as long as the distance can ensure that the light-transmissive assembly 52 is not affected when rotating, the vibrating lens 5 can retain the plate-like structure, and an overall size of the light-transmissive assembly 52 is not too large.

The size and the volume of the vibrating lens 5 provided in the embodiments of the disclosure are small, which may be beneficial to the miniaturization design of the projection apparatus. The vibrating lens 5 is in a shape of a plate, which may be convenient to connect the vibrating lens 5 to at least one wall through at least three fixing members when the vibrating lens 5 is installed. This connection method may transmit the vibration of the vibrating lens 5 in multiple directions, so that the amplitude of the vibration in all directions may be small, which may greatly reduce noise. For example, the noise may be as low as 20 dB in specific application.

In some embodiments, in order to reduce the effect of temperature on the rotation accuracy of the light-transmissive assembly 52 in the vibrating lens 5, referring to FIG. 9, the vibrating lens 5 further includes an electrically erasable programmable read only memory (EEPROM) 56 and a temperature sensor (TS) 57, which may be disposed on the substrate 510. The EEPROM 56 and the TS 57 may be connected to the socket 59 through an I2C bus, and connected to the display control circuit 1.

The TS 57 is configured to detect the ambient temperature of the coil groups (e.g., the first coil group 5111 and the second coil group 5112) on the substrate 510 in real time when the coils in the coil groups on the substrate 510 are energized, and to send the ambient temperature to the display control circuit 1. The display control circuit 1 is further configured to determine whether the ambient temperature is within a temperature range after receiving the ambient temperature. If the ambient temperature is not within the temperature range, it indicates that the ambient temperature of the coil groups and the bearing plate 520 is abnormal. That is, this ambient temperature may affect the current of the coil groups and lead to the deformation of the bearing plate 520, thereby affecting the rotation accuracy of the light-transmissive assembly 52 in the vibrating lens 5.

In addition, the display control circuit 1 is further configured to send a correction parameter acquisition instruction to the EEPROM 56 if the ambient temperature is not within the temperature range, the correction parameter acquisition instruction carrying the ambient temperature. The EEPROM 56 is configured to obtain a correction parameter corresponding to the ambient temperature from a pre-stored relationship between the ambient temperature and the correction parameter after receiving the ambient temperature, and send the obtained correction parameter to the display control circuit 1. The display control circuit 1 is further configured to adjust the vibrating lens current control signal that is to be transmitted to the vibrating lens drive assembly 4 according to the correction parameter, thereby adjusting the vibrating lens driving current supplied to the vibrating lens 5 by the vibrating lens drive assembly 4, so as to eliminate the effect of temperature on the rotation accuracy of the light-transmissive assembly 52 in the vibrating lens 5. The correction parameter may be the amplitude of the vibrating lens current control signal.

A vibrating lens 5 according to some other embodiments will be described below with reference to FIGS. 18 to 20. It will be noted that the following description is mainly aimed at the structure different from that of the vibrating lens 5 according to the above embodiments. The same structure and principle may be referred to the above-mentioned related description, which will not be repeated here.

Figure 18:
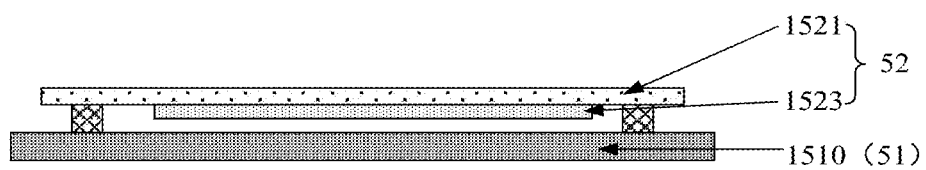
FIG. 18 is a partial schematic diagram of another vibrating lens, in accordance with some embodiments.
Figure 20:
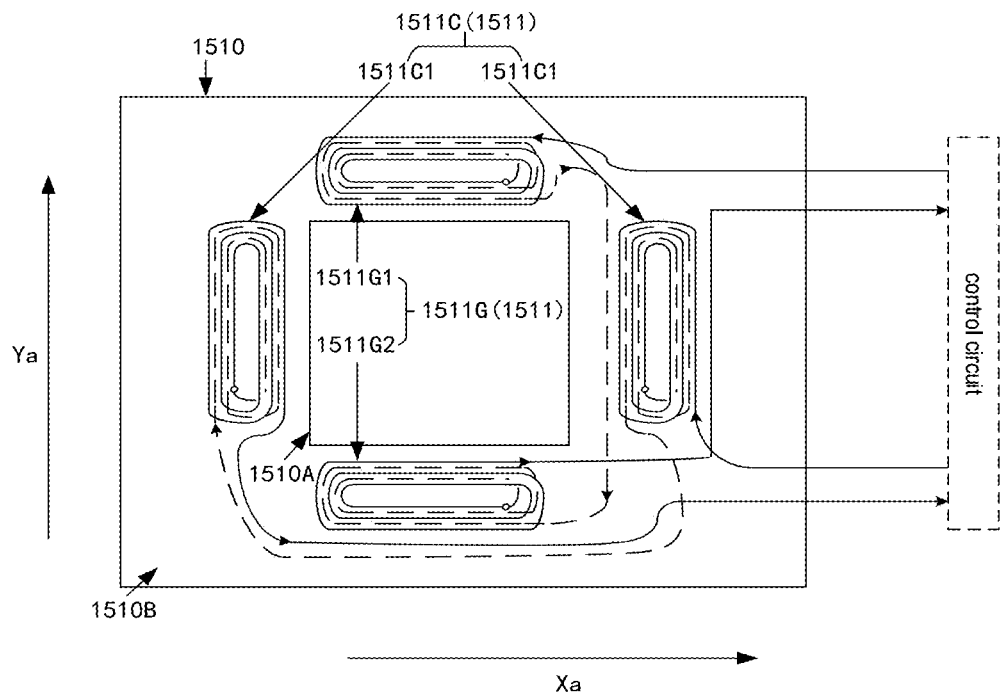
FIG. 20 is a schematic diagram of the light-transmissive assembly in the vibrating lens shown in FIG. 13.

In some embodiments, as shown in FIGS. 18 and 20, the control assembly 51 includes a substrate 1510 and a control coil 1511. The substrate 1510 has a first opening 1510A and a first edge region 1510B surrounding the first opening 1510A. The first opening 1510A is configured to allow the projection beams reflected by the light valve 3 to pass through. The control coil 1511 is located on the first edge region 1510B. The substrate 1510 is, for example, a printed circuit board (PCB).

Figure 19:
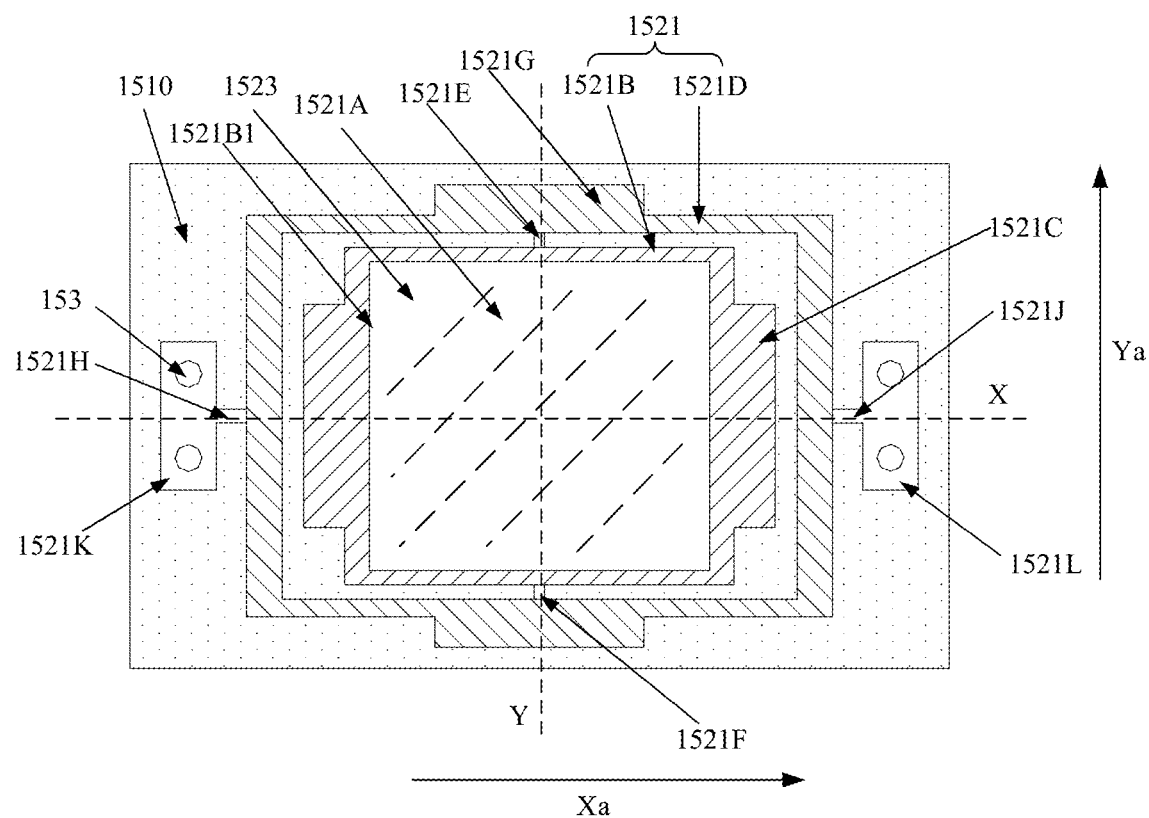
FIG. 19 is a schematic diagram of the control assembly in the vibrating lens shown in FIG. 13.

As shown in FIGS. 18 and 19, the light-transmissive assembly 52 includes a rotating assembly 1521 and a lens 1523 (also referred to as an optical glass). The rotating assembly 1521 is fixed on the substrate 1510. The rotating assembly 1521 has a second opening 1521A. The second opening 1521A is configured to allow the projection beams reflected by the light valve 3 to pass through. The lens 1523 is fixed on the rotating assembly 1521 and covers the second opening 1521A to transmit the projection beam reflected by the light valve 3.

In some examples, as shown in FIG. 19, the rotating assembly 1521 may be made of a metallic material that is easily magnetized, such as iron, cobalt, or nickel.

In some examples, as shown in FIG. 19, the rotating assembly 1521 further includes an inner ring 1521B. The inner ring 1521B has a light through hole 1521B1 (which constitutes at least a part of the second opening 1521A) defined by its inner edge, and the lens 1523 is fixedly connected to the inner edge of the inner ring 1521B.

The inner ring 1521B may be in a shape of a rectangular ring, a circular ring, or the like. The lens 1523 may be in a shape of a circle, a square, or the like. The light through hole 1521B1 of the inner ring 1521B may have a same shape as the lens 1523. For example, the lens 1523 is in a shape of a square, and the light through hole 1521B1 of the inner ring 1521B is in a shape of a square. However, the light through hole 1521B1 of the inner ring 1521B may also have a different shape from the lens 1523. For example, the light through hole 1521B1 of the inner ring 1521B is in a shape of a square, and the lens 1523 may have other shapes, such as an ellipse or a circle.

An area of the light through hole 1521B1 of the inner ring 1521B may be less than an area of the lens 1523. However, the area of the light through hole 1521B1 of the inner ring 1521B may also be greater than the area of the lens 1523, as long as it does not hinder the propagation of the beams.

The lens 1523 may be embedded in the inner ring 1521B, so that an outer edge of the lens 1523 is in close contact with the inner edge of the inner ring 1521B. The lens 1523 may also be glued to the inner edge of the inner ring 1521B through adhesive, and the lens 1523 covers the light through hole 1521B1. However, the lens 1523 may also be fixedly connected to the rotating assembly 1521 in other manners.

In some examples, as shown in FIG. 19, the rotating assembly 1521 further includes at least one first protrusion 1521C (e.g., extending in the Ya direction) each at a respective outer edge of the inner ring 1521B. The first protrusion 1521C may be made of a metallic material that is easily magnetized, such as iron, cobalt, or nickel. As shown in FIG. 20, the control coil 1511 includes a first coil group 1511C. The first coil group 1511C is configured to interact with the at least one first protrusion 1521C as driven by the first vibrating lens driving current, so as to drive the light-transmissive assembly 52 to rotate about an axis (e.g., the Y axis) as the rotating axis.

For example, the at least one first protrusion 1521C includes two first protrusions 1521C respectively located at two outer edges of the inner ring 1521B in a Xa direction. The first coil group 1511C includes two coils 1511C1. Each first coil 1511C1 may be disposed at a projection position of a respective first protrusion 1521C on the substrate 1510, and the first coil 1511C1 is electrically connected to a control circuit (e.g., the socket 59 described above). The control circuit may be configured to change a current direction of each first coil 1511C1 at a preset frequency.

In this way, the first protrusion 1521C moves away from or approaches the first coil 1511C1 as driven by the magnetic field generated by the first coil 1511C1 being energized, so that the inner ring 1521B rotates about the second axis Y in a direction perpendicular to a plane defined by the Xa direction and the Ya direction. Since the lens 1523 is fixed on the inner ring 1521B, when the inner ring 1521B rotates about the second axis Y, the lens 1523 also rotates about the second axis Y, so that the sub-image formed by the projection beams passing through the lens 1523 is offset in the Xa direction. For the principle and specific details, reference may be made to the above related descriptions, which will not be repeated here.

In some examples, as shown in FIG. 19, the rotating assembly 1521 further includes an outer ring 1521D disposed outside the inner ring 1521B, and fixedly connected to the inner ring 1521B, so that the inner ring 1521B and the outer ring 1521D may be linked. A shape of the outer ring 1521D and the shape of the inner ring 1521B may be the same or different.

For example, as shown in FIG. 19, the rotating assembly 1521 further includes a first connecting bridge 1521E and a second connecting bridge 1521F respectively located on two outer edges of the inner ring 1521B in the Ya direction, so that the inner ring 1521B may be connected to the outer ring 1521D through the first connecting bridge 1521E and the second connecting bridge 1521F. The first connecting bridge 1521E and the second connecting bridge 1521F may extend along the second axis Y of the inner ring 1521B. Alternatively, the first connecting bridge 1521E and the second connecting bridge 1521F may extend along the first axis X of the inner ring 1521B. In this way, the inner ring 1521B and the outer ring 1521D are both arranged symmetrically with the first axis X as the symmetry axis, or are both arranged symmetrically with the second axis Y as the symmetry axis. As a result, the inner ring 1521B and the outer ring 1521D rotate stably about the first axis X or the second axis Y, which may meet the accuracy requirements for the rotation of the light-transmissive assembly 52 in the vibrating lens 5.

For example, as shown in FIG. 19, the rotating assembly 1521 further includes at least one second protrusion 1521G (e.g., extending in the Xa direction) each on a respective outer edge of the outer ring 1521D. The second protrusion 1521G may be made of a metallic material that is easily magnetized, such as iron, cobalt, or nickel. As shown in FIG. 20, the control coil 1511 further includes a second coil group 1511G. The second coil group 1511G is configured to interact with the at least one second protrusion 1521G as driven by the second vibrating lens driving current, so as to drive the light-transmissive assembly 52 to rotate about an axis (e.g., the X axis).

For example, the at least one second protrusion 1521G includes two second protrusions 1521G respectively located at two outer edges of the outer ring 1521D in the Ya direction. The second coil group 1511G may include two second coils 1511G1. Each second coil 1511G1 may be disposed at a projection position of a respective second protrusion 1521G on the substrate 1510, and the second coil 1511G1 is electrically connected to the control circuit (e.g., the socket 59 described above). The control circuit may be configured to change a current direction of each second coil 1511G1 at a preset frequency.

In this way, the second protrusion 1521G moves away from or approaches the second coil 1511G1 as driven by the magnetic field generated by the second coil 1511G1 being energized, so that the outer ring 1521D rotates about the first axis X in a direction perpendicular to a plane defined by the Xa direction and the Ya direction. Since the lens 1523 is fixed on the inner ring 1521B, and the inner ring 1521B is connected to the outer ring 1521D, when the outer ring 1521D rotates about the first axis X, the lens 1523 also rotates about the first axis X, so that the sub-image formed by the projection beams passing through the lens 1523 is offset in the Ya direction.

It will be noted that, the first protrusion 1521C and the second protrusion 1521G increase magnetization areas of the inner ring 1521B and the outer ring 1521D, respectively, and thus it may be convenient to control the rotations of the inner ring 1521B and the outer ring 1521D by the coils.

In some other examples, the control assembly 51 may not include the first protrusion 1521C and the second protrusion 1521G, and the control assembly 51 may control the rotation of the lens 1523 based on the inner ring 1521B and the outer ring 1521D.

For example, in order to fix the rotating assembly 1521 on the substrate 1510, as shown in FIG. 19, the rotating assembly 1521 further includes a third connecting bridge 1521H and a fourth connecting bridge 1521J located on two opposite outer edges of the outer ring 1521D. The third connecting bridge 1521H and the fourth connecting bridge 1521J may extend along the first axis X of the outer ring 1521D. Alternatively, the third connecting bridge 1521H and the fourth connecting bridge 1521J may extend along the second axis Y of the outer ring 1521D. The rotating assembly 1521 further includes a first fixing arm 1521K connected to an extended end of the third connecting bridge 1521H, and a second fixing arm 1521L connected to an extended end of the fourth connecting bridge 1521J. The outer ring 1521D is connected to the substrate 1510 through the first fixing arm 1521K and the second fixing arm 1521L.

For example, the inner ring 1521B, the outer ring 1521D, the first connecting bridge 1521E, the second connecting bridge 1521F, the third connecting bridge 1521H, the fourth connecting bridge 1521J, the first fixing arm 1521K, and the second fixing arm 1521L constitute an integration structure together. In this way, a strength of the rotating assembly 1521 may be ensured, and the above components may not be easily disconnected.

The first connecting bridge 1521H, the second connecting bridge 1521F, the third connecting bridge 1521H, and the fourth connecting bridge 1521J may each be of an elongated and sheet-like structure with a small volume, so as to be twisted under the action of an external force, and thus the inner ring 1521B and the outer ring 1521D may rotate flexibly. The first fixing arm 1521K and the second fixing arm 1521L may each be of a rectangular sheet-like structure, or a sheet-like structure of other shapes, which is not limited in the embodiments of the present disclosure.

In some examples, as shown in FIG. 19, the vibrating lens 5 further includes a plurality of first screws 153. The first fixing arm 1521K and the second fixing arm 1521L may be fixedly connected to the substrate 1510 through the first screws 153. However, the first fixing arm 1521K and the second fixing arm 1521L may also be welded on the substrate 1510. The connection manner is not limited herein.

For example, the vibrating lens 5 further includes rubber rings disposed between the first fixing arm 1521K and a respective first screw 153, and between the second fixing arm 1521L and a respective first fixing screw 153, so as to reduce the noise generated between the first fixing arm 1521K and the respective first screw 153, and between the second fixing arm 1521L and the respective first screw 153 when the outer ring 1521D rotates.

In some other examples, the at least one first protrusion 1521C may include one, two, three, or four first protrusions 1521C, and the at least one second protrusion 1521G may include one, two, three, or four second protrusions 1521G. The one or more first protrusions 1521C may be located at one side or both sides of the inner ring 1521B in the Xa direction, and the one or more second protrusions 1521G may be located at one side or both sides of the outer ring 1521D in the Ya direction. In the embodiments of the present disclosure, the numbers of the at least one first protrusion 1521C and the at least one second protrusion 1521G are not limited.

For example, the at least one first protrusion 1521C includes one first protrusion 1521C located at a side of the inner ring 1521B in the Xa direction, and the first connecting bridge 1521E and the second connecting bridge 1521F are located at both sides of the inner ring 1521B in the Ya direction (e.g., located on the second axis Y). For another example, the at least one first protrusion 1521C includes two first protrusions 1521C respectively located at both sides of the inner ring 1521B in the Xa direction, and the first connecting bridge 1521E and the second connecting bridge 1521F are respectively located at both sides of the inner ring 1521B in the Ya direction (e.g., located on the second axis Y). The arrangement of the second protrusion 1521G can be referred to the arrangement of the first protrusion 1521C, and will not be repeated here.

The first protrusion 1521C may be integrally formed with the inner ring 1521B, and the second protrusion 1521G may be integrally formed with the outer ring 1521D. The first protrusion 1521C and the second protrusion 1521G may each be of a rectangular sheet-like structure, or may have structures of other shapes, such as a fan-shaped sheet-like structure, which is not limited in the embodiments of the present disclosure.

In some examples, the rotating assembly 1521 does not include the outer ring 1521D. In this case, the first protrusion 1521C and the second protrusion 1521G may be connected to the inner ring 1521B. For example, the first protrusions 1521C are located at both sides of the inner ring 1521B in the Xa direction, and the second protrusions 1521G are located at both sides of the inner ring 1521B in the Ya direction.

It will be noted that, one, two, three or four first coils 1511C1, and one, two, three or four second coils 1511G1 may be provided. In the embodiments of the present disclosure, the numbers of the first coils 1511C1 and the second coils 1511G1 are not limited. For example, the number of the first coils 1511C1 is the same as the number of the first protrusions 1521C, and the number of the second coils 1511G1 is the same as the number of second protrusions 1521G.

In summary, after the control coil (e.g., the first coils 1511C1 or the second coils 1511G1 as shown in FIG. 20) is energized to generate a magnetic field, the rotating assembly 1521 (e.g., the inner ring 1521B or the outer ring 1521D as shown in FIG. 19) spaced from the coils may be magnetized, and a magnetic field direction of the magnetized rotating assembly 1521 is consistent with a magnetic field direction of the coils. Therefore, the rotating assembly 1521 may be attracted by the coil, and then a side of the rotating assembly 1521 approaches the coil, so that the light-transmissive assembly 52 may rotate to one rotation state.

After a current direction of the coil is changed, due to magnetic hysteresis phenomenon of the magnetized rotating assembly 1521, the rotating assembly 1521 has a magnetic field direction temporarily opposite to the magnetic field direction of the coil. Therefore, the rotating assembly 1521 may be repelled by the coil, and then a side of the rotating assembly 1521 moves away from the coil, so that the light-transmissive assembly 52 may rotate to another rotation state.

In this way, the rotating assembly 1521 may repeat the above process to switch between multiple rotation states, which will not be repeated in the embodiments of the present disclosure.

Of course, the control coil (e.g., the first coils 1511C1 or the second coils 1511G1 as shown in FIG. 20) may also switch between de-energized and energized at a preset frequency, so that the light-transmissive assembly 52 may switch between at least one rotation state and a non-rotating state (i.e., an initial state) at the preset frequency. When implemented, after the coil is energized to generate a magnetic field, the rotating assembly 1521 (e.g., the inner ring 1521B or the outer ring 1521D as shown in FIG. 19) spaced from the coil may be magnetized, and the magnetic field direction of the magnetized rotating assembly 1521 is consistent with the magnetic field direction of the coil. Therefore, the rotating assembly 1521 may be attracted by the coil, and then a side of the rotating assembly 1521 approaches the coil, so that the light-transmissive assembly 52 may rotate to one rotation state. When the coil is de-energized, the attraction of the coil to the rotating assembly 1521 disappears, and the light-transmissive assembly 52 may rotate to the non-rotating state.

The coil may be a solenoid, and a direction of a central axis of the solenoid may be parallel to the thickness direction of the light-transmissive assembly 52. In this way, a magnetic field direction generated by the solenoid after being energized may be parallel to the thickness direction of the light-transmissive assembly 52 to attract or repel the rotating assembly 1521. However, the coil may also be other types of coils, as long as it can attract or repel the rotating assembly 1521 after being energized.

Vibrating Lens Drive Assembly 4

The display control circuit 1 is further connected to the vibrating lens drive assembly 4, and is configured to transmit a vibrating lens current control signal to the vibrating lens drive assembly 4 to drive the vibrating lens drive assembly 4 to output at least one vibrating lens driving current to the vibrating lens 5, so as to drive the vibrating lens 5 to deflect the projection beams reflected by the light valve 3.

The vibrating lens drive assembly 4 may be connected to a pin of the socket 59 (as shown in FIG. 9) in the vibrating lens 5, and is configured to provide the vibrating lens driving current to the vibrating lens 5 through the pin of the socket 59 when receiving the vibrating lens current control signal. The vibrating lens 5 is configured to rotate as driven by the vibrating lens driving current to deflect the projected beams reflected by the light valve 3. Vibrating lens current control signals corresponding to different sub-images may be different.

For example, the vibrating lens drive assembly 4 may include one or more sets of vibrating lens drive circuits. Each set of vibrating lens drive circuits may include a field programmable gate array chip (FPGA), a serial digital-to-analog conversion chip and an operational amplifier. An input of the FPGA chip is electrically connected to an output of the display control circuit 1, and an output of the FPGA chip is electrically connected to an input of the serial digital-to-analog conversion chip. An output of the serial digital-to-analog conversion chip is electrically connected to an input of the operational amplifier, and an output of the operational amplifier is connected to the pin in the socket 59 in the vibrating lens 5.

The serial digital-to-analog conversion chip may be a DA5112A81S101CIMK chip. The operational amplifier may be a TCA0372DWR2G chip. Generally, a negative voltage terminal of the TCA0372DWR2G chip is connected to a voltage of minus 12V, which may be output from SY8303AIC chip that may convert a voltage of plus 12V into the voltage of minus 12V. The SY8303AIC chip has a high chip frequency, and a circuit that matches this chip has a small package size of inductance and capacitance, which may reduce a size of a circuit board.

For example, the vibrating lens 5 is a biaxial vibrating lens, and the light-transmissive assembly 52 in the vibrating lens 5 may rotate about two rotation axes of the first axis X and the second axis Y. In this case, the vibrating lens drive assembly 4 includes two sets of vibrating lens drive circuits, which drive the first coil group and the second coil group, respectively, so that the light-transmissive assembly 52 in the vibrating lens 5 may rotate about the first axis X and the second axis Y, respectively.

When a vibrating lens drive circuit corresponding to the first coil group receives the vibrating lens current control signal sent by the display control circuit 1, its FPGA chip sends waveform data of sine wave driving current to its serial digital-to-analog conversion chip. The serial digital-to-analog conversion chip converts the waveform data of the sine wave driving current into sine wave analog data, and transmits the sine wave analog data to an operational amplifier for gain amplification. The operational amplifier inputs the amplified sine wave analog data to the coils in the first coil group, so as to drive the light-transmissive assembly 52 in the vibrating lens 5 to rotate about the first axis X.

Similarly, when the vibrating lens drive circuit corresponding to the second coil group receives the vibrating lens current control signal sent by the display control circuit 1, its FPGA chip sends waveform data of sine wave driving current to its serial digital-to-analog conversion chip. The serial digital-to-analog conversion chip converts the waveform data of the sine wave driving current into sine wave analog data, and transmits the sine wave analog data to an operational amplifier for gain amplification. Then, the operational amplifier inputs the amplified sine wave analog data to the coils in the second coil group, so as to drive the light-transmissive assembly 52 in the vibrating lens 5 to rotate about the second axis Y.

In some embodiments, the vibrating lens drive assembly 4 may be integrated with the control assembly 51 of the vibrating lens 5. For example, they are integrated on a main board of the projection apparatus or on the substrate 510 in the control assembly 51.

In some examples, the display control circuit 1, the light source drive circuit 10, and the vibrating lens drive assembly 4 may be integrated together, for example, may be included in a printed circuit board assembly (PCBA) of the projection apparatus.

Other components included in the projection apparatus will be described below by examples with reference to FIGS. 2 and 3. It will be noted that the projection apparatus may include more or fewer components than those listed.

As shown in FIGS. 2 and 3, the projection apparatus may further include a projection lens 11 located at a light exit side of the vibrating lens 5. The projection lens 13 may be configured to project projection beams onto a projection screen or a wall for imaging.

The projection lens 11 may be various types of lenses, such as, but not limited to, a zoom lens, a focus-tunable lens, a fixed focus length lens, etc. The projection apparatus may be an ultra-short-focus projection apparatus, a short-focus projection apparatus, or a long-focus projection apparatus. For example, the projection apparatus is an ultra-short-focus projection apparatus, the projection lens 11 is an ultra-short-focus lens, and a throw ratio is usually less than 0.3, such as 0.24.

In some embodiments, as shown in FIG. 2, the projection apparatus further includes at least one beam-combination mirror 110, a lens assembly 120, a diffusion wheel 130, a light pipe 140, and a total internal reflection (TIR) lens 150. The lens assembly 120 includes a first lens 1201, a second lens 1202, and a third lens 1203.

In an example where the light source assembly 2 includes lasers of three primary colors, the light source assembly 2 includes a blue laser 21, a red laser 22, and a green laser 23, and the blue laser 21, the red laser 22 and the green laser 23 may share one beam-combination mirror 110. For example, as shown in FIG. 2, the blue laser 21 emits a blue laser beam firstly, then the red laser 22 emits a red laser beam, and then the green laser 23 emit a green laser beam. The blue laser beam, the red laser beam, and the green laser beam may be reflected by the beam-combination mirror 110 sequentially to the first lens 1201. Then as for each laser beam, the laser beam is converged by the first lens 1201, passes through the diffusion wheel 130 to be homogenized to eliminate speckles, and then is homogenized by the light pipe 140. That is, the beam-combination mirror 110 may reflect the laser beams of three primary colors emitted by the light source assembly 2 to the first lens 1201 sequentially. The first lens 1201 may converge each laser beam. The diffusion wheel 130 may diffuse the converged beam to homogenize the beam, which may achieve the effect of eliminating speckles. The light pipe 140 may further homogenize the homogenized beam through total reflection occurring therein. After that, the homogenized beams of three primary colors pass through the second lens 1202 sequentially, and then pass through the third lens 1203 sequentially to be shaped. The TIR prism 150 may totally reflect the shaped beams sequentially to the light valve 3 and transmit the beams reflected by the light valve 3 to the vibrating lens 5 sequentially.

In some embodiments, in order to detect the brightness of laser beams emitted by the light source assembly 2 during the projection process of the projection apparatus, as shown in FIG. 2, the projection apparatus further includes at least one first light sensor W1 each arranged on a light exit side of the lasers. For example, the light source assembly 2 is a polychromatic light source and includes a blue laser 21, a red laser 22, and a green laser 23. The at least one first light sensor W1 includes a first light sensor W1 disposed on a light exit side of the blue laser 21, a first light sensor W1 disposed on a light exit side of the red laser 22, and a first light sensor W1 disposed on a light exit side of the green laser 23. For example, the first light sensor W1 is configured to detect a brightness of a laser beam produced by a respective laser. In another example, the at least one first light sensor W1 includes one first light sensor W1, which is configured to detect a brightness of a laser beam produced by each laser since the lasers produce laser beams at different times. In this case, the first light sensor W1 may be located at the middle of the light exit side of the lasers or at other positions.

In some embodiments, as shown in FIG. 2, the projection apparatus further includes a second light sensor W2 arranged on a light exit side of the light pipe 140. The second light sensor W2 is capable of detecting, for example, a brightness of a blue laser beam, a brightness of a red laser beam and a brightness of a green laser beam from the light pipe 140 at different times.

In some examples, only the at least one first light sensor W1, only the one second light sensor W2, or both the at least one first light sensor W1 and the one second light sensor W2 may be provided in the projection apparatus.

In some other embodiments, as shown in FIG. 3, the projection apparatus further includes a light pipe 90, a lens assembly 20, a mirror 30 and a prism assembly 50. A light outlet of the light pipe 90 faces a light receiving side of the lens assembly 20. A center line of the light pipe 90 coincides with a main optical axis of the lens assembly 20. The light pipe 90 is configured to receive the beams provided by the light source assembly 2 and homogenize the beams. A light exit side of the lens assembly 20 faces a reflecting surface of the mirror 30. The lens assembly 20 is configured to collimate and converge the homogenized beams. Then, the converged beams propagate to the mirror 30. The reflecting surface of the mirror 30 faces a first light incident surface 501 of the prism assembly 50, so that the mirror 30 can reflect the beams shaped by the lens assembly 20 to the prism assembly 50. The prism assembly 50 is configured to refract the beams reflected by the mirror 30 to the light valve 3. A first light exit surface 502 (which is also a light incident surface) of the prism assembly 50 faces the light valve 3, and a second light exit surface 503 of the prism assembly 50 faces the vibrating lens 5.

For example, the lens assembly 20 may include a convex lens and/or a concave lens. The prism assembly 50 may be a total internal reflection (TIR) prism or a refraction total internal reflection (RTIR) prism. For example, the prism assembly 50 is a TIR prism.

In addition, in order to improve the display effect of the sub-image, a distance between a light exit surface of the vibrating lens 5 and a first lens included in the projection lens 11 is greater than or equal to 1 mm in a direction perpendicular to the light exit surface of the vibrating lens 5, and a distance between a light incident surface of the vibrating lens 5 and the second light exit surface 503 of the prism assembly 50 in a direction perpendicular to the second light exit surface 503 of the prism assembly 50 is greater than or equal to 1 mm.

The light pipe 90 is, for example, a rectangular light pipe. A size of a light outlet of the rectangular light pipe may be in a preset ratio to a size of an operating region of the light valve 3, so that the beams shaped by the lens assembly 20 may exactly cover the operating region of the light valve 3, which may ensure the imaging effect of the projection apparatus. In addition, it may also be possible to avoid an increase in the temperature of a non-operating region of the light valve 3 due to the beams reaching the non-operating region.

The overall structure of the projection apparatus will be described below by an example with reference to FIGS. 21 to 23. It will be noted that the illustrated structure is only an example of the projection apparatus, and the positions and connection relationships of components in the projection apparatus can be changed.

Figure 21:
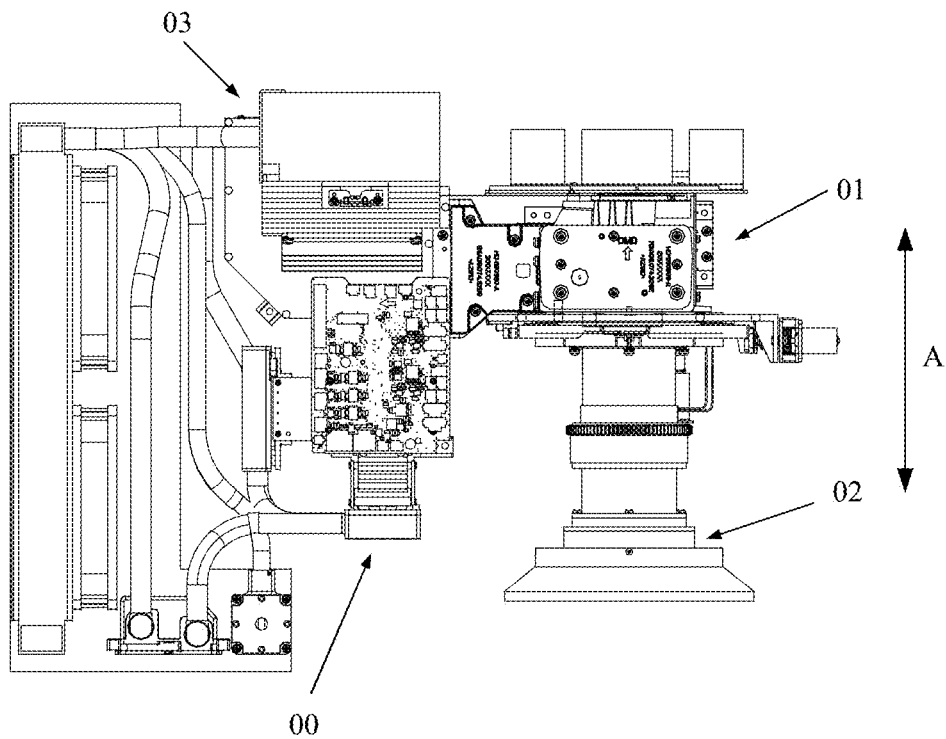
FIG. 21 is a schematic diagram of a projection apparatus, in accordance with some embodiments.

As shown in FIG. 21, the projection apparatus includes a light source portion 00, an optical engine 01, and a projection lens portion 02. The light source portion 00, the optical engine 01, and the projection lens portion 02 may all be assembled in a housing of the projection apparatus.

The light source portion 00, the optical engine 01 and the projection lens portion 02 may each include a casing, and the casings of the light source portion 00, the optical engine 01 and the projection lens portion 02 support and seal their respective components for satisfying certain sealing or airtight requirements. For example, the light source portion 00 is hermetically sealed through its casing, which may improve light attenuation of the light source portion 00.

The light source assembly 2 may be disposed in the casing of the light source portion 00. The light valve 3, the vibrating lens 5, and the optical components described with reference to FIG. 2 or 3 may be disposed in the casing of the optical engine 01. It will be noted that at least one of the phosphor wheel and the color wheel may be deposed in another assembly of the projection apparatus, such as the casing of the optical engine 01, instead of the casing of the light source portion 00.

As shown in FIG. 21, one end of the optical engine 01 is connected to the projection lens portion 02, and the optical engine 01 and the projection lens portion 02 are arranged in a first direction A. For example, the first direction A is a direction in which the projection beams exit from the projection apparatus. The other end of the optical engine 01 is connected to the light source portion 00 to receive the beams emitted by the light source assembly 2.

Figure 22:
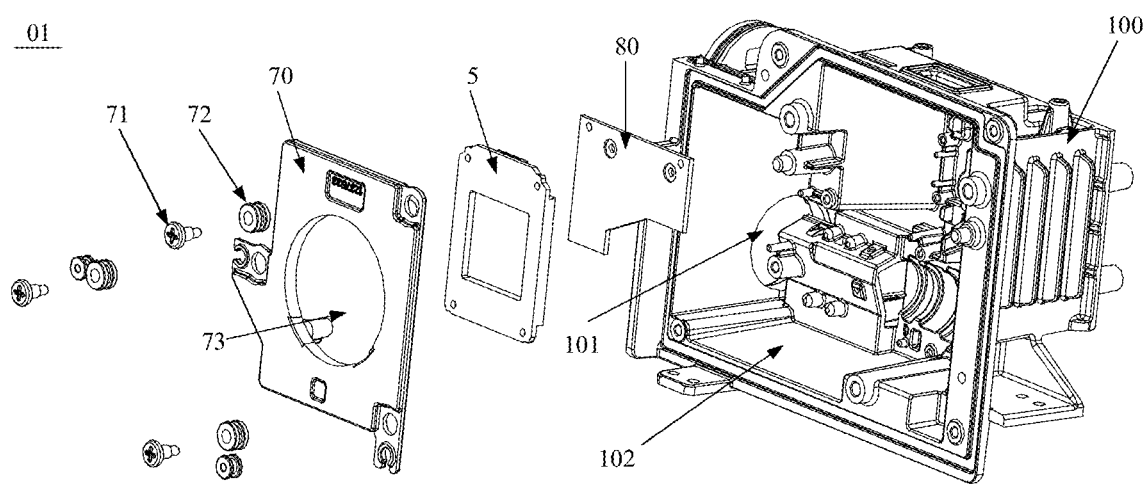
FIG. 22 is an exploded view of an optical engine, in accordance with some embodiments.

For example, as shown in FIG. 22, the casing 100 of the optical engine 01 (hereafter referred to as the optical engine casing 100) includes a light inlet 101, to which the light source portion 00 may be fixed, and a light outlet 102, to which the projection lens portion 02 may be fixed. The light inlet 101 and the light outlet 102 of the optical engine casing 100 may be adjacent to (e.g., as shown in FIG. 22) or opposite to each other.

For example, the light pipe 90 shown in FIG. 3 is connected to an inner side surface of the optical engine casing 100. In this case, in order to prevent a spot formed by the beam from failing to cover an operating region of the light valve 3 due to an assembly deviation of the components of the optical engine 01, the light pipe 90 may be adjustably fixed on the inner side surface of the optical engine casing 100. In addition, a light inlet of the light pipe 90 may face the light inlet 101 of the optical engine casing 100.

Figure 23:
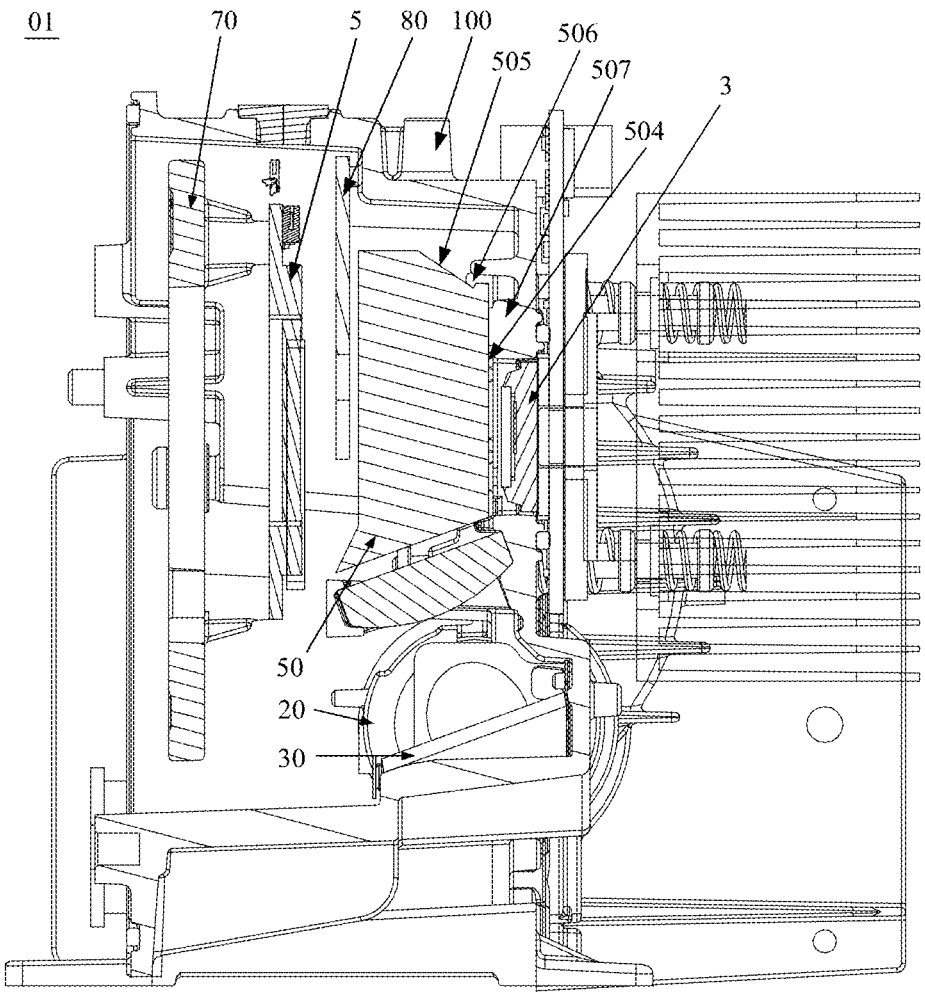
FIG. 23 is a partial schematic diagram of an optical engine, in accordance with some embodiments.

As shown in FIG. 23, the optical engine 01 further includes two position-limiting elastic pieces 506 and one position-limiting boss 507 arranged on the optical engine casing 100. The position-limiting boss 507 supports a bottom surface 504 of the TIR prism to limit the TIR prism. The two position-limiting elastic pieces 506 abut against two side walls 505 of the TIR prism that are not used for transmitting beams. In this way, the two position-limiting elastic pieces 506 and the position-limiting boss 507 may provide forces to the surfaces of the TIR prism to improve the positional accuracy of the TIR prism, which may improve the projection effect of the projection apparatus.

In some embodiments, as shown in FIG. 21, the projection apparatus further includes a heat spreader 03. The heat spreader 03 may be fixedly connected to the optical engine 01 to dissipate heat from the optical engine 01. Alternatively, the heat spreader 03 may be connected to the light source portion 00 to dissipate heat from the light source portion 00. Alternatively, the heat spreader 03 may be connected to the light source portion 00 and the optical engine 01 to simultaneously dissipate heat from the light source portion 00 and the optical engine 01.

In some embodiments, as shown in FIGS. 22 and 23, the projection apparatus further includes a vibrating lens fixing assembly connected to the optical engine casing 100, and the vibrating lens fixing assembly is configured to fix the vibrating lens 5 to the optical engine housing 100. For example, the vibrating lens fixing assembly includes a support plate 70, at least three first fixing members 71 and at least three second fixing members. The supporting plate 70 is provided with a first light-transmissive hole 73. The at least three first fixing members 71 may be arranged in a polygon, and the at least three second fixing members may be arranged in a polygon. The support plate 70 is fixedly connected to the optical engine housing 100 through the at least three first fixing members 71. The vibrating lens 5 is fixedly connected to the support plate 70 through the at least three second fixing members, and there is an overlapping portion between an orthogonal projection of the vibrating lens 5 on a plane parallel to the support plate 70 and an orthogonal projection of the first light-transmissive hole 73 on the plane.

In this way, since the at least three first fixing members 71 are arranged in a polygon, and the at least three second fixing members are arranged in a polygon, the vibrating lens 5 may be more stably fixed on the optical engine housing 100, so that the light-transmissive assembly 52 in the vibrating lens 5 may be less likely to drive the support plate 70 to resonance in the rotating process, and it may be less likely to generate noise between the support plate 70 and the optical engine housing 100. Thus, the effect of excessive noise on the performance of the projection apparatus may be avoided. In addition, since the support plate 70 is provided with the first light-transmissive hole 73, and there is the overlapping region between the orthogonal projection of the vibrating lens 5 on the plane parallel to the support plate 70 and the orthogonal projection of the first light-transmissive hole 73 on the plane, the deflected beam and the undeflected beam passing through the vibrating lens 5 may pass through the first light-transmissive hole 73 to exit to the projection lens portion 02, thereby achieving imaging.

Since the vibrating lens 5 is fixed at the light outlet of the optical engine housing 100, relative positions of the vibrating lens 5 and the support plate 70 may be set according to the size of the space at the light outlet of the optical engine housing 10. For example, when the space at the light outlet of the optical engine housing 100 is large, if the volume of the support plate 70 is greater than the volume of the vibrating lens 5, the support plate 70 may be closer to the projection lens portion 02 relative to the vibrating lens 5. However, the relative positions of the vibrating lens 5 and the support plate 70 may also be set according to other conditions, which is not limited in the embodiments of the present disclosure.

The support plate 70 may be of a rectangular structure, and of course, it may also be of a structure of other shapes such as a circle. For example, the support plate 70 is of a rectangular structure, and the at least three first fixing members 71 include three first fixing members 71. The three first fixing members 71 may be respectively located on three sides of the rectangular support plate 70. In this way, the three first fixing members 71 are more dispersed, and the position of the support plate 70 may be restricted in a wide range. For another example, the at least three first fixing members 71 include four first fixing members 71, and the four first fixing members 71 may be respectively located on four sides of the rectangular support plate 70. Of course, the at least three first fixing members 71 may also be arranged in other forms, which are not limited in the embodiments of the present application.

The first fixing member 71 may be a fixing screw, and of course, it may also be of other types, such as a rivet. The structure of the second fixing member and the structure of the first fixing member 71 may be the same or similar.

In some examples, as shown in FIG. 22, in order to reduce collision between the first fixing member 71 and the support plate 70, the vibrating lens fixing assembly further includes at least three first absorber rubbers 72 that are in one-to-one correspondence with the at least three first fixing members 71, and each first fixing member 71 passes through a respective first absorber rubber 72 and the support plate 70 and is fixedly connected to the optical engine housing 100. For example, the first fixing member 71 is a shoulder screw, and the first absorber rubber 72 may be sleeved at the shoulder of the shoulder screw. A length of the first absorber rubber 72 in a central axis direction of the shoulder screw may be greater than a length of the shoulder, so as to avoid direct contact between the support plate 70 and the shoulder of the shoulder screw, thereby avoiding collision between the first fixing member 71 and the support plate 70, and thus reducing noise.

In some examples, in order to reduce the collision between the second fixing member and the vibrating lens 5, the vibrating lens fixing assembly further includes at least three second absorber rubbers that are in one-to-one correspondence with the at least three second fixing members, and each second fixing member passes through a respective second absorber rubber and is fixedly connected to the support plate 70. For example, the second fixing member is a shoulder screw, and the second absorber rubber may be sleeved on the shoulder of the shoulder screw. A length of the second absorber rubber in a central axis direction of the shoulder screw may be greater than a length of the shoulder, so as to avoid direct contact between the vibrating lens 5 and the shoulder of the shoulder screw, thereby avoiding collision between the second fixing member and the vibrating lens 5, and thus reducing noise.

In some other embodiments, instead of being fixed on the optical engine housing 10 through the support plate 70, the vibrating lens 5 may be fixedly connected to the optical engine housing 100 directly. For example, the accuracy of the flatness of the substrate 510 or 1510 in the vibrating lens 5 is 0.1 millimeter (mm), which may meet the accuracy requirement of the vibrating lens 5 for the flatness of the support plate 70. In this case, the substrate 510 or 1510 may be directly served as a support plate for the vibrating lens 5 without additionally adding a support plate 70, so as to simplify the overall structure of the vibrating lens 5 and reduce the manufacturing cost.

In this case, in some examples, at least three third fixing members are provided. The substrate 510 or 1510 of the vibrating lens 5 may be fixedly connected to the optical engine housing 100 through the at least three third fixing members, and the at least three third fixing members may be arranged in a polygon. In this way, it may be possible to avoid the collision between the vibrating lens 5 and the support plate 70 to generate noise, thus further reducing noise during operation of the optical engine 01. In addition, it may also be possible to reduce the number of the components in the optical engine housing 100, thus reducing an occupancy rate of internal space of the optical engine housing 100, so as to facilitate the arrangement of other devices within the optical engine 01.

In some examples, in order to reduce the collision between the vibrating lens 5 and the optical engine housing 100, at least three absorber spacer rings are further provided. Each absorber spacer ring corresponds to a respective third fixing member, and the three absorber spacer rings are disposed between the vibrating lens 5 and the optical engine housing 100. Each absorber spacer ring may be sleeved on a respective third fixing member and clamped between the vibrating lens 5 and the optical engine housing 100.

In some embodiments, as shown in FIGS. 22 and 23, the projection apparatus further includes a heat conduction plate 80 located in and fixedly connected to the optical engine casing 100, and located between the light valve 3 and the vibrating lens 5. The heat conduction plate 80 is configured to absorb heat in the optical engine housing 10 and to receive part of beams reflected by the light valve 3, so as to conduct the heat in the optical engine housing 100 and the heat generated by the part of the beams to the optical engine housing 100. In this way, it may be possible to prevent the part of the beams from being directly irradiated to the control assembly 51 and the light-transmissive assembly 52 included in the vibrating lens 5, thereby preventing excessive heat from accumulating on the control assembly 51 which may increase the temperature of the coils included in the control assembly 51. In addition, it may be possible to prevent the light-transmissive assembly 52 from being deformed due to an increase in temperature, thereby avoiding the failure of the vibrating lens 5 and improving the reliability of the vibrating lens 5. Moreover, the heat conduction plate 80 may also conduct heat in the inner space of the optical engine housing 100 to the optical engine housing 100, so that the optical engine housing 100 dissipates heat to the outside of the optical engine housing 100, thereby achieving high-efficiency heat dissipation in the optical engine housing 100.

This part of beams may be beams that do not exit to the projection lens portion 02 after being reflected by the light valve 3. This part of beams may not be used for projection, but may be received by the heat conduction plate 80. Therefore, the projection of the projection apparatus may not be affected.

The heat conducting plate 80 may be made of a material with excellent thermal conductivity properties such as copper or aluminum, so as to achieve efficient heat absorption and heat conduction. In addition, surfaces of the heat conduction plate 80 and the optical engine housing 100 may be coated with light absorbing materials, thereby enhancing a heat absorption effect of the heat conduction plate 80 and the optical engine housing 100.

In some embodiments, as shown in FIG. 2, the projection apparatus further includes a projection screen 05.

Figure 24:
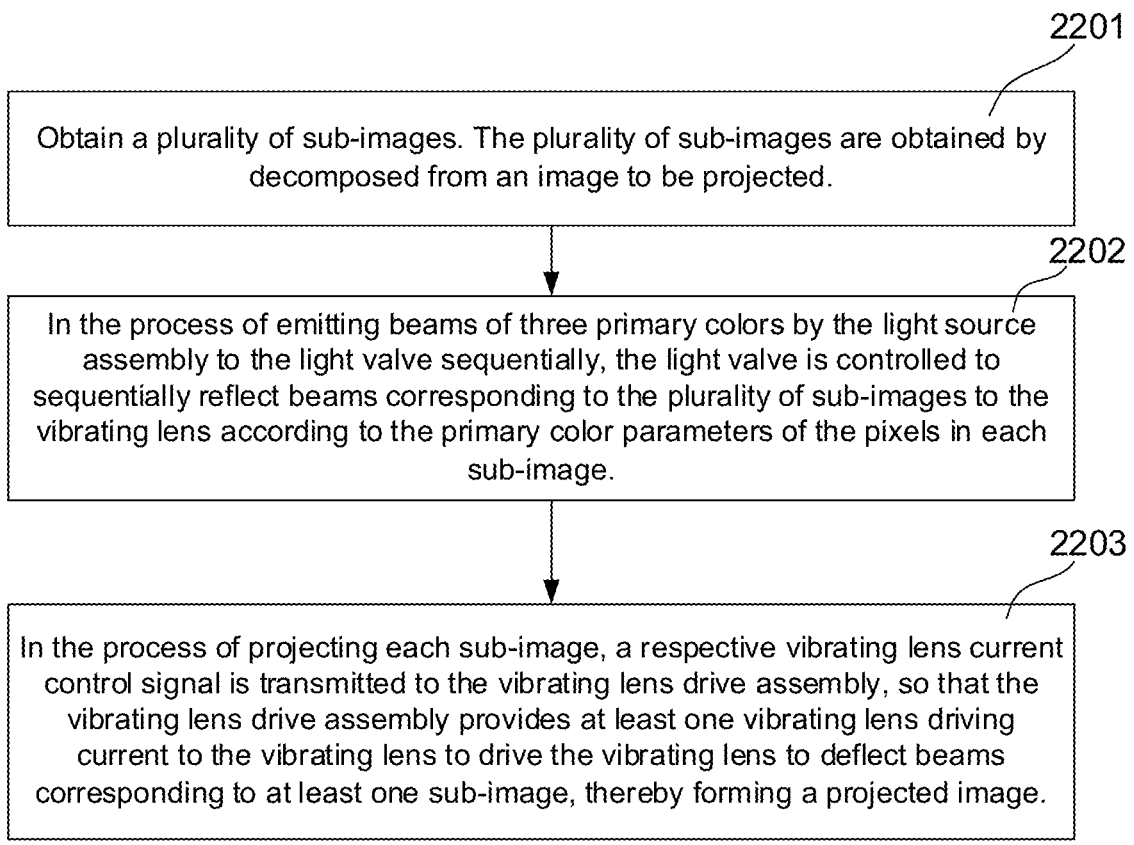
FIG. 24 is a flow diagram of a projection display method, in accordance with some embodiments.
Figure 25:
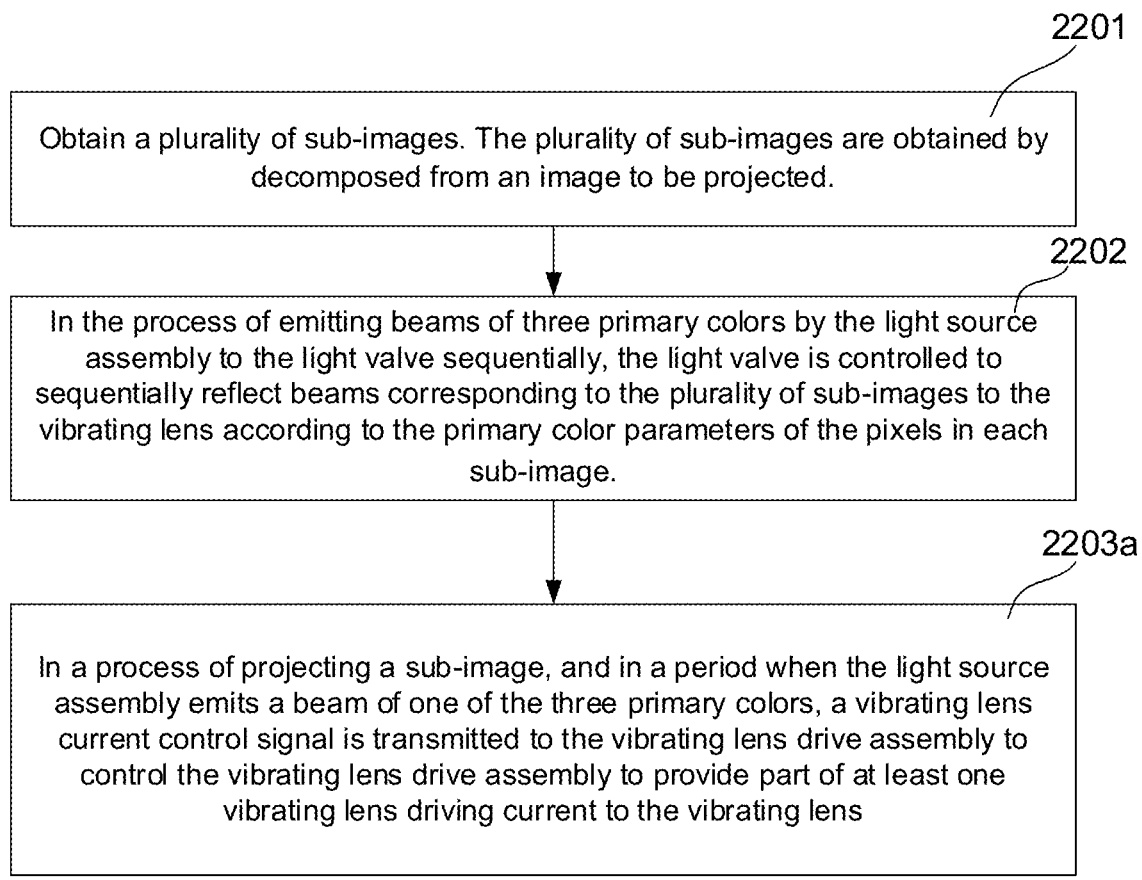
FIG. 25 is a flow diagram of another projection display method, in accordance with some embodiments.

Some embodiments of the present disclosure provide a projection display method, which may be performed by the display control circuit 1 in the projection apparatus shown in FIG. 1 or FIG. 4. As shown in FIGS. 24 and 25, the projection display method includes steps 2201 to 2203.

In step 2201, a plurality of sub-images are obtained. The plurality of sub-images are obtained by decomposing an image to be projected.

If the resolution of the image to be projected is greater than that of the light valve 3, the image to be projected may be decomposed into a plurality of sub-images. A resolution of each decomposed sub-image is less than or equal to the resolution of the light valve 3. For example, a resolution of the image is M×N, and the resolution of the light valve 3 is M1×N1. M, N, M1 and N1 are all positive integers greater than 1. M is the number of pixels per row in the image, and N is the number of pixels per column in the image. M1 is the number of micromirrors 31 per row of the light valve 3, and N1 is the number of micromirrors 31 per column of the light valve 3. In a case where M is greater than M1 and N is greater than N1, the image to be projected may be decomposed into a plurality of sub-images each with a resolution of m1×n1. m1 is the number of pixels per row in each sub-image, and n1 is the number of pixels per column in each sub-image; m1 is less than or equal to M1, and n1 is less than or equal to N1.

For example, the resolution of the image to be projected is 3840×2160. That is, M is 3840 and N is 2160. The resolution of the light valve 3 is 1920×1080. That is, M1 is 1920 and N1 is 1080. Then, the resolution of each sub-image may be set to 1920×1080. That is, m1 is 1920 and n1 is 1080.

In the following embodiments, for convenience of description, an example is taken where the resolution of the image to be projected is 4K (i.e. 3840×2160), and the resolution of each sub-image is 2K (i.e., 1920×1080). In this case, the number of the sub-images obtained by decomposing the image to be projected is four. That is, the image to be projected may be decomposed into four sub-images.

In step 2202, in the process of emitting beams of three primary colors by the light source assembly 2 to the light valve 3 sequentially, the light valve 3 is controlled to sequentially reflect beams corresponding to the plurality of sub-images to the vibrating lens 5 according to the primary color parameters (e.g., gradation values) of the pixels in each sub-image.

Figure 26:
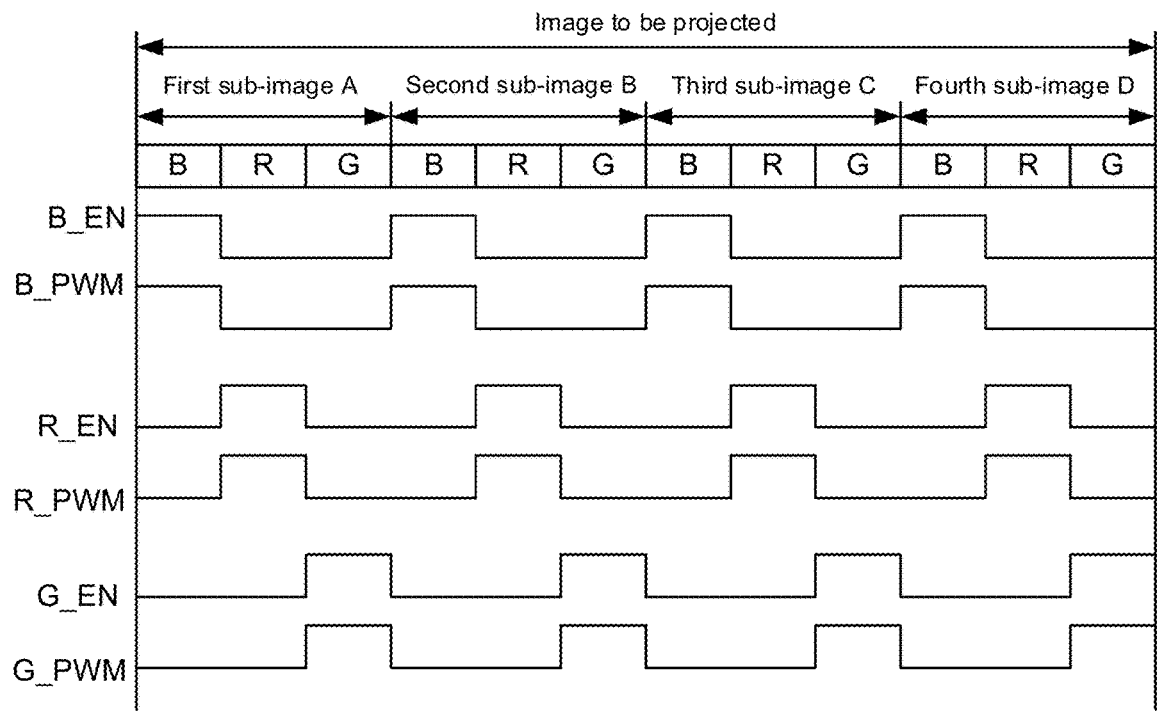
FIG. 26 is a timing diagram of laser beams of primary colors, in accordance with some embodiments.

In these embodiments, if the resolution of the image to be projected is greater than that of the light valve 3, the image to be projected will be decomposed into the plurality of sub-images and the sub-images will be displayed in sequence. That is, as shown in FIG. 26, in a display cycle of the image to be projected, the plurality of sub-images are displayed in sequence. In this case, the display cycle of the image to be projected is a sum of display cycles of the sub-images. Moreover, the display cycle of the image to be projected is the reciprocal of the refresh rate of the projection apparatus.

For example, as shown in FIG. 26, in a process of projecting a sub-image, the light source assembly 2 emits blue, red and green laser beams sequentially. For example, the light source assembly 2 emits a blue beam in a time period T1, a red beam in a time period T2, and a green beam in a time period T3. Time for the light source assembly 2 to complete the sequential emission of the beams of the three primary colors once is a cycle for the light source assembly 2 to output the beams of the three primary colors. In a display cycle of the sub-image, the light source assembly 2 performs the sequential emission of the beams of the three primary colors once. Therefore, the display cycle of the sub-image is equal to the cycle for the light source assembly 2 to emit the beams of the three primary colors, which equals to a sum of T1, T2 and T3.

For example, the light source assembly 2 includes a blue laser 21, a red laser 22, and a green laser 23. The light source drive circuit 10 may include three laser drive circuits, which are a first laser drive circuit 101, a second laser drive circuit 102 and a third laser drive circuit 103.

In some embodiments, after obtaining the plurality of sub-images, the display control circuit 1 may generate and output, according to each primary color component of each sub-image, a brightness adjustment signal to a respective one of the three lasers, and generate and output, according to a ratio of an operation period of the respective one of the three lasers to a driving cycle, enable signals to the respective one of the three lasers. The driving cycle may be a display cycle of a sub-image.

For example, the display control circuit 1 may generate and output a blue brightness adjustment signal B_PWM to the first laser drive circuit 101 according to a blue component of a sub-image, and generate and output a blue light enable signal B_EN to the first laser drive circuit 101 according to a ratio of an operation period of the blue laser 21 to a driving cycle, so that the first laser drive circuit 101 provides a corresponding laser driving current to the blue laser 21, so as to drive the blue laser 21 to emit a blue laser beam.

The display control circuit 1 may generate and output a red brightness adjustment signal R_PWM to the second laser drive circuit 102 according to a red component of the sub-image, and generate and output a red light enable signal R_EN to the second laser drive circuit 102 according to a ratio of an operation period of the red laser 22 to the driving cycle, so that the second laser drive circuit 102 provides a corresponding laser driving current to the red laser 22, so as to drive the red laser 22 to emit a red laser beam.

The display control circuit 1 may generate and output a green brightness adjustment signal G_PWM to the third laser drive circuit 103 according to a green component of the sub-image, and generate and output a green light enable signal G_EN to the third laser drive circuit 103 according to a ratio of an operation period of the green laser 23 to the driving cycle, so that the third laser drive circuit 103 provides a corresponding laser driving current to the green laser 23, so as to drive the green laser 23 to emit a green laser beam.

In some examples, in a process of projecting a sub-image, when the light source assembly 2 emits a laser beam with one of the three primary colors, the display control circuit 1 may output color gradation values (i.e., color parameters) of pixels in the sub-image to the light valve 3. The light valve 3 converts the received color gradation values of the pixels in the sub-image into driving signals, and controls, according to the driving signals, respective micromirrors 31 in the light valve 3 to rotate at different angles (e.g., plus or minus 12 degrees), and controls, according to the driving signals, a length of time during which each of the corresponding micromirror 31 is stationary, so as to achieve the color gradation values. The color gradation valves may be gray scales. The color gradation value is, for example, a red green blue (RGB) gradation value.

For example, referring to FIG. 26, in a process of projecting the first sub-image, when the light source assembly 2 emits a red laser beam, the display control circuit 1 outputs gray scales of red pixels in the first sub-image to the light valve 3. The light valve 3 converts the received gray scales of the red pixels into driving signals, and controls, according to the driving signals, micromirrors 31 corresponding to the red pixels in the light valve 3 to rotate at different angles, and controls, according to the driving signals, a length of time during which each of the corresponding micromirror 31 is stationary, so as to achieve the gray scale values of the red pixels in the first sub-image. When the light source assembly 2 emits a blue laser beam or a green laser beam, the process of achieving the gray scale values of the blue pixels and the green pixels in the first sub-image is similar thereto, and will not be repeated here.

In step 2203, in the process of projecting each sub-image, a respective vibrating lens current control signal is transmitted to the vibrating lens drive assembly, so that the vibrating lens drive assembly provides at least one vibrating lens driving current to the vibrating lens to drive the vibrating lens to deflect beams corresponding to at least one sub-image, thereby forming a projected image.

Figure 27:
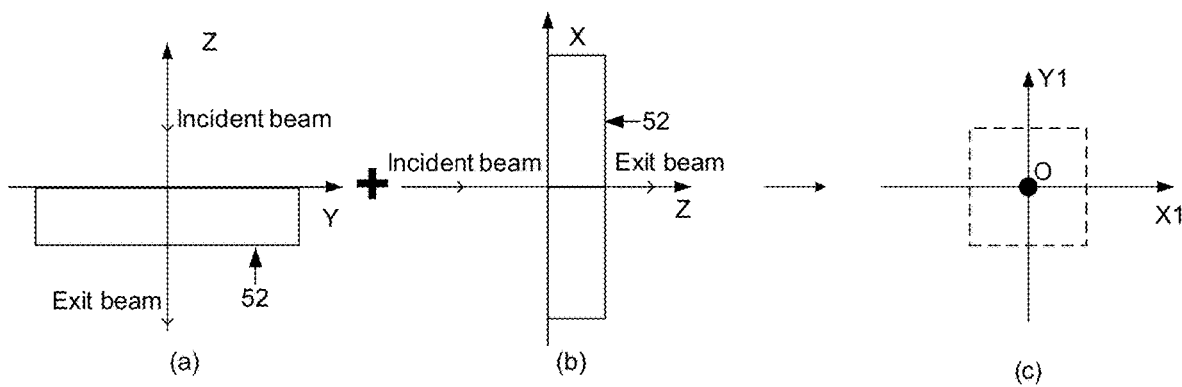
FIG. 27 is a schematic diagram of a position of a laser beam projected onto a projection screen when a light-transmissive assembly in a vibrating lens is at an original position, in accordance with some embodiments.

In order to superimpose the plurality of sub-images to improve the resolution of the image to be projected, each sub-image may have a different projection position. In order to define the projection position, in some examples, as shown in FIG. 27, a projection coordinate system is established, in which a center point of the projection screen is taken as the origin O, a horizontal direction of the projection screen is the horizontal axis X1, and a vertical direction of the projection screen is the vertical axis Y1. Here, the projection position of the sub-image may refer to the position of the pixel at the center of the sub-image in the projection coordinate system.

After an image to be projected is decomposed into a plurality of sub-images, a projection position of each sub-image may be predetermined according to the number of the sub-images. For example, an image to be projected is decomposed into four sub-images, and the projection positions of the four sub-images may be (−d1, −d1), (−d1, d1), (d1, d1) and (d1, −d1) in the projection coordinate system. For another example, an image to be projected is decomposed into two sub-images, and the projection positions of the two sub-images may be (−d1, −d1) and (0, 0) in the projection coordinate system, or the projection positions of the two sub-images may be (0, 0) and (d1, d1) in the projection coordinate system. Of course, the projection position of each sub-image may be configured according to the configuration of the projection apparatus, which is not limited in the embodiments of the present disclosure.

In order to make different sub-images have different projection positions, the rotation positions of the light-transmissive assembly 52 in the vibrating lens 5 may be different for the different projection positions of the plurality of sub-images. That is, in a case where the light-transmissive assembly 52 in the vibrating lens 5 rotates to one of the rotation positions, the projection beam passing through the light-transmissive assembly 52 may reach a corresponding projection position.

For example, in a case where an image to be projected is decomposed into four sub-images, the four rotation positions of the light-transmissive assembly 52 corresponding to the four sub-images are a first rotation position, a second rotation position, a third rotation position, and a fourth rotation position. For examples, the first rotation position corresponds to the projection position A shown in FIG. 17; the second rotation position corresponds to the projection position B shown in FIG. 17; the third rotation position corresponds to the projection position C shown in FIG. 17; the fourth rotation position corresponds to the projection position D shown in FIG. 17. When the light-transmissive assembly 52 in the vibrating lens 5 rotates to the first rotation position, the first sub-image of the four sub-images is projected to (−d1, −d1) in the projection coordinate system. When the light-transmissive assembly 52 in the vibrating lens 5 rotates to the second rotation position, the second sub-image of the four sub-images is projected to (−d1, d1) in the projection coordinate system. When the light-transmissive assembly 52 in the vibrating lens 5 rotates to the third rotation position, the third sub-image of the four sub-images is projected to (d1, d1) in the projection coordinate system. When the light-transmissive assembly 52 in the vibrating lens 5 rotates to the fourth rotation position, the fourth sub-image of the four sub-images is projected to (d1, −d1) in the projection coordinate system.

Correspondingly, in order to make the light-transmissive assembly 52 have different rotation positions when different sub-images are projected, the vibrating lens current control signals corresponding to the different sub-images are different. In this case, the display control circuit 1 transmits, according to a predetermined projection position of each sub-image, a respective vibrating lens current control signal to the vibrating lens drive assembly 4. The vibrating lens drive assembly 4 provides part of at least one respective vibrating lens driving current to the vibrating lens 5 according to the respective vibrating lens current control signal. The light-transmissive assembly 52 in the vibrating lens 5 rotates to a first rotation position corresponding to the first sub-image according to the at least one respective vibrating lens driving current.

For example, an image to be projected is decomposed into four sub-images, and the projection positions of the four sub-images may be (−d1, −d1), (−d1, d1), (d1, d1) and (d1, −d1) in the projection coordinate system. For example, in a process of projecting a first sub-image, the display control circuit 1 transmits, according to the projection position of (−d1, −d1), a first vibrating lens current control signal to the vibrating lens drive assembly 4. The vibrating lens drive assembly 4 provides part of at least one vibrating lens driving current to the vibrating lens 5 according to the first vibrating lens current control signal. Therefore, the pixel at the center of the sub-image projected by the vibrating lens 5 is located at the projection position of (−d1, −d1) in the projection coordinate system.

For another example, an image to be projected is decomposed into two sub-images, and the projection positions of the two sub-images are (0, 0) and (−d1, −d1) in the projection coordinate system. In a process of projecting a first sub-image, the display control circuit 1 transmits, according to the projection position of (0, 0) in the projection coordinate system, a first vibrating lens current control signal to the vibrating lens drive assembly 4, and the vibrating lens drive assembly 4 does not provide a vibrating lens driving currents to the vibrating lens 5 according to the first vibrating lens current control signal. In this case, the light-transmissive assembly 52 in the vibrating lens 5 is at the initial position (i.e., the first rotation position corresponding to the first sub-image), the pixel at the center of the sub-image projected by the vibrating lens 5 is located at the origin O of the projection coordinate system.

In some embodiments, step 2203 may include step 2203*a*.

In step 2203*a*, in a process of projecting a sub-image, and in a period when the light source assembly 2 emits a beam of one of the three primary colors, a vibrating lens current control signal is transmitted to the vibrating lens drive assembly 4 to control the vibrating lens drive assembly 4 to provide part of at least one vibrating lens driving current to the vibrating lens 5.

For example, in a process of projecting a sub-image, in the period when the light source assembly 2 emits a beam of one primary color, the display control circuit 1 transmits a vibrating lens current control signal to the vibrating lens drive assembly 4 according to the projection position of the sub-image. The vibrating lens drive assembly 4 provides part of at least one vibrating lens driving current to the vibrating lens 5 according to the vibrating lens current control signal. The vibrating lens 5 controls, according to the part of at least one vibrating lens driving current, its light-transmissive assembly 52 to rotate to a rotation position corresponding to the projection position of the sub-image.

The beam of the one primary color may be a blue beam. In this case, during the emission of the blue beam by the light source assembly 2, the light valve 3 reflects the blue beam, and the light-transmissive assembly 52 in the vibrating lens 5 is driven to rotate to a preset position to deflect the blue beam. Then, during the emission of red and green beams by the light source assembly 2, the light-transmissive assembly 52 transmits the red beam and the green beam at its preset position. Since the human eyes are not sensitive to blue, the human eyes may not notice the offset of the sub-image, which may ensure the display effect of the sub-image.

The projection process will be described below by taking an example in which the image to be projected is decomposed into four sub-images.

In the process of projecting the four sub-images, the display control circuit 1 provides four different vibrating lens current control signals to the vibrating lens drive assembly 4 according to the four sub-images, and the vibrating lens drive assembly 4 may provide at least one vibrating lens driving current to the vibrating lens 5 according to the vibrating lens current control signals. In this case, the vibrating lens 5 shown in FIGS. 8, 9 and 10, which is a four-dimensional vibrating lens (also called biaxial vibrating lens), is taken as an example, and the light transmitting assembly 52 in the vibrating lens 5 may be driven by the vibrating lens driving current to rotate about at least one of the first axis X and the second axis Y that are perpendicular to each other.

As described above, when the light-transmissive assembly 52 is driven to rotate about the first axis X, the light-transmissive assembly 52 has two sub-positions, which are a first sub-position and a second sub-position. When the light-transmissive assembly 52 is driven to rotate about the second axis Y, the light-transmissive assembly 52 also has two sub-positions, which are a third sub-position and a fourth sub-position. Then each of the first rotation position, the second rotation position, the third rotation position and the fourth rotation position includes two corresponding sub-positions of the first sub-position, the second sub-position, the third sub-position and the fourth sub-position.

As shown in FIG. 27, when the light-transmissive assembly 52 in the vibrating lens 5 does not rotate, a direction perpendicular to the lens 523 in the vibrating lens 5 is the Za direction where the third axis Z is located. The third axis Z is perpendicular to the first axis X and the second axis Y. As shown in part (a) of FIG. 27, a first coordinate system is established with the second axis Y as the horizontal axis and the third axis Z as the vertical axis. As shown in part (b) of FIG. 27, a second coordinate system is established with the third axis Z as the horizontal axis and the first axis X as the vertical axis. If the vibrating lens drive assembly 4 does not provide the vibrating lens driving current to the vibrating lens 5, the light-transmissive assembly 52 in the vibrating lens 5 is at the initial position. In this case, the light-transmissive assembly 52 in the vibrating lens 5 is perpendicular to the incident beam. That is, the beam is perpendicularly incident to the lens 523 along a direction parallel to the third axis Z. As shown in part (c) of FIG. 27, when the light-transmissive assembly 52 in the vibrating lens 55 is at the initial position, the pixel at the central point of the sub-image formed by the projection beam passing through the lens 523 in the vibrating lens 5 is located at the origin O of the projection coordinate system. The Y1 axis of the projection coordinate system is parallel to the first axis X, and the X1 axis of the projection coordinate system is parallel to the second axis Y.

For convenience of description, in the following embodiments, a vibrating lens driving current that drives the light-transmissive assembly 52 in the vibrating lens 5 to rotate about the first axis X is referred to as a first vibrating lens driving current, and a vibrating lens driving current that drives the light-transmissive assembly 52 in the vibrating lens 5 to rotate about the second axis Y is referred to as a second vibrating lens driving current.

In some embodiments, in the process of projecting the four sub-images, the current directions of the vibrating lens driving current (e.g., each of the first vibrating lens driving current and the second vibrating lens driving current) may alternately change, and the waveform of the vibrating lens driving current may be a sine wave.

As can be seen from the above description, when the light-transmissive assembly 52 in the vibrating lens 5 rotates about the first axis X, the projection beam passing through the light-transmissive assembly 52 in the vibrating lens 5 is deflected in the direction where the second axis Y is located, so that pixels in the sub-image are offset in the X1 direction of the projection screen. When the light-transmissive assembly 52 in the vibrating lens 5 rotates about the second axis Y, the projection beam passing through the light-transmissive assembly 52 in the vibrating lens 5 is deflected in the direction where the first axis X is located, so that pixels in the sub-image are offset in the Y1 direction of the projection screen.

For example, when the light-transmissive assembly 52 in the vibrating lens 5 rotates to the first sub-position with the first axis X as the rotation axis, the projection beam passing through the light-transmissive assembly 52 in the vibrating lens 5 is deflected in a negative direction of the second axis Y, so that pixels in a sub-image are offset in a negative direction of the X1 direction of the projection screen, e.g., to the (−d1, 0) position. When the light-transmissive assembly 52 in the vibrating lens 5 rotates to the second sub-position with the first axis X as the rotation axis, the projection beam passing through the light-transmissive assembly 52 in the vibrating lens 5 is deflected in a positive direction of the second axis Y, so that pixels in another sub-image are offset in a positive direction of the X1 direction of the projection screen, e.g., to the (d1, 0) position. When the light-transmissive assembly 52 in the vibrating lens 5 rotates to the third sub-position with the second axis Y as the rotation axis, the projection beam passing through the light-transmissive assembly 52 in the vibrating lens 5 is deflected in a negative direction of the first axis X, so that pixels in yet another sub-image are offset in a negative direction of the Y1 direction of the projection screen, e.g., to the (0, −d1) position. When the light-transmissive assembly 52 in the vibrating lens 5 rotates to the fourth sub-position with the second axis Y as the rotation axis, the projection beam passing through the light-transmissive assembly 52 in the vibrating lens 5 is deflected in a positive direction of the first axis X, so that pixels in yet another sub-image are offset in a positive direction of the Y1 direction of the projection screen, e.g., to the (0, d1) position.

Figure 28:
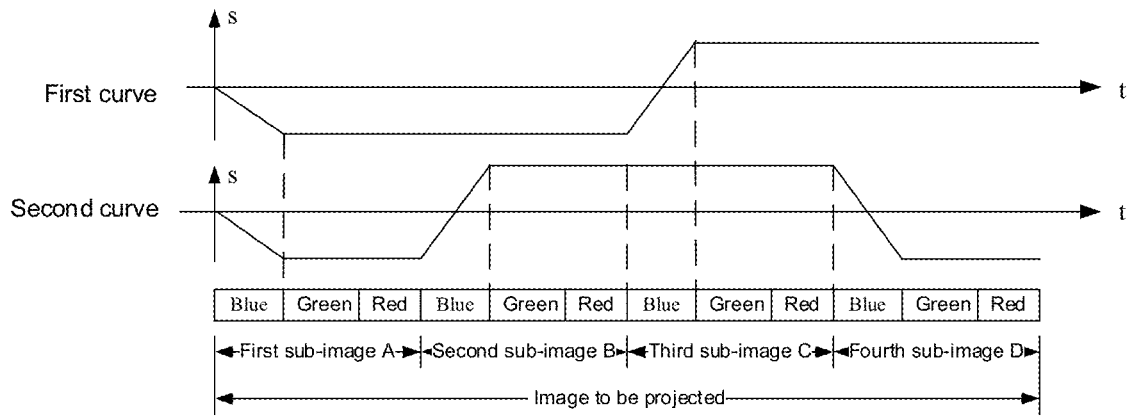
FIG. 28 is a schematic diagram showing rotational positions of a projection beam during rotations of a light-transmissive assembly in a vibrating lens along different axes, in accordance with some embodiments.

FIG. 28 shows a schematic diagram of offset distances of the projection beam during the rotation of the light-transmissive assembly 52 in the vibrating lens 5 with different axes as the rotation axes. This figure shows a first curve and a second curve. The first curve represents an offset distance of the projection beam in the direction of the second axis Y during the rotation of the light-transmissive assembly 52 in the vibrating lens 5 with the first axis X as the rotation axis. The second curve represents an offset distance of the projection beam in the direction of the first axis X during the rotation of the light-transmissive assembly 52 in the vibrating lens 5 with the second axis Y as the rotation axis. The horizontal axis of each curve is time t, and the vertical axis of each curve is an offset distance s of the projection beam during the rotation of the light-transmissive assembly 52 in the vibrating lens 5.

The rotation of the light-transmissive assembly 52 in the vibrating lens 5 driven by the vibrating lens driving current will be described below in detail with reference to FIGS. 28 to 34.

Figure 29:
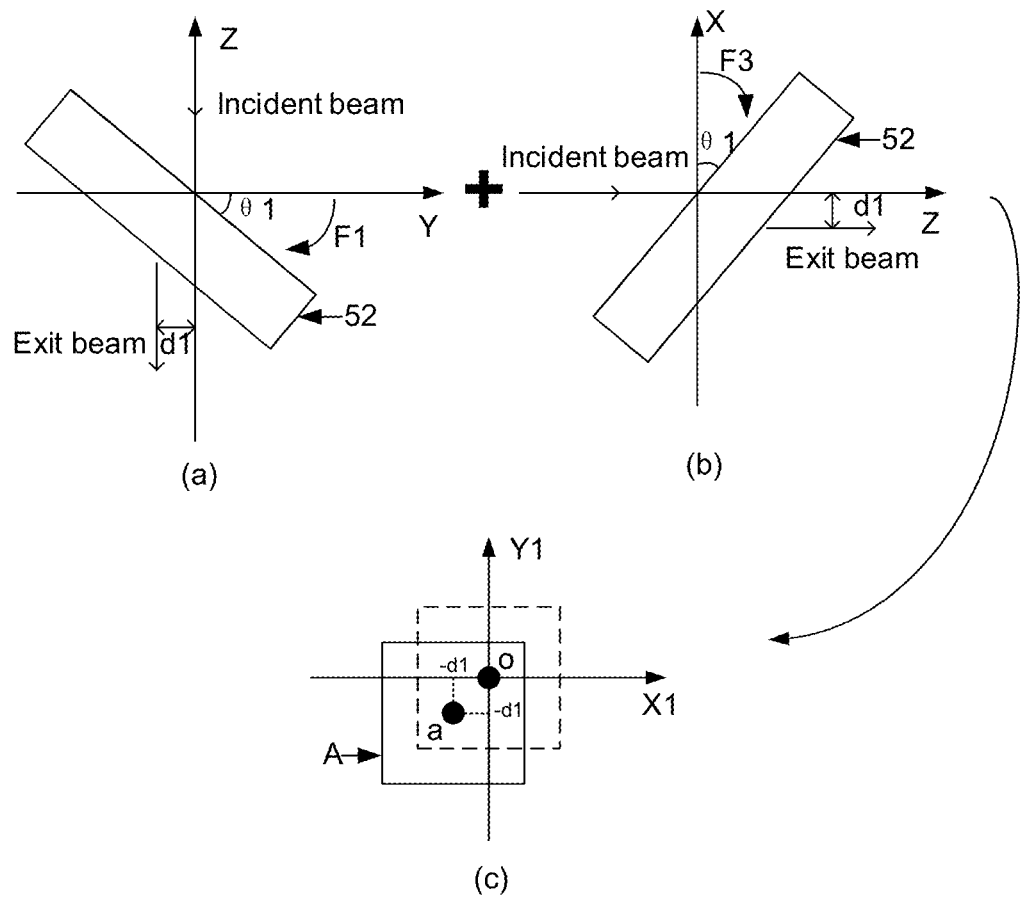
FIG. 29 is a schematic diagram of a position of a first sub-image displayed on a projection screen when a light-transmissive assembly in a vibrating lens is rotated, in accordance with some embodiments.

For example, referring to FIGS. 28 and 29, in the process of projecting a first sub-image A, the light source assembly 2 sequentially emits beams of three primary colors. When the light source assembly 2 emits a blue beam, the light-transmissive assembly 52 in the vibrating lens 5 rotates to the first sub-position with the first axis X as the rotation axis, so that the projection beam of the first sub-image A is deflected toward the negative direction of the second axis Y, and the light-transmissive assembly 52 rotates to the third sub-position (e.g., clockwise) with the second axis Y as the rotation axis (i.e., at the first rotation position combining the first sub-position and the third sub-position), so that the projection beam of the first sub-image A is reflected toward the negative direction of the first axis X. When the light source assembly 2 emits a green beam and a red beam, the position of the light-transmissive assembly 52 in the vibrating lens 5 (i.e., the first rotation position) remains unchanged, and the light-transmissive assembly 52 in the vibrating lens 5 does not rotate until the display of the first sub-image A is completed.

In this case, the display control circuit 1 may transmit a first vibrating lens current control signal to the vibrating lens drive assembly 4. In response to the first vibrating lens current control signal, the vibrating lens drive assembly 4 provides the first vibrating lens driving current to the first coil group 5111, and provides the second vibrating lens driving current to the second coil group 5112.

As shown in part (a) in FIG. 29, the light-transmissive assembly 52 rotates from the initial position to the first sub-position with the first axis X as the rotation axis under driving of the first vibrating lens driving current, and as shown in part (b) in FIG. 29, the light-transmissive assembly 52 rotates from the initial position to the third sub-position with the second axis Y as the rotation axis under driving of the second vibrating lens driving current. The driving of the first vibrating lens driving current and the vibrating lens driving current to the light-transmissive assembly 52 may be realized sequentially or at the same time. That is, the light-transmissive assembly 52 rotates by a first angle θ1 in a first direction F1 (i.e., clockwise) with the first axis X as the rotation axis, so that the projection beam of the first sub-image A is deflected toward the negative direction of the second axis Y, and the pixel at the center in the first sub-image A is offset by a distance d1 in the negative direction of the X1 axis. The light-transmissive assembly 52 rotates by a first angle θ1 in a third direction F3 (i.e., clockwise) with the second axis Y as the rotation axis, so that the projection beam of the first sub-image A is deflected toward the negative direction of the first axis X, and the pixel at the center in the first sub-image A is offset by a distance d1 in the negative direction of the Y1 axis.

As a result, as shown in part (c) of FIG. 29, the coordinates of the pixel at the center of the first sub-image A in the projection coordinate system are (−d1, −d1). That is, the pixel at the center of the first sub-image A is located at the position a of the projection coordinate system.

Figure 30:
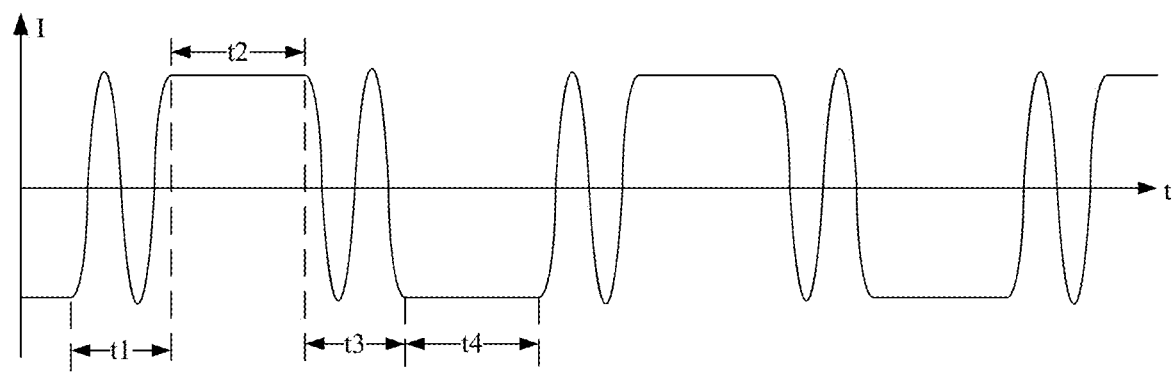
FIG. 30 is a waveform diagram of a vibrating lens driving current for driving a light-transmissive assembly in a vibrating lens to rotate about a second axis, in accordance with some embodiments.

FIG. 30 is a waveform diagram of the second vibrating lens driving current for driving a vibrating lens to rotate about a second axis Y according to some embodiments of the present disclosure. The horizontal axis of the waveform diagram is time t, and the vertical axis of the waveform diagram is the magnitude I of the vibrating lens driving current. In a case where the positive value of the vibrating lens driving current is changed to a negative value, or a negative value of a vibrating lens driving current is changed to a positive value, it indicates that the direction of the vibrating lens driving current is changed.

In a process of projecting a second sub-image B, referring to FIG. 28, the light source assembly 2 emits beams of three primary colors sequentially. When the light source assembly 2 emits another blue beam, the position of the light-transmissive assembly 52 in the vibrating lens 5 remains unchanged at the first sub-position in the negative direction of the second axis Y, so that the projection beam of the second sub-image B remains deflected in the negative direction of the second axis Y in an offset distance in the negative direction of the second axis Y, and the light-transmissive assembly 52 in the vibrating lens 5 rotates from the third sub-position to the fourth sub-position with the second axis Y as the rotation axis (i.e., at the second rotation position combining the first sub-position and the fourth sub-position), so that the projected beam of the second sub-image B is reflected toward the positive direction of the first axis X. When the light source assembly 2 emits another green beam and another red beam, the position of the light-transmissive assembly 52 in the vibrating lens 5 (i.e., the second rotation position) remains unchanged, and the light-transmissive assembly 52 in the vibrating lens 5 does not rotate until the display of the second sub-image B is completed.

In this case, the display control circuit 1 may transmit the second vibrating lens current control signal to the vibrating lens drive assembly 4. In response to the second vibrating lens current control signal, the vibrating lens drive assembly 4 provides the first vibrating lens driving current to the first coil group 5111, and provides the second vibrating lens driving current to the second coil group 5112.

The light-transmissive assembly 52 remains at the first sub-position in the negative direction of the second axis Y under driving of the first vibrating lens driving current, so that the offset distance of the pixel at the center of the second sub-image B in the negative direction of the X1 axis is still d1. The light-transmissive assembly 52 rotates from the third sub-position to the fourth sub-position with the second axis Y as the rotation axis under driving of the vibrating lens driving current. The waveform of the second vibrating lens driving current may be referred to segments t1 and t2 in the current waveform diagram shown in FIG. 30. Referring to part (a) in FIG. 31, when the second vibrating lens driving current is at the segment t1, the vibrating lens driving current changes from a negative current (i.e., a negative direction) to a positive current (i.e., a positive direction), and the light-transmissive assembly 52 in the vibrating lens 5 rotates from the third sub-position to the fourth sub-position with the second axis Y as the rotation axis. That is, the light-transmissive assembly 52 rotates in a fourth direction F4 (i.e., counterclockwise) with the second axis Y as the rotation axis by a second angle θ2, and θ2=2×θ1, so that the projection beam of the second sub-image B is deflected toward the positive direction of the first axis X, and the pixel at the center of the second sub-image B is offset from the negative direction of the Y1 axis to the positive direction of the Y1 axis by a distance d2, and d2=2×d1, that is, the offset distance of the pixel at the center of the second sub-image B in the positive direction of the Y1 axis is d1. When the second vibrating lens driving current is at the segment t2, the second vibrating lens driving current remains unchanged, the offset distance of the pixel at the center of the second sub-image B in the positive direction of the Y1 axis is still d1.

Figure 31:
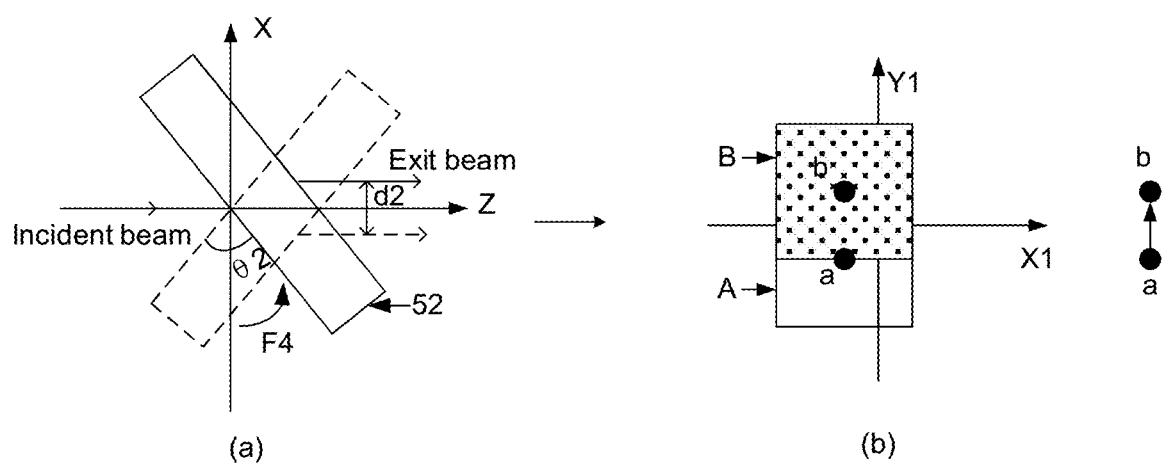
FIG. 31 is a schematic diagram of positions of first and second sub-images displayed on a projection screen before and after the light-transmissive assembly in the vibrating lens is rotated, respectively, in accordance with some embodiments.

Referring to part (b) in FIG. 31, the coordinates of the pixel at the center in the second sub-image B in the projection coordinate system are (−d1, d1). That is, the pixel at the center in the second sub-image B is located at the position b of the projection coordinate system.

In a process of projecting a third sub-image C, referring to FIG. 28, the light source assembly 2 emits beams of three primary colors sequentially. When the light source assembly 2 emits yet another blue beam, the light-transmissive assembly 52 in the vibrating lens 5 rotates from the first sub-position to the second sub-position with the first axis X as the rotation axis, so that the projection beam of the third sub-image C is deflected toward the positive direction of the second axis Y, and the position of the light-transmissive assembly 52 in the vibrating lens 5 remains unchanged at the fourth sub-position in the positive direction of the first axis X (i.e., at the third rotation position combining the second sub-position and the fourth sub-position), so that the projection beam of the third sub-image C remains deflected in the positive direction of the first axis X. When the light source assembly 2 emits yet another green beam and yet another red beam, the position of the light-transmissive assembly 52 in the vibrating lens 5 (i.e., the third rotation position) remains unchanged, and the light-transmissive assembly 52 in the vibrating lens 5 does not rotate until the display of the third sub-image C is completed.

In this case, the display control circuit 1 may transmit a third vibrating lens current control signal to the vibrating lens drive assembly 4. In response to the third vibrating lens current control signal, the vibrating lens drive assembly 4 provides the first vibrating lens driving current to the first coil group 5111, and provides the second vibrating lens driving current to the second coil group 5112.

Figure 32:
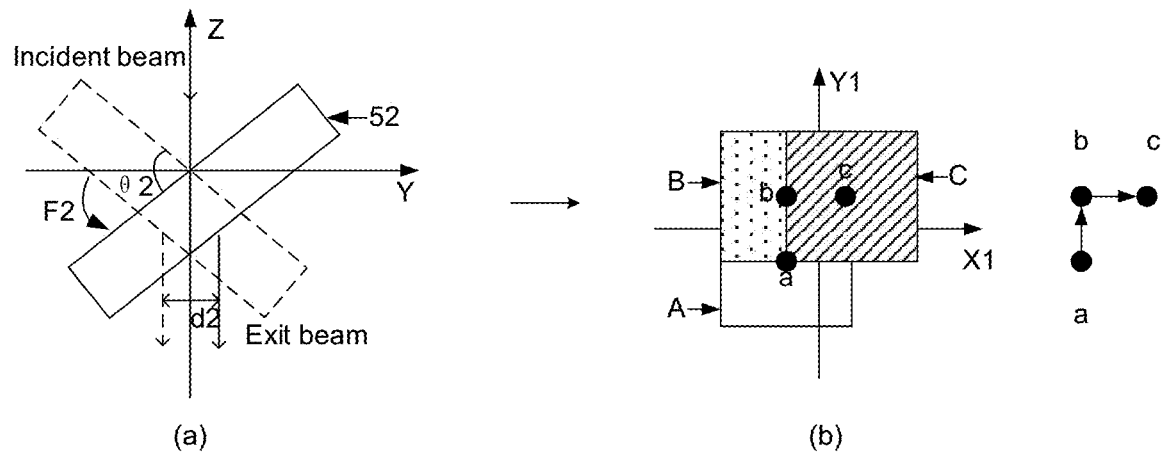
FIG. 32 is a schematic diagram of a position of a third sub-image displayed on a projection screen after the light-transmissive assembly in the vibrating lens is rotated, in accordance with some embodiments.

Referring to part (a) in FIG. 32, the light-transmissive assembly 52 rotates from the first sub-position to the second sub-position with the first axis X as the rotation axis under driving of the first vibrating lens driving current. That is, the light-transmissive assembly 52 rotates in the second direction F2 (counterclockwise) by a second angle θ2, and θ2=2×θ1, so that the projection beam of the third sub-image C is deflected toward the positive direction of the second axis Y, and the pixel at the center of the third sub-image C is offset from the negative direction of the X1 axis to the positive direction of the X1 axis by a distance d2, and d2=2×d1. Moreover, the light-transmissive assembly 52 in the vibrating lens 5 remain unchanged at the fourth sub-position in the positive direction of the first axis X under driving of the second vibrating lens driving current, so that the offset distance of the pixel at the center in the third sub-image C in the positive direction of the Y1 axis is still d1.

Referring to part (b) in FIG. 32, the coordinates of the pixel at the center of the third sub-image C in the projection coordinate system are (d1, d1). That is, the pixel at the center of the third sub-image C is located at the position c of the projection coordinate system.

In the process of projecting a fourth sub-image D, referring to FIG. 28, the light source assembly 2 emits beams of three primary colors sequentially. When the light source assembly 2 emits yet another blue beam, the position of the light-transmissive assembly 52 in the vibrating lens 5 remains unchanged at the second sub-position in the positive direction of the second axis Y, so that the projection beam of the fourth sub-image D remains deflected in the positive direction of the second axis Y, and the light-transmissive assembly 52 in the vibrating lens 5 rotates from the fourth sub-position to the third sub-position with the second axis Y as the rotation axis (i.e., at the fourth rotation position combining the second sub-position and the third sub-position), so that the projection beam of the fourth sub-image D is deflected toward the negative direction of the first axis X. When the light source assembly 2 emits yet another green beam and yet another red beam, the position of the light-transmissive assembly 52 in the vibrating lens 5 (i.e., the fourth rotation position) remains unchanged, and the light-transmissive assembly 52 in the vibrating lens 5 does not rotate until the display of the fourth sub-image D is completed.

In this case, the display control circuit 1 may transmit the fourth vibrating lens current control signal to the vibrating lens drive assembly 4. In response to the fourth vibrating lens current control signal, the vibrating lens drive assembly 4 provides the first vibrating lens driving current to the first coil group 5111, and provides the second vibrating lens driving current to the second coil group 5112.

The light-transmissive assembly 52 in the vibrating lens 5 remain unchanged at the second sub-position in the positive direction of the second axis Y under driving of the first vibrating lens driving current, so that the offset distance of the pixel at the center in the fourth sub-image D in the positive direction of the X1 axis is still d1. The light-transmissive assembly 52 in the vibrating lens 5 rotates from the fourth sub-position to the third sub-position with the second axis Y as the rotation axis under driving of the second vibrating lens driving current.

The waveform of the second vibrating lens driving current may be referred to as segments t3 and t4 in the current waveform diagram shown in FIG. 30. Referring to part (a) in FIG. 33, when the second vibrating lens driving current is at the segment t3, the second vibrating lens driving current changes from a positive current (i.e., the positive direction) to a negative current (i.e., the negative direction), and the light-transmissive assembly 52 in the vibrating lens 5 rotates from the fourth sub-position to the third sub-position with the second axis Y as the rotation axis. That is, the light-transmissive assembly 52 rotates in a third direction F3 (i.e., clockwise) with the second axis Y as the rotation axis by a second angle θ2, and θ2=2×θ1, so that the projection beam of the fourth sub-image D is deflected toward the negative direction of the first axis X, and the pixel at the center of the fourth sub-image D is offset from the positive direction of the Y1 axis to the negative direction of Y1 by a distance d2, and d2=2×d1, that is the offset distance of the pixel at the center in the fourth sub-image D in the negative direction of the Y1 axis is d1. When the second vibrating lens driving current is at the segment t4, the second vibrating lens driving current remains unchanged, the offset distance of the pixel at the center in the fourth sub-image D in the negative direction of the Y1 axis is still d1.

Figure 33:
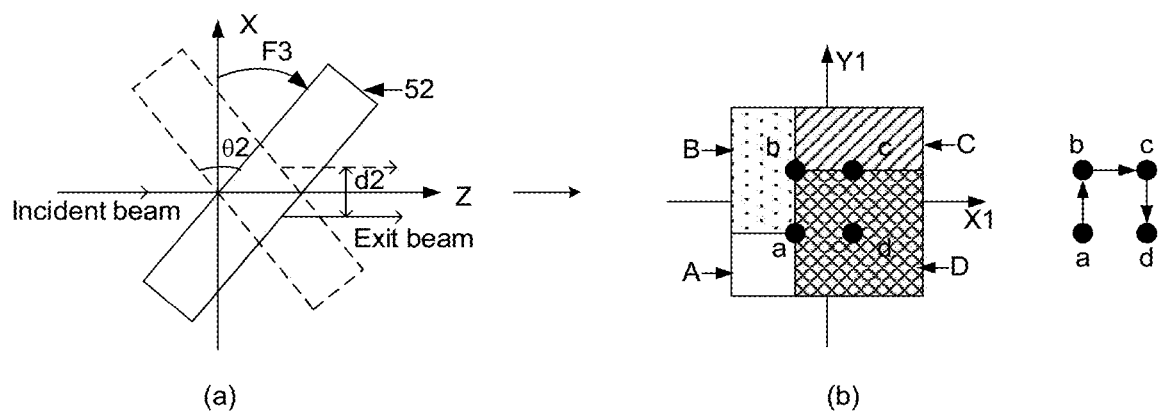
FIG. 33 is a schematic diagram of a position of a fourth sub-image displayed on a projection screen after the light-transmissive assembly in the vibrating lens is rotated, in accordance with some embodiments.

Referring to part (b) in FIG. 33, the coordinates of the pixel at the center of the fourth sub-image D in the projection coordinate system are (d1, −d1). That is, the pixel at the center of the fourth sub-image D is located at the position d of the projection coordinate system.

Through the above methods, the first sub-image A, the second sub-image B, the third f sub-image C and the fourth sub-image D can be superimposed and displayed on the projection screen. Without losing pixel information of the image, it is possible to display the image with a high resolution through a projection apparatus with a low resolution.

It will be understood that, in a case where an image to be projected is the first image, and before the first sub-image A is projected, the light-transmissive assembly 52 in the vibrating lens 5 is at the initial position, i.e., the (0, 0) position. In a case where the projection position of the first sub-image A is (−d1, −d2), the light-transmissive assembly 52 in the vibrating lens 5 needs to rotate with the first axis X and the second axis Y as the rotation axes simultaneously. However, in a case where the image to be projected is not the first image, and before the first sub-image A is projected, the light-transmissive assembly 52 in the vibrating lens 5 is at a projection position where the fourth sub-image D in the previous image is projected, i.e., the position (d1, −d1). In this case, the light-transmissive assembly 52 in the vibrating lens 5 only needs to rotate with the first axis X as the rotation axis to reach a projection position (−d1, −d1) where the first sub-image A is projected.

Figure 34:
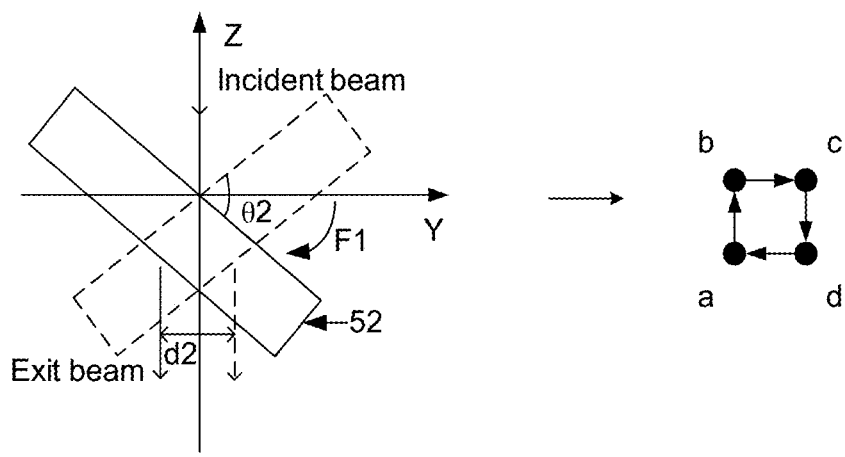
FIG. 34 is a schematic diagram of a position of another first sub-image displayed on a projection screen after the light-transmissive assembly in the vibrating lens is rotated, in accordance with some embodiments.

Referring to FIGS. 28 and 34, in the process of projecting a first sub-image A of a next image, the light source assembly 2 emits beams of three primary colors sequentially. When the light source assembly 2 emits yet another blue beam, the light-transmissive assembly 52 in the vibrating lens 5 rotates from the second sub-position to the first sub-position with the first axis X as the rotation axis, so that projection beam of the first sub-image A of the next image is reflected toward the negative direction of the second axis Y. Moreover, the rotation position of the light-transmissive assembly 52 in the vibrating lens 5 remains unchanged at the third sub-position in the negative direction of the first axis X (i.e., at the first rotation position combing the first sub-position and the third sub-position), so that the projection beam of the first sub-image A of the next image remains deflected in the negative direction of the first axis X. When the light source assembly 2 emits yet another green beam and yet another red beam, the position of the light-transmissive assembly 52 in the vibrating lens 5 (i.e., the first rotation position) remains unchanged, and the light-transmissive assembly 52 in the vibrating lens 5 does not rotate until the display of the first sub-image A of the next image is completed.

In this case, the display control circuit 1 may transmit another first vibrating lens current control signal to the vibrating lens drive assembly 4. In response to the another first vibrating lens current control signal, the vibrating lens drive assembly 4 provides the first vibrating lens driving current to the first coil group 5111, and provides the second vibrating lens driving current to the second coil group 5112.

Referring to FIG. 34, the light-transmissive assembly 52 in the vibrating lens 5 rotates from the second sub-position to the first sub-position with the first axis X as the rotation axis under driving of the first vibrating lens driving current. That is, the light-transmissive assembly 52 rotates in a first direction F1 (i.e., clockwise) with the first axis X as the rotation axis by a second angle θ2, and θ2=2×θ1, so that the projection beam of the first sub-image A of the next image is deflected toward the negative direction of the second axis Y, and the pixel at the center in the first sub-image A of the next image is offset from the positive direction of the X1 axis to the negative direction of X1 by a distance d2, and d2=2×d1, that is the offset distance of the pixel at the center in the first sub-image A of the next image in the negative direction of the X1 axis is d1. The light-transmissive assembly 52 in the vibrating lens 5 remains unchanged at the third sub-position in the negative direction of the first axis X under driving of the second vibrating lens driving current, so that the offset distance of the pixel at the center in the first sub-image A of the next image in the negative direction of the Y1 axis is still d1.

As a result, the coordinates of the pixel at the central point of the first sub-image A of the next image in the projection coordinate system are (−d1, −d1). That is, the pixel at the central point of the first sub-image A of the next image is located at the position a of the projection coordinate system.

According to the above method, a plurality of continuous images can be projected on the projection screen.

In the embodiments of the present disclosure, the waveform of each of the first and second vibrating lens driving currents may be a sine wave. The harmonic component of the sine wave is less, so that noise generated in an electromagnetic driving process when the vibrating lens rotates is less, and the required electromagnetic torque is small, thereby reducing coil heating.

For example, an initial position of the mirror surface of the vibrating lens 5 is an oscillating reference position. In a case where the driving current with the waveform shown in FIG. 30 is applied in the projection apparatus to rotate the light-transmissive assembly 52 in the vibrating lens 5, the positive and negative swing amplitude of the mirror surface of the vibrating lens 5 may be relatively small, the deformation of the bearing plate 520 of the vibrating lens 5 may be small, and the positive and negative swing may help to restore the elasticity of the bearing plate 520, which may have relatively low design requirements on the bearing plate 520 and reduce a failure rate of the bearing plate 520. As a result, the service life of the bearing plate 520 may be prolonged, and the service life of the vibrating lens 5 may be prolonged.

In addition, as shown in FIG. 30, the waveform of the second vibrating lens driving current may be positive and negative symmetrical, so the amplitude of the second vibrating driving current may be relatively small. For example, in a case where the projection sub-image needs to achieve the displacement of 2.7 μm in one direction, and the waveform of second vibrating lens driving current is positive and negative symmetrical, an amplitude of vibrating lens driving current may only need to make the displacement of the projection sub-image in the positive direction or the negative direction reach (2.7/2) μm, i.e., 1.35 μm. In this way, the magnitude of the vibrating lens driving current may be reduced.

Figure 35:
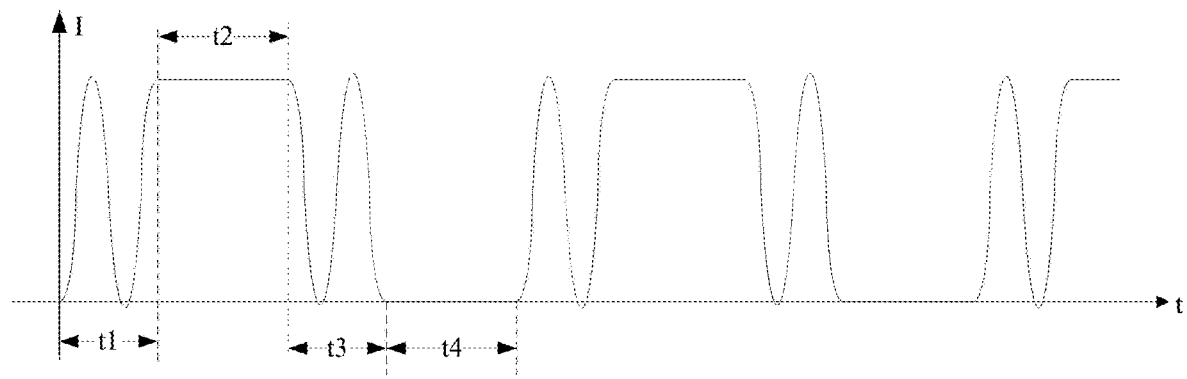
FIG. 35 is a waveform diagram of another vibrating lens driving current for driving a light-transmissive assembly in another vibrating lens to rotate about a second axis, in accordance with some embodiments.

FIG. 35 is a waveform diagram showing another second vibrating lens driving current for driving the vibrating lens to rotate along the second axis Y according to some other embodiments. The horizontal axis of the waveform diagram is time t, and the vertical axis of the waveform diagram is the magnitude I of the driving current.

Referring to FIG. 35, the second vibrating lens driving currents for driving the light-transmissive assembly 52 in the vibrating lens 5 to rotate about the second axis Y are all positive currents. In this case, when the light-transmissive assembly 52 in the vibrating lens 5 rotates about the first axis X, the light-transmissive assembly 52 has a fifth sub-position, and when the light-transmissive assembly 52 in the vibrating lens 5 rotates about the second axis Y, the light-transmissive assembly 52 has a sixth position.

In the process of projecting a first sub-image A, the light source assembly 2 emits beams of three primary colors sequentially. The light-transmissive assembly 52 in the vibrating lens 5 remains at the initial position (i.e., the first rotation position) without rotating, that is, the position (0, 0), and the projection beam of the first sub-image A remains at the initial position without deflected.

In this case, the display control circuit 1 may transmit the first vibrating lens current control signal to the vibrating lens drive assembly 4. In response to the first vibrating lens current control signal, the vibrating lens drive assembly 4 does not provide a first vibrating lens driving current to the first coil group 5111, and does not provide a second vibrating lens driving current to the second coil group 5112.

In a process of projecting a second sub-image B, the light source assembly 2 emits beams of three primary colors sequentially. When the light source assembly 2 emits a blue beam, the light-transmissive assembly 52 in the vibrating lens 5 rotates from the initial position to the sixth sub-position with the second axis Y as the rotation axis (i.e., the second rotation position is the sixth sub-position), so that the projection beam of the second sub-image B is deflected toward the positive direction of the first axis X. When the light source assembly 2 emits a green beam and a red beam, the position of the light-transmissive assembly 52 in the vibrating lens 5 (i.e., the second rotation position) remains unchanged. That is, the light-transmissive assembly 52 in the vibrating lens 5 does not rotate until the display of the second sub-image B is completed.

In this case, the display control circuit 1 may transmit the second vibrating lens current control signal to the vibrating lens drive assembly 4. In response to the second vibrating lens current control signal, the vibrating lens drive assembly 4 provides the second vibrating lens driving current to the second coil group 5112, and does not provide the first vibrating lens driving current to the first coil group 5111. The waveform of the second vibrating lens driving current may be referred to as segments t1 and t2 in the current waveform diagram shown in FIG. 35.

Figure 36:
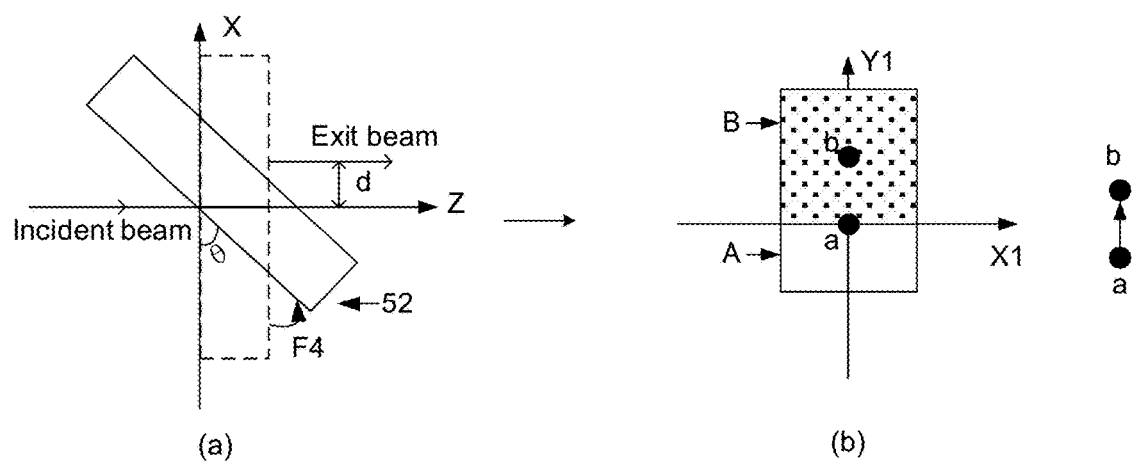
FIG. 36 is a schematic diagram of positions of first and second sub-images displayed on a projection screen before and after the light-transmissive assembly in the another vibrating lens is rotated, respectively, in accordance with some embodiments.

As shown in part (a) in FIG. 36, when the second vibrating lens driving current is at the segment t1, the light-transmissive assembly 52 in the vibrating lens 5 rotates to the sixth sub-position with the second axis Y as the rotation axis. That is, the light-transmissive assembly 52 rotates by an angle θ in a fourth direction F4 (i.e., counterclockwise) with the second axis Y as the rotation axis, so that the projection beam of the second sub-image B is deflected toward the positive direction of the first axis X, and the pixel at the center of the second sub-image B is offset by a distance d from the initial position of the Y1 axis to the positive direction of the Y1 axis. When the second vibrating lens driving current is at the segment t2, the second vibrating lens driving current remains unchanged, and the offset distance of the pixel at the center in the second sub-image B in the positive direction of the Y1 axis is still d.

Referring to part (b) in FIG. 36, the coordinates of the pixel at the center of the second sub-image B in the projection coordinate system are (0, d). That is, the pixel at the center of the second sub-image B is located at the position b of the projection coordinate system.

In a process of projecting a third sub-image C, the light source assembly 2 emits beams of three primary colors sequentially. When the light source assembly 2 emits another blue beam, the light-transmissive assembly 52 in the vibrating lens 5 rotates from the initial position to the fifth sub-position with the first axis X as the rotation axis, so that the projection beam of the third sub-image C is deflected toward the positive direction of the second axis Y. Moreover, the position of the light-transmissive assembly 52 in the vibrating lens 5 remains unchanged at the sixth sub-position in the positive direction of the first axis X (i.e., at the third rotation position combing the fifth sub-position and the sixth sub-position), so that the projection beam of the third sub-image C remains deflected in the positive direction of the first axis X. When the light source assembly 2 emits another green beam and another red beam, the position of the light-transmissive assembly 52 in the vibrating lens 5 (i.e., the third rotation position) remains unchanged. That is, the light-transmissive assembly 52 in the vibrating lens 5 does not rotate until the display of the third sub-image C is completed.

In this case, the display control circuit 1 may transmit a third vibrating lens current control signal to the vibrating lens drive assembly 4. In response to the third vibrating lens current control signal, the vibrating lens drive assembly 4 provides a first vibrating lens driving current to the first coil group 5111, and provides a second vibrating lens driving current to the second coil group 5112.

Figure 37:
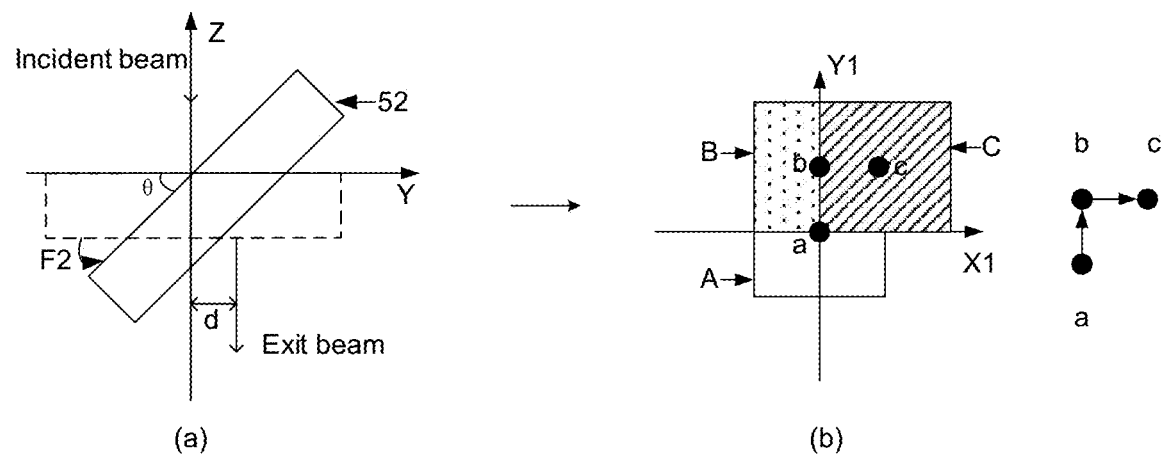
FIG. 37 is a schematic diagram of a position of a third sub-image displayed on a projection screen after the light-transmissive assembly in the another vibrating lens is rotated, in accordance with some embodiments.

As shown in part (a) in FIG. 37, the light-transmissive assembly 52 in the vibrating lens 5 rotates to the fifth sub-position with the first axis X as the rotation axis under driving of the first vibrating lens driving current. That is, the light-transmissive assembly 52 rotates by the angle θ in a second direction F2 (i.e., counterclockwise) with the first axis X as the rotation axis, so that the projection beam of the third sub-image C is deflected toward the positive direction of the second axis Y, the pixel at the center of the third sub-image C is offset by a distance d from the initial position of the X1 axis to the positive direction of the X1 axis, that is the offset distance of the pixel at the center of the third sub-image C in the positive direction of the X1 axis is d. Moreover, the light-transmissive assembly 52 in the vibrating lens 5 remains unchanged at the six sub-position in the positive direction of the first axis X under driving of the second vibrating lens driving current, so that the offset distance of the pixel at the center in the third sub-image C in the positive direction of the Y1 axis is still d.

As shown in part (b) in FIG. 37, the coordinates of the pixel at the center of the third sub-image C in the projection coordinate system are (d, d). That is, the pixel at the center of the third sub-image C is located at the position c of the projection coordinate system.

In a process of projecting a fourth sub-image D, the light source assembly 2 emits beams of three primary color sequentially. When the light source assembly 2 emits yet another blue beam, the rotation position of the light-transmissive assembly 52 in the vibrating lens 5 remains unchanged at the fifth sub-position in the positive direction of the second axis Y, so that the projection beams of the fourth sub-image D remain deflected in the positive direction of the second axis Y. The light-transmissive assembly 52 in the vibrating lens 5 rotates from the sixth sub-position to the initial position with the second axis Y as the rotation axis (i.e., the fourth rotation position is the fifth sub-position), so that the projected beams of the second sub-image B are deflected from the positive direction of the first axis X to the initial position. When the light source assembly 2 emits yet another green beam and yet another red beam, the position of the light-transmissive assembly 52 in the vibrating lens 5 (i.e., the fourth rotation position) remains unchanged. That is, the light-transmissive assembly 52 in the vibrating lens 5 does not rotate until the display of the fourth sub-image B is completed.

In this case, the display control circuit 1 may transmit the fourth vibrating lens current control signal to the vibrating lens drive assembly 4. In response to the fourth vibrating lens current control signal, the vibrating lens drive assembly 4 provides the first vibrating lens driving current to the first coil group 5111, provides a second vibrating lens driving current to the second coil group 5112.

The light-transmissive assembly 52 in the vibrating lens 5 remains unchanged at the fifth sub-position in the positive direction of the second axis Y under driving of the first vibrating lens driving current, so that the offset distance of the pixel at the center in the fourth sub-image D in the positive direction of the X1 axis is still d.

The second vibrating lens driving current is referred to the segments t3 and t4 in the current waveform diagram shown in FIG. 35. When the second vibrating lens driving current is at the segment t3, the second vibrating lens driving current gradually decreases to zero. As shown in part (a) in FIG. 38, the light-transmissive assembly 52 in the vibrating lens 5 rotates from the sixth sub-position to the initial position with the second axis Y as the rotation axis under driving of the second vibrating lens driving current. That is, the light-transmissive assembly 52 rotates by an angle θ in the fourth direction F4 (i.e., clockwise) with the second axis Y as the rotation axis, so that the projection beam of the fourth sub-image D is deflected from the positive direction of the first axis X to the initial position of the first axis X, and the pixel at the center of the fourth sub-image D is offset by a distance d from the positive direction of the Y1 axis to the initial position of the Y1 axis, that is the offset distance of the pixel at the center in the fourth sub-image D in the Y1 axis is zero. When the second vibrating lens driving current is at the segment t4, the second vibrating lens driving current remains at zero and no longer changes, and the offset distance of the pixel at the center in the fourth sub-image D in the Y1 axis is still zero.

Figure 38:
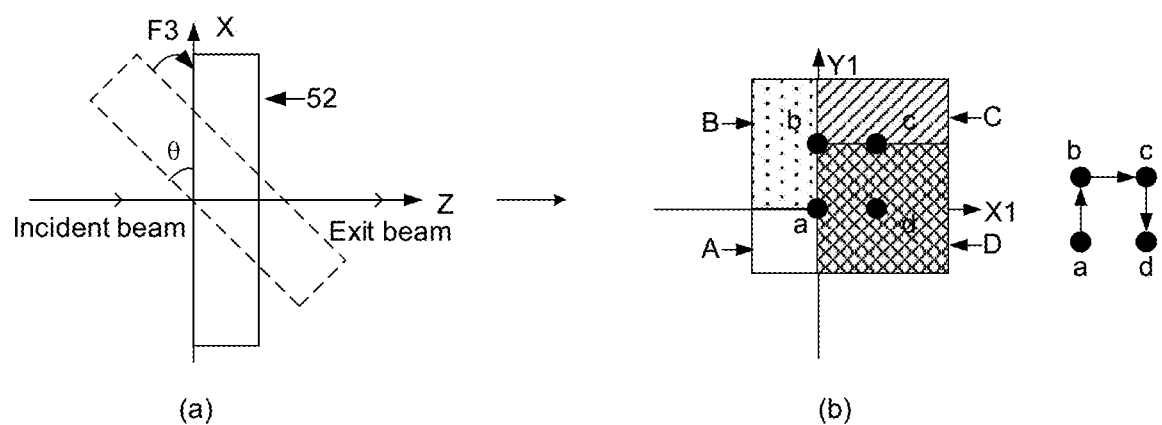
FIG. 38 is a schematic diagram of a position of a fourth sub-image displayed on a projection screen when the light-transmissive assembly in the another vibrating lens is rotated, in accordance with some embodiments.

As shown in part (b) in FIG. 38, the coordinates of the pixel at the center of the fourth sub-image D in the projection coordinate system are (d, 0). That is, the pixel at the center of the fourth sub-image D is located at the position d of the projection coordinate system.

When projecting a first sub-image A in a next image, the display control circuit 1 may transmit another first vibrating lens current control signal to the vibrating lens drive assembly 4. The another first vibrating lens current control signal controls the vibrating lens drive assembly 4 to gradually reduce the magnitude of the first vibrating lens driving current to zero, and the light-transmissive assembly 52 in the vibrating lens 5 returns to the initial position. Followed by analogy, continuous multiple images may be projected on the projection screen.

Since in the vibrating lens driving current shown in FIG. 35, the direction of the current is unidirectional, such as a positive current, the circuit design of the vibrating lens drive assembly 4 may be simpler and the cost is relatively lower. However, in a case where the vibrating lens driving current is unidirectional, the rotation direction of the light-transmissive assembly 52 (lens 523) in the vibrating lens 5 is also a unidirectional fixed direction.

It will be noted that, the sequence of steps of the projection display method provided by the embodiments of the present disclosure may be adjusted appropriately. Any person skilled in the art could readily conceive of changes or replacements within the technical scope of the present disclosure, which shall all be included in the protection scope of the present disclosure, and will not be described in detail herein.

Some embodiments of the present disclosure provide a non-transitory computer-readable storage medium. The computer-readable storage medium stores computer program instructions that when running on a processor, cause the processor to perform one or more steps in the laser projection display method described in any one of the above embodiments.

For example, the computer-readable storage medium may include, but is not limited to: a magnetic storage device (e.g., a hard disk, a floppy disk, or a magnetic tape), an optical disk (e.g., a compact disk (CD)), a digital versatile disk (DVD), a smart card and a flash memory device (e.g., an erasable programmable read-only memory (EPROM), a card, a stick or a key drive). The various computer-readable storage media described in the present disclosure may represent one or more devices and/or other machine-readable storage media for storing information. The term "machine-readable storage media" may include, but are not limited to, wireless channels and various other media capable of storing, containing, and/or carrying instruction(s) and/or data.

The foregoing descriptions are merely specific implementations of the present disclosure, but the protection scope of the present disclosure is not limited thereto. Any changes or replacements that a person skilled in the art could readily conceive of within the technical scope of the present disclosure shall be included in the protection scope of the present disclosure. Therefore, the scope of the present disclosure shall be subject to the protection scope of the claims.

What is claimed is:

1. A projection apparatus, comprising a light source assembly, a display control circuit, a light valve, a vibrating lens drive assembly and a vibrating lens, the display control circuit being electrically connected to the light valve and the vibrating lens drive assembly, the vibrating lens drive assembly being further electrically connected to the vibrating lens, wherein the display control circuit is configured to:
  obtain a plurality of sub-images by decomposing an image to be projected, a resolution of the image to be projected being greater than a resolution of the light valve, and a resolution of each sub-image being less than or equal to the resolution of the light valve;
  in a process of emitting beams of three primary colors by the light source assembly to the light valve sequentially, control, according to primary color parameters of pixels in each sub-image, the light valve to sequentially reflect beams corresponding to the plurality of sub-images to the vibrating lens; and
  in a process of projecting each sub-image, transmit a vibrating lens current control signal corresponding to the sub-image to the vibrating lens drive assembly; and the vibrating lens drive assembly is configured to provide, according to vibrating lens current control signals corresponding to the plurality of sub-images, at least one vibrating lens driving current to the vibrating lens, so that the vibrating lens deflects beams corresponding to at least one sub-image, thereby forming a projected image.

2. The projection apparatus according to claim 1, wherein vibrating lens current control signals corresponding to different sub-images are different, and each vibrating lens driving current has alternately changed current directions.

3. The projection apparatus according to claim 1, wherein the vibrating lens includes:
a control assembly electrically connected to the vibrating lens drive assembly; and
a light-transmissive assembly located at a side of the control assembly,
wherein the control assembly is configured to control the light-transmissive assembly to rotate under driving of the at least one vibrating lens driving current, and the light-transmissive assembly is configured to rotate about at least one of a first axis and a second axis as a rotation axis under driving of the control assembly.

4. The projection apparatus according to claim 3, wherein the control assembly includes:
a substrate having a first opening and a first edge region surrounding the first opening; and
a control coil located on the first edge region;
the light-transmissive assembly includes:
a bearing plate having a second opening and a second edge region surrounding the second opening, wherein the first opening and the second opening are configured to allow the beams corresponding to the plurality of sub-images to pass through;
a lens fixed on a portion of the bearing plate located in the second edge region and covering the second opening; and
a magnetic assembly located on the second edge region; and
the control coil is configured to interact with the magnetic assembly under the driving of the at least one vibrating lens driving current, so as to control the light-transmissive assembly to rotate about at least one of the first axis and the second axis as the rotation axis.

5. The projection apparatus according to claim 4, wherein the control coil includes at least one coil group, the magnetic assembly includes at least one magnet group, and each coil group is configured to interact with a respective magnet group under driving of a corresponding vibrating lens driving current, so as to drive the light-transmissive assembly to rotate about a respective one of the first axis and the second axis as the rotating axis.

6. The projection apparatus according to claim 4, wherein the at least one coil group includes a plurality of coil groups, the at least one magnet group includes a plurality of magnet groups, and the plurality of coil groups correspond to two rotation axes; the two rotation axes are parallel to a plane where the substrate is located, and the two rotation axes intersect.

7. The projection apparatus according to claim 6, wherein the plurality of coil groups include a first coil group and a second coil group, the first coil group is located at one or both sides of the first opening in a direction of the second axis, and the second coil group is located at one or both sides of the first opening in a direction of the first axis; the at least one vibrating lens driving current includes a first vibrating lens driving current and a second vibrating lens driving current;
the plurality of magnet groups include a first magnet group and a second magnet group;
the first coil group is configured to interact with the first magnet group under driving of the first vibrating lens driving current, so that the first magnet group drives the light-transmissive assembly to rotate about the first axis as the rotation axis; and
the second coil group is configured to interact with the second magnet group under driving of the second vibrating lens driving current, so that the second magnet group drives the light-transmissive assembly to rotate about the second axis as the rotation axis.

8. The projection apparatus according to claim 7, wherein the first coil group includes a first coil and a second coil, the first coil and the second coil are located at both sides of the first opening in the direction of the second axis, and the first coil and the second coil are connected in series;
the first magnet group includes a first magnet and a second magnet, an orthogonal projection of the first magnet on the bearing plate overlaps with an orthogonal projection of a region surrounded by the first coil on the bearing plate, and an orthogonal projection of the second magnet on the bearing plate overlaps with an orthogonal projection of a region surrounded by the second coil on the bearing plate;
the second coil group includes a third coil and a fourth coil, the third coil and the fourth coil are located at both sides of the first opening in the direction of the first axis, and the third coil and the fourth coil are connected in series; and
the second magnet group includes a third magnet and a fourth magnet, an orthogonal projection of the third magnet on the bearing plate overlaps with an orthogonal projection of a region surrounded by the third coil on the bearing plate, and an orthogonal projection of the fourth magnet on the bearing plate overlaps with an orthogonal projection of a region surrounded by the fourth coil on the bearing plate.

9. The projection apparatus according to claim 6, wherein the substrate includes a plurality of sub-substrates that are stacked, and the plurality of coil groups include a first coil group and a second coil group disposed on each sub-substrate; each first coil group is located at one or both sides of the first opening in a direction of the second axis, and each second coil group is located at one or both sides of the first opening in a direction of the first axis; the at least one vibrating lens driving current includes a first vibrating lens driving current and a second vibrating lens driving current;
the plurality of first coil groups on the plurality of sub-substrates are connected in series through first via holes in the plurality of sub-substrates, and the plurality of second coil groups on the plurality of sub-substrates are connected in series through second via holes in the plurality of sub-substrates;
the plurality of magnet groups include a first magnet group and a second magnet group;
the plurality of first coil groups connected in series are configured to interact with the first magnet group under driving of the first vibrating lens driving current, so that the first magnet group drives the light-transmissive assembly to rotate about the first axis as the rotation axis; and
the plurality of second coil groups connected in series are configured to interact with the second magnet group under driving of the second vibrating lens driving current, so that the second magnet group drives the light-transmissive assembly to rotate with the second axis as the rotation axis.

10. The projection apparatus according to claim 9, wherein each first coil group includes a first coil and a second coil, the first coil and the second coil are located at both sides of the first opening in the direction of the second axis, and the first coils and the second coils of the plurality of first coil groups are connected in series;

the first magnet group includes a first magnet and a second magnet, an orthogonal projection of the first magnet on the bearing plate overlaps with an orthographic projection of a central region surrounded by each first coil on the bearing plate, and an orthogonal projection of the second magnet on the bearing plate overlaps with an orthogonal projection of a central region surrounded by each second coil on the bearing plate;

each second coil group includes a third coil and a fourth coil, the third coil and the fourth coil are located at both sides of the first opening in the direction of the first axis, and the third coils and the fourth coils of the plurality of second coil groups are connected in series; and the second magnet group includes a third magnet and a fourth magnet, an orthogonal projection of the third magnet on the bearing plate overlaps with an orthogonal projection of a central region surrounded by each third coil on the bearing plate, and an orthogonal projection of the fourth magnet on the bearing plate overlaps with an orthogonal projection of a central region surrounded by each fourth coil on the bearing plate.

11. The projection apparatus according to claim 10, wherein the plurality of sub-substrates include a first sub-substrate and a second sub-substrate; an end of a first coil on the first sub-substrate is electrically connected to an end of a first coil on the second sub-substrate through a first via hole, another end of the first coil on the second sub-substrate is electrically connected to an end of a second coil on the second sub-substrate, and another end of the second coil on the second sub-substrate is electrically connected to an end of a second coil on the first sub-substrate through another first via hole; and an end of a third coil on the first sub-substrate is electrically connected to an end of a third coil on the second sub-substrate through a second via hole, another end of the third coil on the second sub-substrate is electrically connected to an end of a fourth coil on the second sub-substrate, and another end of the fourth coil on the second sub-substrate is electrically connected to an end of a fourth coil on the first sub-substrate through another second via hole.

12. A projection display method, comprising:
obtaining a plurality of sub-images by decomposing an image to be projected, a resolution of the image to be projected being greater than a resolution of a light valve, and a resolution of each sub-image being less than or equal to the resolution of the light valve;
in a process of emitting beams of three primary colors by the light source assembly to the light valve sequentially, controlling, according to primary color parameters of pixels in each sub-image, the light valve to sequentially reflect beams corresponding to the plurality of sub-images to the vibrating lens; and
in a process of projecting each sub-image, transmitting a vibrating lens current control signal corresponding to the sub-image to the vibrating lens drive assembly, so that the vibrating lens drive assembly provides at least one vibrating lens driving current to the vibrating lens, and the vibrating lens deflects beams corresponding to at least one sub-image, thereby forming a projected image.

13. The method according to claim 12, wherein vibrating lens current control signals corresponding to different sub-images are different, and each vibrating lens driving current has alternately changed current directions.

14. The method according to claim 13, wherein the vibrating lens includes a control assembly and a light-transmissive assembly, and transmitting the vibrating lens current control signal corresponding to the sub-image to the vibrating lens drive assembly, includes:
transmitting the vibrating lens current control signal corresponding to the sub-image to the vibrating lens drive assembly, so that the vibrating lens drive assembly provides the at least one vibrating lens driving current to the control assembly, and the light-transmissive assembly rotates about at least one of a first axis and a second axis that intersect with each other.

15. The method according to claim 14, wherein the control assembly includes a first coil group and a second coil group, the first coil group includes two coils, and the second coil group includes two coils; the light-transmissive assembly includes a first magnet group and a second magnet group;
in the process of projecting each sub-image, the vibrating lens current control signal corresponding to the sub-image is transmitted to the vibrating lens drive assembly, so that the vibrating lens drive assembly provides a first vibrating lens driving current to the first coil group, the first coil group interacts with the first magnet group and the first magnet group drives the light-transmissive assembly to rotate about the first axis as the rotation axis, and/or to control the vibrating lens drive assembly to provide a second vibrating lens driving current to the second coil group, the second coil group interacts with the second magnet group and the second magnet group drives the light-transmissive assembly to rotate with the second axis as the rotation axis.

16. The method according to claim 15, wherein the plurality of sub-images include four sub-images; in the process of projecting each sub-image, transmitting the vibrating lens current control signal corresponding to the sub-image to the vibrating lens drive assembly includes:
in a process of projecting a first sub-image, transmitting a first vibrating lens current control signal to the vibrating lens drive assembly so as to control the vibrating lens drive assembly to drive the light-transmissive assembly in the vibrating lens to rotate by a first angle in a first direction with the first axis as the rotation axis, and to drive the light-transmissive assembly in the vibrating lens to rotate by the first angle in a third direction with the second axis as the rotation axis, or to control the vibrating lens drive assembly to drive the light-transmissive assembly in the vibrating lens to rotate by a second angle in the first direction with the first axis as the rotation axis;
in a process of projecting a second sub-image, transmitting a second vibrating lens current control signal to the vibrating lens drive assembly, so as to control the vibrating lens drive assembly to drive the light-transmissive assembly in the vibrating lens to rotate by the second angle in a fourth direction with the second axis as the rotation axis;
in a process of projecting a third sub-image, transmitting a third vibrating lens current control signal to the vibrating lens, so as to control the vibrating lens drive assembly to drive the light-transmissive assembly in the vibrating lens to rotate by the second angle in a second direction with the first axis as the rotation axis; and in a process of projecting a fourth sub-image, transmitting a fourth vibrating lens current control signal to the vibrating lens drive assembly, so as to control the vibrating lens drive assembly to drive the light-transmissive assembly in the vibrating lens to rotate by the second angle in a third direction with the second axis as the rotation axis; wherein the first direction is opposite to the second direction, the third direction is opposite to the fourth direction, and the second angle is equal to twice the first angle.

17. The method according to claim 12, wherein in the process of projecting each sub-image, transmitting a vibrating lens current control signal corresponding to the sub-image to the vibrating lens drive assembly, includes:

in the process of projecting each sub-image, and in a period in which the light source assembly outputs a beam of one of the three primary colors, transmitting the vibrating lens current control signal corresponding to the sub-image to the vibrating lens drive assembly.

18. The method according to claim 17, wherein the beam of the one of the three primary colors is a blue beam.

19. The method according to claim 12, wherein a display cycle of the image to be projected is a sum of display cycles of the plurality of sub-images; a display cycle of the image to be projected is a reciprocal of a refresh rate of the projection apparatus.

20. A non-transitory computer-readable storage medium storing computer program instructions that, when executed by a processor, cause the processor to perform the method according to claim 12.

* * * * *